United States Patent [19]

Nonomura et al.

[11] Patent Number: 6,118,445
[45] Date of Patent: Sep. 12, 2000

[54] SYSTEM STREAM REPRODUCTION CONTROL INFORMATION EDITING APPARATUS AND A RECORDING MEDIUM ON WHICH THE METHOD USED THEREIN IS RECORDED

[75] Inventors: Tomoyuki Nonomura; Mitsuhiro Inoue, both of Osaka; Yasushi Uesaka, Sanda; Kenji Tagawa, Katano; Masayuki Kozuka, Neyagawa, all of Japan

[73] Assignee: Matsushita Electric Industrial Co., Ltd., Japan

[21] Appl. No.: 08/969,242

[22] Filed: Nov. 13, 1997

[30] Foreign Application Priority Data

Nov. 13, 1996 [JP] Japan .................................... 8-301572

[51] Int. Cl.⁷ ............................. G06F 3/14; G11B 27/00
[52] U.S. Cl. ......................... 345/328; 345/346; 345/349
[58] Field of Search .................................. 345/328, 327, 345/302, 346, 349, 970; 386/55, 56, 66

[56] References Cited

U.S. PATENT DOCUMENTS

| | | | |
|---|---|---|---|
| 5,675,752 | 10/1997 | Scott et al. ............................. | 345/333 |
| 5,767,846 | 10/1995 | Nakamura et al. ..................... | 345/302 |
| 5,786,814 | 11/1995 | Moran et al. .......................... | 345/328 |
| 5,861,880 | 10/1995 | Shimizu et al. ....................... | 345/302 |
| 5,892,507 | 8/1996 | Moorby et al. ........................ | 345/302 |

FOREIGN PATENT DOCUMENTS

| | | |
|---|---|---|
| 0645721 | of 0000 | European Pat. Off. . |
| 0724264 | of 0000 | European Pat. Off. . |
| 687109 | 12/1995 | European Pat. Off. . |
| 724264 | 7/1996 | European Pat. Off. . |
| 8267963 | 10/1996 | Japan . |
| 9631829 | 10/1996 | WIPO . |

OTHER PUBLICATIONS

"DVD Authoring System," by Y. Uesaka et al., National Technical Report, vol. 42, No. 5, Oct. 1996.

"A Hierarchical Layered Model for DVD Authoring System," by W. Ryu et al., IEEE Transactions on Consumer Electronics, vol. 42, No. 3, Aug. 1996.

"Elements of a New Authoring System for Digital Video Disk (DVD)," by K. Sugiyama et al., SMPTE Journal, vol. 106, No. 11, Nov. 1, 1997.

"Authorware and Iconauthor Power for Multimedia CD–ROM," by R. Guenette, CD–ROM Professional, Online Inc. ISSN 1049–0833, vol. 8, No. 10, Oct. 1, 1995.

Primary Examiner—Raymond J. Bayerl
Assistant Examiner—Cuong T. Thai
Attorney, Agent, or Firm—Price, Gess & Ubell

[57] ABSTRACT

The display unit displays an "Author" window and other windows that form a CUI according to control by the display control unit. The input operation unit receives inputs from the editor who views the "Author" and other windows. The window information storage unit stores the attributes of windows displayed by the display unit. The script information storage unit stores a template of scripts, including parameter strings, which conforms to the standards for multimedia optical discs and which is to be used for generating the outputted strings. The control unit interprets the operations received by the input operation unit 1501 and instructs the display control unit to display windows as required, in addition to storing variables that correspond to the parameters in the input data storage unit. The reproduction control information generation unit reads the data stored in the input data storage unit, uses the read data to set the parameters in the template stored in the script information storage unit, and outputs scripts for the system stream reproduction control information.

8 Claims, 65 Drawing Sheets

FIG. 1

101: {VTSM_PGCI_UT
{VTSM_PGCI_UT}

102: {VTSM_LU_SRP[1]
{VTSM_LCD en}
}
{VTSM_LU_SRP[2]
{VTSM_LCD ja}
}
{VTSM_LU_SRP[3]
{VTSM_LCD fr}
}

103: {VTSM_LU[1]
{VTSM_LU}

{VTSM_PGCI_SRP_NS 2 }

104: {VTSM_PGCI_SRP[1]
{VTSM_PGC_CAT
{EntryType Entry}
{MenuID RootM}
{BlockMode NotBlk}
{BlockType NotBlk}
{PTL_ID_FLD 0000000000000000B}

105: {VTSM_PGCI_SA script/VTS_1/english/English_Main_Menu.pgc}
}
}

FIG. 2

```
{VTSM_PGCl_SRP[2]
 {VTSM_PGC_CAT
  {EntryType Entry}
  {MenuID PTTM}
  {BlockMode NotBlk}
  {BlockType NotBlk}
  {PTL_ID_FLD 0000000000000000B}
 }
 {VTSM_PGCl_SA script/VTS_1/english/English_Chapter_Menu.pgc}
}
{VTSM_LU[2]
 {VTSM_LU}
}
{VTSM_PGCl_SRP[1]
 {VTSM_PGC_CAT
  {EntryType Entry}
  {MenuID RootM}
  {BlockMode NotBlk}
  {BlockType NotBlk}
  {PTL_ID_FLD 0000000000000000B}
 }
 {VTSM_PGCl_SA script/VTS_1/japanese/Japanese_Main_Menu.pgc}
}
```

```
{VTSM_PGCI_SRP[2]
  {VTSM_PGC_CAT
    {EntryType Entry}
    {MenuID PTTM}
    {BlockMode NotBlk}
    {BlockType NotBlk}
    {PTL_ID_FLD 0000000000000000B}
  }
  {VTSM_PGCI_SA script/VTS_1/japanese/Japanese_Chapter_Menu.pgc}
}

{VTSM_LU[3]
  {VTSM_LU}
    {VTSM_PGCI_SRP_NS 2 }
  }
}
```

302 — {VTSM_PGCI_SRP[2] ... VTSM_PGC_CAT block}
303 — closing brace
304 — VTSM_PGCI_SA line
301 — VTSM_LU[3] block

FIG. 4

```
{VTSM_PGCI_SRP[1]
  {VTSM_PGC_CAT
    {EntryType Entry}
    {MenuID RootM}
    {BlockMode NotBlk}
    {BlockType NotBlk}
    {PTL_ID_FLD 0000000000000000B}
  }
  {VTSM_PGCI_SA script/VTS_1/french/French_Main_Menu.pgc}
}
{VTSM_PGCI_SRP[2]
  {VTSM_PGC_CAT
    {EntryType Entry}
    {MenuID PTTM}
    {BlockMode NotBlk}
    {BlockType NotBlk}
    {PTL_ID_FLD 0000000000000000B}
  }
  {VTSM_PGCI_SA script/VTS_1/french/French_Chapter_Menu.pgc}
}
}  # End of VTSM_PGCI_UT
```

| WINDOW NAME | SampleDisc |
|---|---|
| WINDOW DISPLAY POSITION | (0,0) |
| WINDOW DISPLAY SIZE | (200,330) |

FIG. 17
| WINDOW NAME | ICON BITMAP DATA | DISPLAY POSITION (x,y) | CHARACTER STRING |
|---|---|---|---|
| SampleDisc |  | (9,11) | Palettes |
| |  | (9,51) | Color Sets |
| |  | (9,91) | Button Styles |
| |  | (9,131) | Disc Variables |
| |  | (9,171) | Startup Commands |
| |  | (9,211) | Disc Menus |
| |  | (9,251) | TitleSets |

FIG. 18

{VTSM_PGCI_UT} ~1801
{VTSM_PGCI_UTI}
 {VTSM_LU_NS $X1} ~1802
 {VTSM_LU_SRP [$X2]} ~1803
  {VTSM_LCD $X3} ~1804
 }
 {VTSM_LU [$X2]} ~1803
 {VTSM_LU}
  {VTSM_PGCI_SRP_NS $X4} ~1805
  {VTSM_PGCI_SRP [$X5]} ~1806
   {VTSM_PGC_CAT}
    {EntryType Entry} ~1808
    {MenuID $X6}
    {BlockMode NotBlk}
    {BlockType NotBlk}
    {PTL_ID_FLD 0000000000000000B} ~1809
   {VTSM_PGCI_SA script/VTS_1/$X3/$X7 pgc} ~1804
  } ~1807
 } ~1813
} ~1814
} ~1810
} ~1811
} ~1812
1815 ⌐
1816 ⟶ # End of VTSM_PGCI_UT

FIG. 25

2501 VTS ATTRIBUTE TABLE

| V T S NAME | TitleDivision |
|---|---|
| NUMBER OF L U (X2) | 3 |

FIG. 26

2601 L U ATTRIBUTE TABLE

| L U NUMBER (X2) | LANGUAGE CODE (X3) | NUMBER OF SETS OF PGC INFORMATION (X4) |
|---|---|---|
| 1 | en | 2 |
| 2 | fr | 2 |
| 3 | ja | 2 |

2701 PGC ATTRIBUTE TABLE

| ICON COORDINATES (X,Y) | LU NUMBER (X2) | PGC INFORMATION NUMBER (X5) | MenuID (X6) | PGC INFORMATION NAME (X7) |
|---|---|---|---|---|
| 176,80 | 1 | 1 | RootM | English_Main_Menu |
| 244,120 | 1 | 2 | PTTM | English_Chapter_Menu |
| 176,160 | 2 | 1 | RootM | Japanese_Main_Menu |
| 244,200 | 2 | 2 | PTTM | Japanese_Chapter_Menu |
| 176,240 | 3 | 1 | RootM | French_Main_Menu |
| 244,280 | 3 | 2 | PTTM | French_Chapter_Menu |

FIG. 35

```
       {PGCI
           {PGC_GI
              {PGC_CNT
                     {NumberOfPrograms 1}
3501              {NumberOfCells $Y1}
              }                              ~3502
              {PGC_PB_TM
                     {TcFlag NTSC}         (3504
3503              {PGCPlayBackTime $Y2}
              }
              {PGC_UOP_CTL
                     {UOP [24] Permitted}
                     {UOP [23] Permitted}
                     {UOP [22] Permitted}

3505                         ⋮

{UOP [2] Permitted}
                     {UOP [1] Permitted}
                     {UOP [0] Permitted}
              } # End PGC_UOP_CTL
```

FIG. 36

```
{PGC_AST_CTLT
        {PGC_AST_CTL [0]
                {AvailabilityFlag Available}
                {DecodingAudioStreamid 0}
        }
        {PGC_AST_CTL [1]
                {AvailabilityFlag Available}
                {DecodingAudioStreamid 1}
        }
        {PGC_AST_CTL [2]
                {AvailabilityFlag Available}
                {DecodingAudioStreamid 0}
        }

⋮

{PGC_AST_CTL [6]
                {AvailabilityFlag Available}
                {DecodingAudioStreamid 0}
        }
        {PGC_AST_CTL [7]
                {AvailabilityFlag Available}
                {DecodingAudioStreamid 0}
        }
} # End PGC_AST_CTLT
```

FIG. 37

```
{PGC_SPST_CTLT
        {PGC_SPST_CTL [0]
                {AvailabilityFlag Available}
                {DecodingSPStreamid 0}
                {WideSPStreamid 0}
                {LetterboxSPStreamid 0}
                {Pan-scanSPStreamid 0}
        }
        {PGC_SPST_CTL [1]
                {AvailabilityFlag Available}
                {DecodingSPStreamid 1}
                {WideSPStreamid 0}
                {LetterboxSPStreamid 0}
                {Pan-scanSPStreamid 0}
        }
        {PGC_SPST_CTL [2]
                {AvailabilityFlag Available}
                {DecordingSPStreamid 2}
                {WideSPStreamid 0}
                {LetterboxSPStreamid 0}
                {Pan-scanSPStreamid 0}
        }
```

FIG. 38

```
{PGC_SPST_CTL [3]
        {AvailabilityFlag Available}
        {DecodingSPStreamid 3}
        {WideSPStreamid 0}
        {LetterboxSPStreamid 0}
        {Pan-scanSPStreamid 0}
}
{PGC_SPST_CTL [4]
        {AvailabilityFlag NotAvailable}
        {DecodingSPStreamid 0}
        {WideSPStreamid 0}
        {LetterboxSPStreamid 0}
        {Pan-scanSPStreamid 0}
}
                    :

{PGC_SPST_CTL [31]
        {AvailabilityFlag NotAvailable}
        {DecodingSPStreamid 0}
        {WideSPStreamid 0}
        {LetterboxSPStreamid 0}
        {Pan-scanSPStreamid 0}
}
} # End PGC_SPST_CTLT
```

FIG. 39

```
       ⎧ {PGC_NV_CTL
       ⎪       {NextPGCnumber NoLink}
       ⎪       {PrevPGCnumber NoLink}
       ⎪       {GoUpPGCnumber NoLink}
       ⎪       {PGPlaybackMode
3901 ⎨                {ExecMode Sequential}
       ⎪                {NumberOfLoop NotCare}
       ⎪       }
       ⎪       {StillTimeValue NoStill}
       ⎩ }
       ⎧ {PGC_SP_PLT
       ⎪       {ColorSet [0]
       ⎪              {Y 16}
       ⎪              {Cr 128}
       ⎪              {Cb 128}
       ⎪       }
       ⎪       {ColorSet [1]
       ⎪              {Y 64}
       ⎪              {Cr 211}
3902 ⎨              {Cb 99}
       ⎪       }
       ⎪       {ColorSet [2]
       ⎪              {Y 111}
       ⎪              {Cr 57}
       ⎪              {Cb 72}
       ⎩       }
```

FIG. 40

```
{ColorSet [3]
        {Y 160}
        {Cr 141}
        {Cb 44}
}
{ColorSet [4]
        {Y 34}
        {Cr 114}
        {Cb 211}
}
{ColorSet [5]
        {Y 83}
        {Cr 198}
        {Cb 183}
}
{ColorSet [6]
        {Y 130}
        {Cr 44}
        {Cb 156}
}
{ColorSet [7]
        {Y 125}
        {Cr 128}
        {Cb 128}
}
```

FIG. 41

```
{ColorSet [8]
        {Y 81}
        {Cr 239}
        {Cb 90}
}
{ColorSet [9]
        {Y 144}
        {Cr 34}
        {Cb 54}
}
{ColorSet [10]
        {Y 209}
        {Cr 146}
        {Cb 16}
}
{ColorSet [11]
        {Y 40}
        {Cr 109}
        {Cb 239}
}
{ColorSet [12]
        {Y 106}
        {Cr 221}
        {Cb 201}
}
```

FIG. 42

```
                           {ColorSet [13]
                                  (Y 168)
                                  (Cr 16)
                                  (Cb 165)
                           }
                           (ColorSet [14]
                                  (Y 209)
                                  (Cr 146)
                                  (Cb 16)
4201                       }
                           (ColorSet [15]
                                  (Y 234)
                                  (Cr 128)
                                  (Cb 128)     2404
                           }
                    } # End PGC_SP_PLT
             } # end of PGC_GI
        (PGC_CMDT
               (PGC_CMDTI
                           (PRE_CMD_NS 0)
                           (POST_CMD_NS 0)
                           (C_CMD_NS 0)
4202
               }
        } # End PGC_NVCMDT
        (PGC_PGMAP
                  (EN_CN [1] 1)
        } # End PGC_PMAP
```

FIG. 43

```
(C_PBIT
    (C_CAI [$Y3] ~4301
        (C_CAT
            (CellBlockMode $Y4) ~4302
            (CellBlockType $Y5) ~4303
            (SeamlessPlaybackFlag Seamless) ~4304
            (InterleavedAllocationFlag $Y6) ~4305
            (STCdiscontinuityFlag STCreset) ~4307
            (SeamlessAngleChangeFlag $Y7)         ~4306
            (CellPlaybackMode Continuous)
            (AccessRestrictionFlag Permitted) ~4308
            (CellType Reserved)
            (CellStillTime NoStill)           ~4309
            (CellCommandNumber NoCommand)
        )
        (C_PBTM
            (ToFlag NTSC) ~4310
            (CellPlayBackTime $Y8) ~4311
        )
        (C_FVOBU_SA 00:00:00:00) ~4312
    )
) # End C_PBIT
(C_POSIT
    (C_POSI [$Y3] ~4301              4314
        (C_VOB_IDN vob/Title_Division/$Y9/$Y9.ss)  }~4313
    )
) # End C_POSIT
```

FIG. 47

| | | 4701 |
|---|---|---|
| Cell 1 | | _ □ ✕ |

TT_DOMs                                              4702

| Name | Cell 1 |
|---|---|
| Type | Playback Scene |
| Marker Type | None ▼ |

▼Styles

| Button Style | None System Default ▼ |
|---|---|

▼Playback Scene Attributes

| VOB Start Point | Yes ▼ |
|---|---|
| VOB Name | Cell 1 |
| Content Type | Movie ▼ |
| Analogue Protection | AGC/CS OFF ▼ |
| Audio Streams | ... |
| Subpicture Streams | ... |
| Start Time | 00:00:00:00 |
| Playback Time | 00:00:10:00 |
| Still Time | 0 |
| Access Permissions | Permitted ▼ |
| Branch Value | Title_for_child ▼ |

| ANGLE BLOCK NUMBER | NUMBER OF ANGLES IN BLOCK | ICON COORDINATES |
|---|---|---|
| 1 | 3 | 40,80 |

4802 — ANGLE BLOCK NUMBER
4803 — NUMBER OF ANGLES IN BLOCK
4801 — ATTRIBUTE TABLE OF ANGLE BLOCK
4804 — ICON COORDINATES

FIG. 49

4901 ATTRIBUTE TABLE FOR SYSTEM STREAM ICONS

| Icon Coordinates (X,Y) | System Stream Number (Y3) | CellBlock Mode (Y4) | CellBlock Type (Y5) | Interleaved Allocation Flag (Y6) | SeamlessAngle ChangeFlag (Y7) | System Stream Name (Y9) | System Stream Playback Time (Y8) |
|---|---|---|---|---|---|---|---|
| 80,80 | 1 | FirstBlock | AngleBlock | Interleaved | Changeable | CloseUpScene 1 | 00:00:10:00 |
| 80,120 | 2 | InBlock | AngleBlock | Interleaved | Changeable | NormalViewScene 1 | 00:00:10:00 |
| 80,160 | 3 | LastBlock | AngleBlock | Interleaved | Changeable | DistantViewScene 1 | 00:00:10:00 |
| 40,200 | 4 | NotBlock | NotBlock | Contiguous | NotChangeable | CommonScene | 00:00:10:00 |

```
        ┌ (PGCI
        │       (PGC_GI
        │              (PGC_CNT
 5001 ─┤                      (NumberOfPrograms 1)
        │                      (NumberOfCells 4)
        │              )
        └
        ┌              (PGC_PB_TM
        │                      (TcFlag NTSC)
 5002 ─┤                      (PGCPlayBackTime 00:00:20:00)
        │              )
        └              (PGC_UOP_CTL
                              (UOP [24] Permitted)
                              (UOP [23] Permitted)
                              (UOP [22] Permitted)

⋮

(UOP [2] Permitted)
                              (UOP [1] Permitted)
                              (UOP [0] Permitted)
                      ) # End PGC_UOP_CTL
```

FIG. 51

```
{C_PBIT
    {C_PBI [1]
        {C_CAT
                    {CellBlockMode FirstBlk}
                    {CellBlockType AngleBlk}
                    {SeamlessPlaybackFlag Seamless}
                    {InterleavedAllocationFlag Interleaved}
                    {STCdiscontinuityFlag STCreset}
                    {SeamlessAngleChangeFlag Changeable}
                    {CellPlaybackMode Continuous}
                    {AccessRestrictionFlag Permitted}
                    {CellType Reserved}
                    {CellStillTime NoStill}
                    {CellCommandNumber NoCommand}
        }
        {C_PBTM
                    {ToFlag NTSC}
                    {CellPlayBackTime 00:00:10:00}
        }
        {C_FVOBU_SA 00:00:00:00}
    }
}
```

FIG. 52

```
{C_PBI [2]
        {C_CAT
                {CellBlockMode InBlk}
                {CellBlockType AngleBlk}
                {SeamlessPlaybackFlag Seamless}
                {InterleavedAllocationFlag Interleaved}
                {STCdiscontinuityFlag STCreset}
                {SeamlessAngleChangeFlag Changeable}
                {CellPlaybackMode Continuous}
                {AccessRestrictionFlag Permitted}
                {CellType Reserved}
                {CellStillTime NoStill}
                {CellCommandNumber NoCommand}
        }
        {C_PBTM
                {ToFlag NTSC}
                {CellPlayBackTime 00:00:10:00}
        }
        {C_FVOBU_SA 00:00:00:00}
}
```

FIG. 53

```
{C_PBI [3]
        {C_CAT
                {CellBlockMode LastBlk}
                {CellBlockType AngleBlk}
                {SeamlessPlaybackFlag Seamless}
                {InterleavedAllocationFlag Interleaved}
                {STCdiscontinuityFlag STCreset}
                {SeamlessAngleChangeFlag Changeable}
                {CellPlaybackMode Continuous}
                {AccessRestrictionFlag Permitted}
                {CellType Reserved}
                {CellStillTime NoStill}
                {CellCommandNumber NoCommand}
        }
        {C_PBTM
                {ToFlag NTSC}
                {CellPlayBackTime 00:00:10:00}
        }
        {C_FVOBU_SA 00:00:00:00}
}
```

FIG. 54

```
(C_PBI [4]
        (C_CAT
                (CellBlockMode NotBlk)
                (CellBlockType NotBlk)
                (SeamlessPlaybackFlag Seamless)
                (InterleavedAllocationFlag Contiguous)
                (STCdiscontinuityFlag STCreset)
                (SeamlessAngleChangeFlag NotChangeable)
                (CellPlaybackMode Continuous)
                (AccessRestrictionFlag Permitted)
                (CellType Reserved)
                (CellStillTime NoStill)
                (CellCommandNumber NoCommand)
        )
        (C_PBTM
                (ToFlag NTSC)
                (CellPlayBackTime 00:00:10:00)
        )
        (C_FVOBU_SA 00:00:00:00)
)
) # End C_PBIT
```

FIG. 55

```
{C_POSIT
    {C_POSI [1]
        {C_VOB_IDN vob/Title_Division/vob_closeupscene1/vob_closeupscene1.ss}
    }
    {C_POSI [2]
        {C_VOB_IDN vob/Title_Division/vob_normalviewscene1/vob_normalviewscene1.ss}
    }
    {C_POSI [3]
        {C_VOB_IDN vob/Title_Division/vob_distantviewscene1/vob_distantviewscene1.ss}
    }
    {C_POSI [4]
        {C_VOB_IDN vob/Title_Division/vob_commonscene/vob_commonscene.ss}
    }
} # End C_POSIT
```

SYSTEM STREAM REPRODUCTION CONTROL INFORMATION EDITING APPARATUS AND A RECORDING MEDIUM ON WHICH THE METHOD USED THEREIN IS RECORDED

BACKGROUND OF THE INVENTION

1. Field of the Invention

The present invention relates to a system stream reproduction control information editing apparatus that edits system stream reproduction control information which controls the reproduction order of a multimedia optical disc onto which system streams composed of video information, audio information, and subpicture information are recorded.

2. Description of the Related Art

In recent years, there has been a great increase in the use of optical discs, such as laser discs or video CDs, as optical recording media that record multimedia data such as video and audio.

Of these, video CDs have a memory capacity of about 600M bytes using a recording medium that was originally developed for recording digital audio, but which has also come to be used for recording video data thanks to the introduction of a video compression technique with a high compression rate called MPEG (Moving Picture Experts Group).

As a result, it has become possible to record movie titles that were previously recorded on laser discs onto video CDs.

As a result of recent research and development, DVDs (Digital Video Discs) that have a vastly improved storage capacity have also appeared on the market. DVDs have a storage capacity of around 4.7 GB and, compared with video CDs, can record video images with vastly improved image quality (due to the increase in data used per unit playback time) and can greatly improve the maximum playback time. More specifically, while the maximum playback time of a video CD is 74 minutes, a playback time of two hours or more is possible with a DVD.

In this way, DVD is well suited for use as a recording medium for movies which, due to their long playback time and high image quality, cannot be recorded on video CDs.

For movie titles, it is common for several versions of the same movie to exist, due to classifications based on the content of the movie. As examples, language classifications can lead to the production of an English version, a Japanese version and a French version, rating classifications can lead to the production of an adult version and general release version, and other classifications can lead to the production of an uncut version and a cut version, or the production of a general release version and a television broadcast version.

For a movie title classified in this way, not all of the system streams of video information, audio information and sub-picture information for the adult version will differ from those composing the general release version. The adult version can be composed by linking system streams that are common to the general release version and the adult version to system streams that are exclusive to the adult version. Similarly, the general release version can be composed by linking system streams common to general release version and the adult version to system streams that are exclusive to the general release version. To do so, system stream reproduction control information is produced to determine the reproduction order of system streams in each version.

As one example, when the different versions are namely an English version, a Japanese version, and a French version, menus in the respective languages for display to the viewer of the multimedia optical disc are provided, in addition to the system stream reproduction control information for the different versions of the movie. In such a case, the menus that are produced for each language are called menu language units, with the multimedia optical disc producer generating scripts for the system stream reproduction control information that decides the reproduction order of system streams for the menus generated for each menu language unit.

FIGS. 1 through 4 show examples of the scripts in the system stream reproduction control information for the menus of a movie title for which three versions (English, French, and Japanese) are provided as the different language versions.

With a conventional video CD, it is not possible to record movie titles that provide multi-language support on a single disc due to the limited storage capacity. As a result, it has not been necessary to generate the complicated system stream reproduction control information described above.

The script for the reproduction control information will be described in more detail in the embodiments section of this specification, though it should be noted here that it is necessary for the producer of a multimedia optical disc to produce all of such scripts one by one. There are also restrictions within DVD standards which mean that certain kinds of script cannot be recorded on a DVD. As one example, the number of video title set menus "3" of "VTSM_LU_NS3" on line 3 of FIG. 1 can be set up to "139", with it not being possible to record a number of language versions that exceeds this number. There are also cases where after specifying the language types, menus in other languages are generated. Accordingly, the generation of scripts in order with consideration to the various restrictions is an extremely complex and time-consuming task for multimedia optical disc producers. Also, should the producer mistakenly neglect the restrictions when generating scripts and produce the unsuitable system stream reproduction control information, a large amount of time and effort will be needed to correct the generated scripts.

SUMMARY OF THE INVENTION

It is an object of the present invention to provide a system stream reproduction control information editing apparatus that can quickly and easily generate scripts for system stream reproduction control information that decides the reproduction route of system streams that are recorded on a multimedia optical disc and that include image information, the system stream reproduction control information editing apparatus visually displaying the linked state of system streams to the editor and preventing the user from making logical errors or violating the restrictions of DVD-VIDEO standard.

The stated object can be achieved by a system stream reproduction control information editing apparatus for editing system stream reproduction control information that includes a reproduction route for system streams that are recorded on a multimedia optical disc and contain image information, the reproduction route including a selective reproduction period during which one or a plurality of system streams is selected for reproduction, the system stream reproduction control information editing apparatus including: a template information storage unit for storing a template used for generating the system stream reproduction control information, the template being composed of predetermined scripts and at least one parameter, one of the scripts defining a reproduction route construction of the selective reproduction period, and one of the parameters indicating a number of system streams that can be selectively reproduced during the selective reproduction period; a display unit for displaying a plurality of windows for editing the system stream reproduction control information; an operation receiving unit for receiving an operation made by an editor in the windows displayed by the display unit; and an editing control unit for editing the system stream reproduction control information by setting the parameters in the template stored in the template information storage unit based on the operation received by the operation receiving unit.

With the stated construction, the editor can look at the windows displayed on the display unit that form the GUI (Graphic User Interface) for editing the system stream reproduction control information, and make editing operations for the system stream reproduction control information via the operation receiving unit, such as by making mouse operations in the displayed windows. Based on these operations, the editing control unit edits the system stream reproduction control information by setting the appropriate parameters in the template for generating system stream reproduction control information stored in the template information storing unit, using character strings that express data for DVD-VIDEO standard. In this way, the system stream reproduction control information is edited.

As a result, a large reduction in the time required by the editor to edit the system stream reproduction control information can be achieved, thereby improving the efficiency with which the task can be performed.

Here, the editing control unit may include: a window information storage unit for storing window information that includes a display content of each of the plurality of window displayed by the display unit; a display control unit for reading the window information from the window information storage unit and having a window displayed by the display unit in accordance with the read window information; an operation interpreting unit for interpreting the operation received by the operation receiving unit and instructing the display control unit to have a window displayed in accordance with an interpreting of the received operation; an editing information storage unit for storing information that is necessary for editing the system stream reproduction control information, in accordance with the interpreting of the operation; and a reproduction control information editing unit for reading the information stored in the editing information storage unit and editing the system stream reproduction control information by setting the parameters in the template stored in the template information storage unit.

With the stated construction, the operation interpreting unit makes sure that the appropriate window is displayed after an editor's operation has been received, and the information (used as the key) which is necessary for editing of the system stream reproduction control information is stored in accordance with the received operations. The reproduction control information editing unit uses the key information to set the parameters in the template and so edit the system stream reproduction control information. As a result, the editor is freed from the complicated task of editing the system stream reproduction control information.

Here, the operation interpreting unit may include a first window display indicating unit for instructing the display control unit to display a first window for inputting a number of system streams that can be selectively reproduced during the selective reproduction period, the operation receiving unit may include a number of system streams receiving unit for receiving an input of the number of system streams that can be selectively reproduced during the selective reproduction period made via the first window displayed on the display unit, and the editing information storage unit may store the number of system streams that can be selectively reproduced during the selective reproduction period in accordance with an interpreting by the operation interpreting unit.

Here, the window information storage unit may store icon information for icons that are to be displayed in a window as a part of the window information, the icons corresponding to system streams, the operation interpreting unit may further include a second window display indicating unit which, when the number of system streams receiving unit has received the input of the number of system streams that can be selectively reproduced during the selective reproduction period, instructs the display control unit to display a second window that has an editing area for editing the reproduction route of the system streams, the second window displaying the icons that correspond to the system streams to display a part of the reproduction route being edited by the editor, the operation receiving unit may further include a reproduction route receiving unit for receiving a drag operation that moves a moved icon to a predetermined position in the editing area of the second window displayed by the display unit, and the operation Interpreting unit may further include: a system stream linking unit for linking the system streams in accordance with a position of the moved icon after the drag operation is received by the reproduction route receiving unit, wherein a linking of system streams equates to generation of linking information for system streams, the linking information forms the reproduction route, and the editing information storage unit stores the linking information that results from the linking of system streams related to icon positions of icons corresponding to the linked system streams; and a reproduction route display indicating unit for instructing the display control unit to display the icons in the editing area linked together to visually represent the reproduction route of the system streams linked by the system stream linking unit, wherein the display control unit displays the icons in the editing area linked together.

With the stated construction, the icons corresponding to the system streams are displayed linked together in the editing area of the windows, so that the editor can see at a glance how the system streams are presently linked together. As a result, the edited system stream reproduction control information can be visually confirmed by the editor.

Here, the operation receiving unit may further include an editing operation receiving unit for receiving an editing indication for the system stream reproduction control information, and the reproduction control information editing unit may read the template stored in the template information storage unit and edit the system stream reproduction control information by setting the parameters in the read template, in accordance with the number of system streams and the reproduction route stored corresponding to icon positions stored in the editing information storage unit.

With the stated construction, the editor is freed from the complicated task of editing the system stream reproduction control information, and a fixed part of the system stream reproduction control information is generated using the scripts in the stored template without amendment, so that simple errors in the editing operation can be avoided.

Here, the operation interpreting unit may further include: a third window display indicating unit for instructing the display control unit to display a third window that shows a list of edited objects when an operation received by the operation receiving unit is an indication to start editing, each edited object being a system stream that is selectively reproduced and is one of (a) a menu language unit for a language used in a menu and (b) one angle out of a multiangle, wherein the operation receiving unit further includes an edited object receiving unit for receiving an operation that selects one of the edited objects from the menu items displayed in the third window displayed by the display unit, and wherein when the editing object receiving unit has received a selection of a multiangle as the edited object, and the operation interpreting unit judges that a display position of the moved icon after the drag operation is within an area including the multiangle, the system stream linking unit judges that the system stream corresponding to the moved icon is included in the selective reproduction period and links the system stream as one system stream in the selective reproduction period, while when the operation interpreting unit judges that the display position of the moved icon after the drag operation is not within an area including the multiangle, the system stream linking unit judges that the system stream corresponding to the moved icon is not included in the selective reproduction period and links the system stream as a separate system stream, with the editing information storage unit storing information showing whether each system stream is included in the selective reproduction period or is a separate system stream.

With the stated construction, the system streams for image information and the like stored on the multimedia optical disc can be used in reproduction routes that have special angle blocks, with the editor being able to edit the system stream reproduction control information including control information used when the multimedia optical disc is reproduced.

Here, the operation interpreting unit may further includes: a third window display indicating unit for instructing the display control unit to display a third window that shows a list of edited objects when an operation received by the operation receiving unit is an indication to start editing, each edited object being a system stream that is selectively reproduced and is one of (a) a menu language unit for a language used in a menu and (b) one angle out of a multiangle, wherein the operation receiving unit further includes an edited object receiving unit for receiving an operation that selects one of the edited objects from the menu items displayed in the third window displayed by the display unit, wherein when the edited object receiving unit has received a selection of a menu language unit as an edited unit, the number of system streams receiving unit receives a language code of a language used in a menu after receiving the number of system streams that can be selectively reproduced during the selective reproduction period and the editing information storage unit stores the received language code in accordance with an interpreting by the operation interpreting unit, wherein the parameters in the template also include a parameter that indicates a language code, and wherein the system stream reproduction control information editing unit edits the system stream reproduction control information by selling the parameter that indicates the language code using the language code stored by the editing information storage unit.

With the stated construction, system stream reproduction control information that includes a reproduction route for a menu language unit can be edited.

Here, the editing control unit may further include: a reproduction route judging unit for judging whether a linking of a system stream according to the drag operation for an icon received by the reproduction route receiving unit causes a number of system streams in the selective reproduction period to exceed the number of system streams that can be selectively reproduced during the selective reproduction period; and a reproduction route linking prohibiting unit for prohibiting a linking of the system stream by the system stream linking unit, when a judgement by the reproduction route judging unit is positive.

With the stated construction, the linking of system streams is prohibited by the reproduction route linking prohibiting unit when the editor attempts to link a number of system streams in a selective reproduction period that exceeds a previously set number. As a result, logical errors in the system stream reproduction control information can be prevented.

The stated object can also be achieved by a system stream reproduction control information editing method for editing system stream reproduction control information that includes a reproduction route for system streams that are recorded on a multimedia optical disc and contain image information, the reproduction route including a selective reproduction period during which one of a plurality of system streams is selected for reproduction, the system stream reproduction control information editing method including: a first window display indicating step for indicating display of a first window for inputting a number of system streams that can be selectively reproduced during the selective reproduction period; a first display control step for reading window information for the first window from a window information storage unit that stores window information including a display content of each or a plurality of windows, and having the first window displayed on the display screen; a number of system streams receiving step for receiving an input of the number of system streams via the first window displayed on the display screen; a first editing information storing step for storing the number of system streams received in the number of system streams receiving step; a second window display indicating step for indicating display of a second window when the number of system streams receiving unit has received the input of the number of system strew, the second window having an editing area for editing the reproduction route of the system streams, the second window displaying icons that correspond to system streams to display a part of the reproduction route being edited by the editor, a second display control step for reading window information for the second window from the window information storage unit, the window information storage unit also storing icon information for icons that are to be displayed in the second window, and for having the second window displayed on the display screen; a reproduction route receiving step for receiving a drag operation that moves a moved icon to a predetermined position in the editing area of the second window displayed on the display screen; a system stream linking step for linking system streams in accordance with a position of the moved icon after the drag operation received by the reproduction route receiving step, wherein a linking of system streams equates to generation of linking information for system streams, and the linking information forms the reproduction route; a second editing information storing step for storing the linking information resulting from the linking of system streams by the system stream linking unit related to icon positions of icons corresponding to the system streams a reproduction route display indicating step for indicating a display of the icons in the editing area linked together to visually represent the reproduction route of the system streams linked by the system stream linking step; a third display control step for having the icons in the editing area displayed linked together to show the linking of the system streams by the system stream linking step; an editing operation receiving step for receiving an editing operation for the system stream reproduction control information; and a system stream reproduction control information editing step for reading a template for generating system stream reproduction control information from a template information storage unit that stores the template and editing the system stream reproduction control information in the read template by setting parameters in accordance with the number of system streams stored in the first editing information storing step and the linking information stored in the second editing information storing step, the template being composed of predetermined scripts and at least one parameter, and one of the parameters indicating a number of system streams that can be selectively reproduced during the selective reproduction period.

With the stated method, user operations are received and the windows for forming the GUI are successively displayed on the display screen, so that the system stream reproduction control information, that includes a reproduction route construction including a reproduction period during which one system stream is selectively reproduced, can be edited using few editing operations, with the editor being able to confirm the edited result on the display screen Here, the following steps nay be performed between the reproduction route receiving step and the system stream linking step: a reproduction route judging step for judging whether a linking of a system stream according to the drag operation for an icon received by the reproduction route receiving step causes a number of system streams in the selective reproduction period to exceed the number of system streams stored in the first editing information storing step; and a reproduction route linking prohibiting step for prohibiting linking of the system stream in the system stream linking step when a judgement by the reproduction route judging step is positive.

With the stated method, logical errors in the linking or the system streams can be avoided.

Here, the following steps may be performed before the first window display indicating step: an initial operation receiving step for receiving an commence editing operation from an editor; a third window display indicating step for indicating, when the commence editing operation has been received in the initial operation receiving step, a display of a third window that displays a list of edited objects, the edited objects being sets or at least one system stream that are selectively reproduced and each edited object being one of (a) a menu language unit for one language used in a menu, and (b) one angle out or a multiangle; and a third window display control step for reading window information for the third window from the window information storage unit and having the third window displayed on the display screen, wherein the number of system streams received in the number of system stress receiving step is a number of languages for a case when the edited objects are menu language units and is a number of angles for a case when the edited objects are angles in the multiangle.

With the stated method, system stream reproduction control information for angle blocks and menu language units on a multimedia optical disc can be easily edited.

The stated object can also be achieved by a computer-readable recording medium that is used for recording a program that is executed by a system stream reproduction control information editing apparatus that edits system stream reproduction control information including a reproduction route for system streams that are recorded on a multimedia optical disc and contain image information, the reproduction route including a selective reproduction period during which one of a plurality of system streams is selected for reproduction, the program including the following steps: a first window display indicating step for indicating display of a first window for inputting a number of system streams that can be selectively reproduced during the selective reproduction period; a first display control step for reading window information for the first window from a window information storage unit that stores window information including a display content of each of a plurality of windows, and having the first window displayed on the display screen, a number of system streams receiving step for receiving an input of the number of system streams via the first window displayed on the display screen; a first editing information storing step for storing the number of system streams received in the number of system streams receiving step: a second window display indicating stop for indicating display of a second window when the number of system streams receiving unit has received the input of the number of system streams, the second window having an editing area for editing the reproduction route of the system streams, the second window displaying icons that correspond to system streams to display a part of the reproduction route being edited by the editor; a second display control step for reading window information for the second window from the window information storage unit, the window information storage unity also storing icon information for icons that are to be displayed in the second window, and for having the second window displayed on the display screen; a reproduction route receiving step for receiving a drag operation that moves a moved icon to a predetermined position in the editing area of the second window displayed on the display screen; a system stream linking step for linking system streams in accordance with a position of the moved icon after the drag operation received by the reproduction route receiving step, wherein a linking of system streams equates to generation of linking information for system streams, and the linking information forms the reproduction route; a second editing information storing step for storing the linking information resulting from the linking of system streams by the system stream linking unit related to icon positions of icons corresponding to the system streams; a reproduction route display indicating step for indicating a display of the icons in the editing area linked together to visually represent the reproduction route of the system streams linked by the system stream linking step; a third display control step for having the icons in the editing area displayed linked together to show the linking of the system streams by the system stream linking step; an editing operation receiving step for receiving an editing operation for the system stream reproduction control information; and a system stream reproduction control information editing step for reading a template for generating system stream reproduction control information from a template information storage unit that stores the template and editing the system stream reproduction control information in the read template by setting parameters in accordance with the number of system streams stored in the first editing information storing step and the linking information stored in the second editing information storing step, the template being composed of predetermined scripts and at least one parameter, and one of the parameters indicating a number of system streams that can be selectively reproduced during the selective reproduction period.

Here, the program may further include the following steps to be performed before the first window display indication step: an initial operation receiving step for receiving an commence editing operation from an editor; a third window display indicating step for indicating, when the commence editing operation has been received in the initial operation receiving step, a display of a third window that displays a list of edited objects, the edited objects being sets of at least one system stream that are selectively reproduced and each edited object being one of (a) a menu language unit for one language used in a menu, and (b) one angle out of a multiangle; and a third window display control step for reading window information for the third window from the window information storage unit and having the third window displayed on the display screen, wherein the number of system streams received in the number of system streams receiving step is a number of languages for a case when the edited objects are menu language units and is a number of angles for a case when the edited objects are angles in the multiangle.

With the stated construction, the same effects as the present system stream reproduction control information editing apparatus can be achieved using a personal computer that does not have a function for editing system stream reproduction control information.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIGS. 1 through 4 show examples of scripts for system stream reproduction control information for title menus;

FIG. 16 shows the attributes of the "SampleDisc" window stored in the window information storage unit of the present embodiment;

FIG. 17 shows the attributes of the icons that are displayed in the "SampleDisc" window stored in the window information storage unit or the present embodiment;

FIG. 18 shows a template for the script information for the menu language units that is stored in the script information storage unit of the present embodiment;

FIG. 25 shows the video title set attribute table stored in the input data storage unit of the present embodiment;

FIG. 26 shows the attribute table for the menu language units stored in the input data storage unit of the present embodiment;

FIG. 27 shows the PGC attribute table stored in the input data storage unit of the present embodiment;

FIGS. 35 through 43 show templates of script information for angle blocks stored in the script information storage unit of the system stream reproduction control information editing apparatus of the second embodiment of the present invention;

FIG. 47 shows a property window for setting the attributes of system streams in the present embodiment;

FIG. 48 shows the attribute table of an angle block stored in the input data storage unit of the present embodiment;

FIG. 49 shows the attribute table for system stream icons stored in the input data storage unit of the present embodiment:

FIGS. 50 through 55 show "script information" outputted as the system stream reproduction control information;

DESCRIPTION OF THE PREFERRED EMBODIMENT

The following is an explanation of the system stream reproduction control information editing apparatus of the present invention based on two embodiments. Before commencing the explanation of the embodiments, the logical construction of applications recorded onto multimedia optical discs will be described. In this specification, the unit for applications is given as a "title". When, an application is a movie, for example, each title represents one movie, so that a multimedia optical disc that stores three titles has three movies recorded onto it. Here, "title" is high-order concept, with a "title set" being a collection of titles that share the same image information. As one example, when there are three versions of the same movie, such as a no-cut version, a general release version, and a television broadcast version, these versions will mainly be composed of the same image information and will collectively be referred to as one title set.

The multimedia optical disc used in the present embodiments is capable of recording a plurality of title sets. As one example, a no-cut version and a general release version may be recorded for each of three movies A, B, and C, so that three title sets that are each composed of two titles are recorded on the disc. Each title is composed of scenes and reproduction route information for scenes. Each scene includes image information and audio information. The reproduction route information for scenes includes reproduction order information that contains branches, with sets of reproduction route information for continuous reproduction with no branches being called a set of "program chain information" in the present specification. By linking sets of such sets of program chain information, the reproduction route information for the entire title set is formed.

The following is a description of the data format of the multimedia optical disc. Here, FIGS. 5 to 11 mainly show the information that is required to achieve the present invention, with other information having been omitted.

Figure 5:
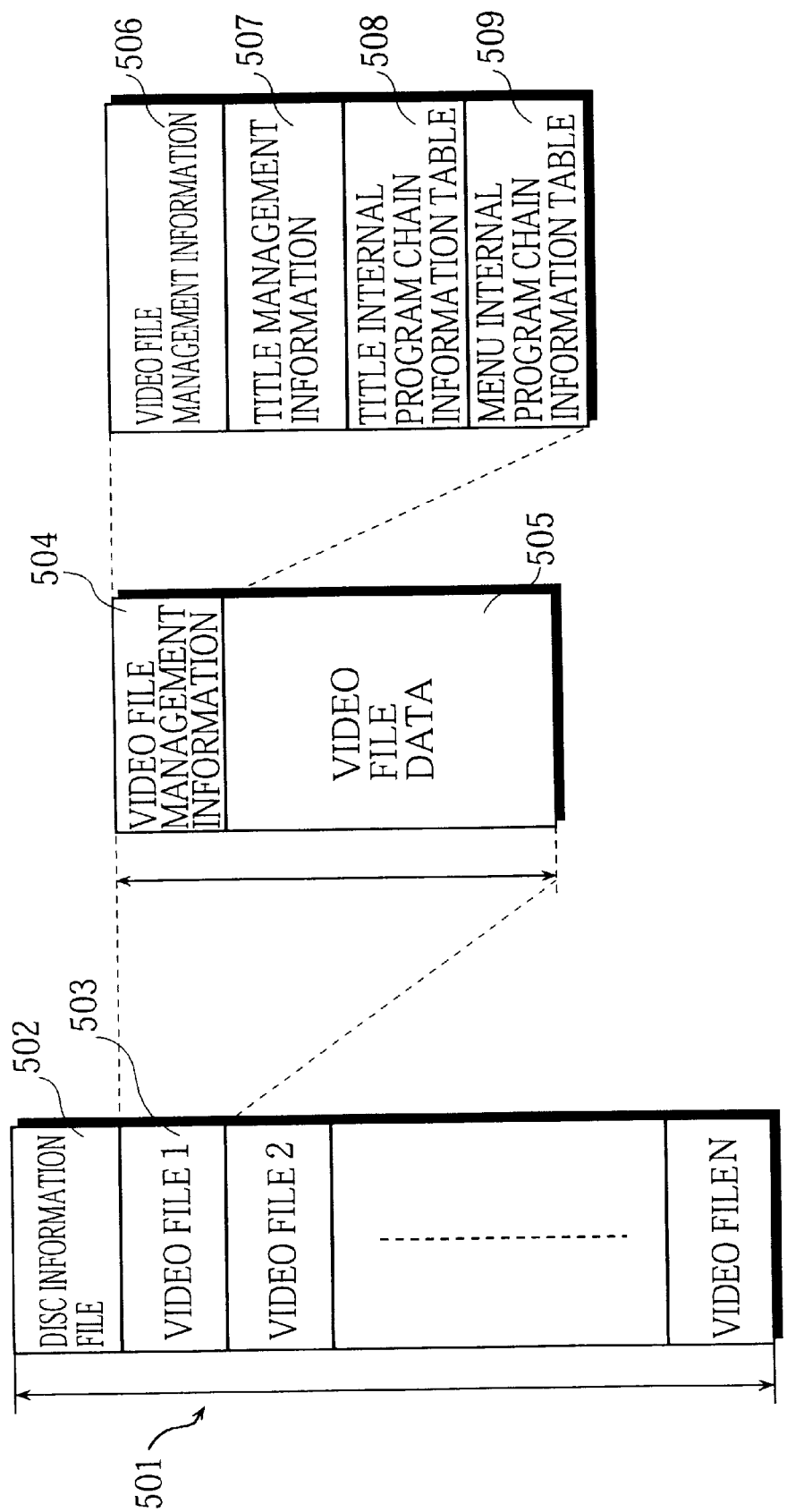
FIG. 5 shows the data format of the recording information recorded on a multimedia optical disc.

FIG. 5 shows the data construction of the recording information that is recorded onto the multimedia optical disc. The recording information 501 is composed of a disc information file 502 and a plurality of video files 503. The disc information file 502 includes volume information that is information relating to the entire multimedia optical disc, in addition to menu information for allowing the user to select a title set when reproduction of the multimedia optical disc is commenced.

The video files 503 each include a title set. Each video file 503 is composed of video file management information 504 and video file data 505, with the video file data 505 including the Image information, audio information, and sub-picture information for all of the scenes that compose the title set.

The video file management information 504 is composed of a video file management table 506, title management information 507, a title internal program chain information table 508, and a menu internal program chain information table 509. The video file management table 506 includes header information for the video file 503. The title management information 507 includes information for managing the plurality of titles that compose the title set. The title internal program chain information table 508 includes information that defines all of the program chain information in the titles in the title set. The menu internal program chain information table 509 includes information that defines all of the program chain information for menus in the title set. It should be noted here that in the embodiments, sets of program chain information will be referred to as sets of system stream reproduction control information or as PGCs.

Figure 6:
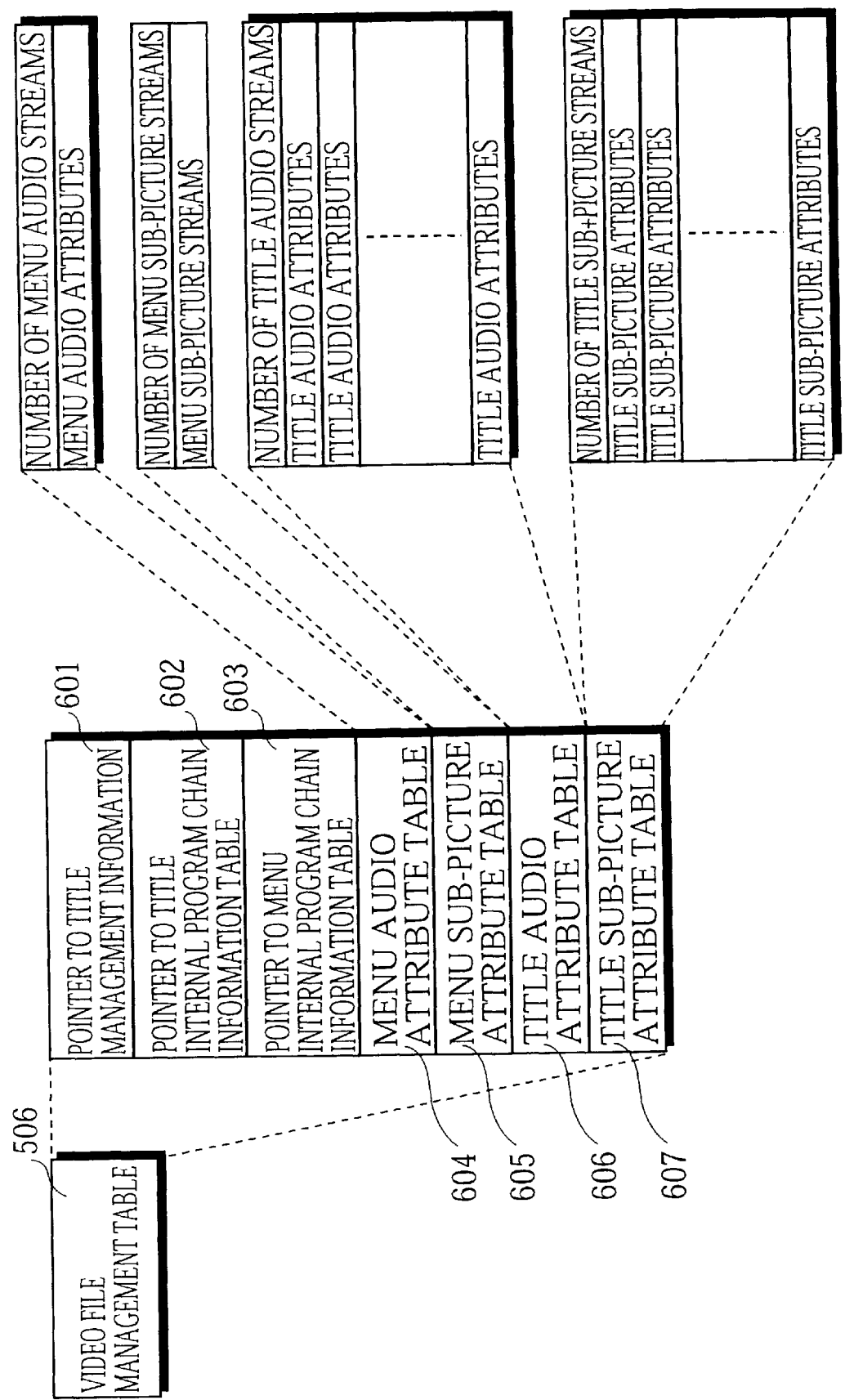
FIG. 6 shows the composition of the video file management table.

FIG. 6 shows the construction of the video file management table 506. As shown in FIG. 6, the video title management table 506 includes a pointer 601 to the title management information 507, a pointer 602 to the title internal program chain information table 508, a pointer 603 to the menu internal program chain information table 509, a menu audio attribute table 604, a menu sub-picture attribute table 605, a title audio attribute table 606, and a title sub-picture attribute table 607.

The menu audio attribute table 604 includes the number of audio streams used in menus and gives the attributes of the audio streams. The menu sub-picture attribute table 605 includes the number of sub-picture streams used in menus and gives the attributes of the sub-picture streams. In the same way, the title audio attribute table 606 includes the number of audio streams used in titles and gives the attributes of the audio streams. The title sub-picture attribute table 607 includes the number of sub-picture streams used in titles and gives the attributes of the sub-picture streams.

Figure 7:
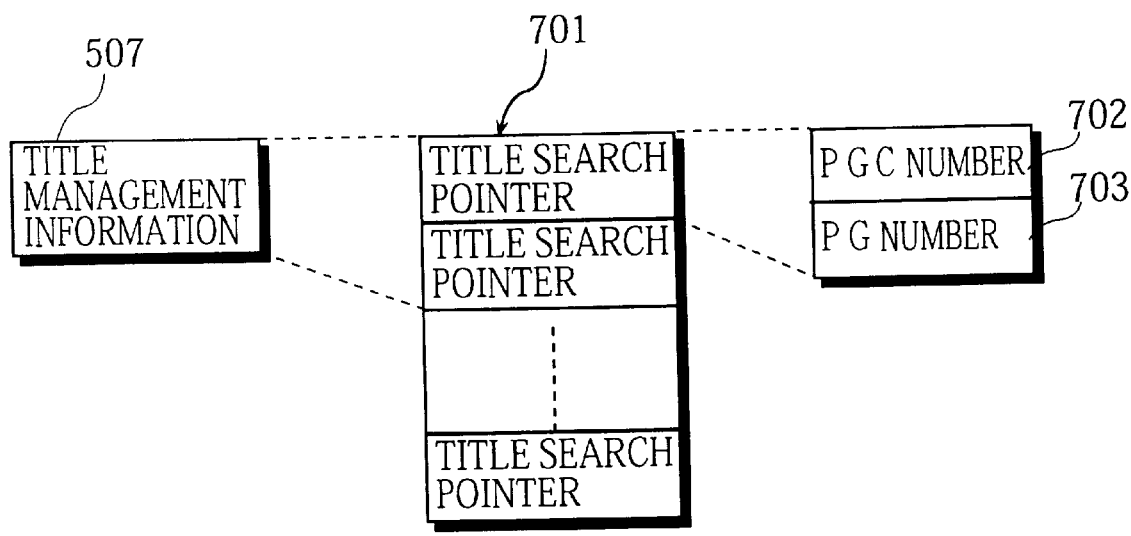
FIG. 7 shows the composition of the title management information.

FIG. 7 shows the composition of the title management information 507. The title management information 507 is a table of pointers 701 for searching the titles included in the video files at high speed. Each pointer 701 of title search pointers includes a PGC number 702, which is a number identifying a set of program chain information, and PG numbers 703, which are the numbers of the programs that compose the program chain, as the information for searching the titles.

Figure 8:
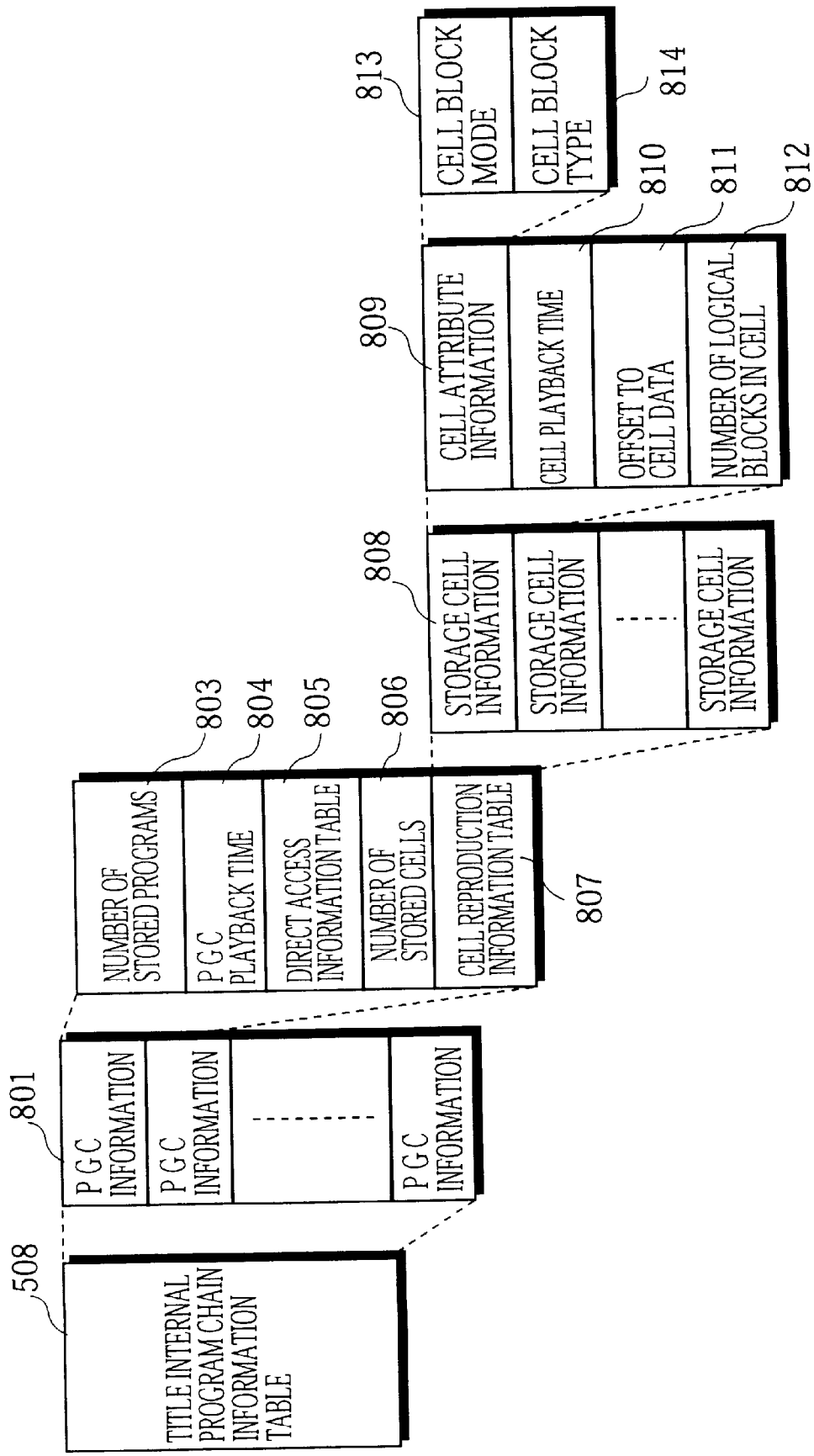
FIG. 8 shows the data construction of the title internal program chain information table.

FIG. 8 shows the data construction of a title internal program chain information table (note that program chain information is also referred to as system stream reproduction control information or PGC). This title internal program chain information table 508 is composed of a plurality of entries 801 of program chain information that each define a set of program chain information in a title set. Each entry of program chain information 801 is composed of a number of stored programs 803, a PGC playback time 804, direct access information table 805, a number of stored cells 806, and a cell reproduction information table 807.

Each cell reproduction information table 807 is composed of at least one entry of storage cell information 808, with each entry of storage cell information 808 being composed of cell attribute information 809, cell playback time 810, an offset 811 to the cell data stored in the video file data, and a number of logical blocks 812 taken up by the cell data. Each entry of cell attribute information 809 includes a cell block mode 813 and a cell block type 814. The cell block mode 813 shows whether the present cell forms a multiangle block, and when so, shows the start of the block, the end of the block and other information. The cell block type 814 includes information showing whether the present block is included in a multiangle block. The corresponding system stream reproduction control information 508 has reproduction performed in the order given in the cell reproduction information table 807.

Figure 9:
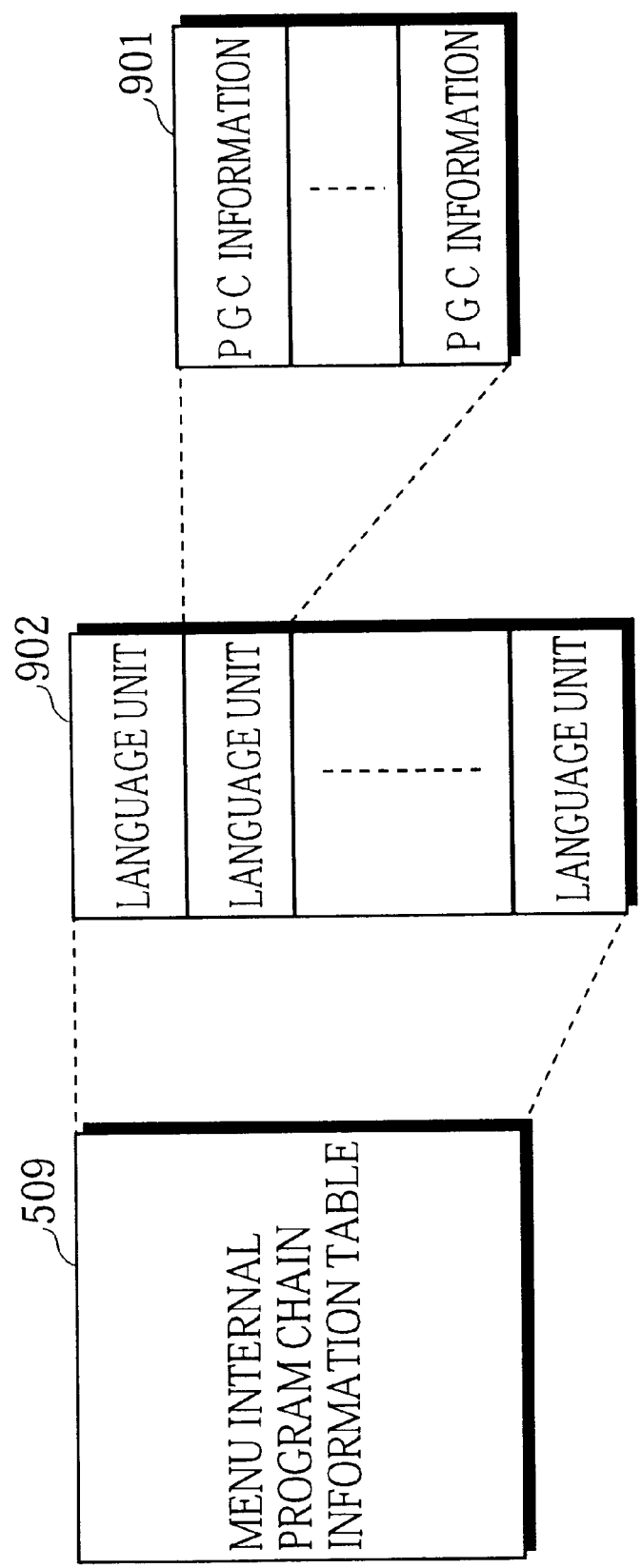
FIG. 9 shows the data construction of the menu internal program chain information table.

FIG. 9 shows the data construction of a menu internal program chain information table. Multimedia optical discs can often have different menus for each of a plurality of languages, so that program chain information 901 for each language is recorded in the menu internal program chain information table 509 as a group called a menu language unit 902. Each set of PGC information 901 has the same content as the sets of PGC information 801 in the title internal program chain information table shown 508 in FIG. 8.

Figure 10:
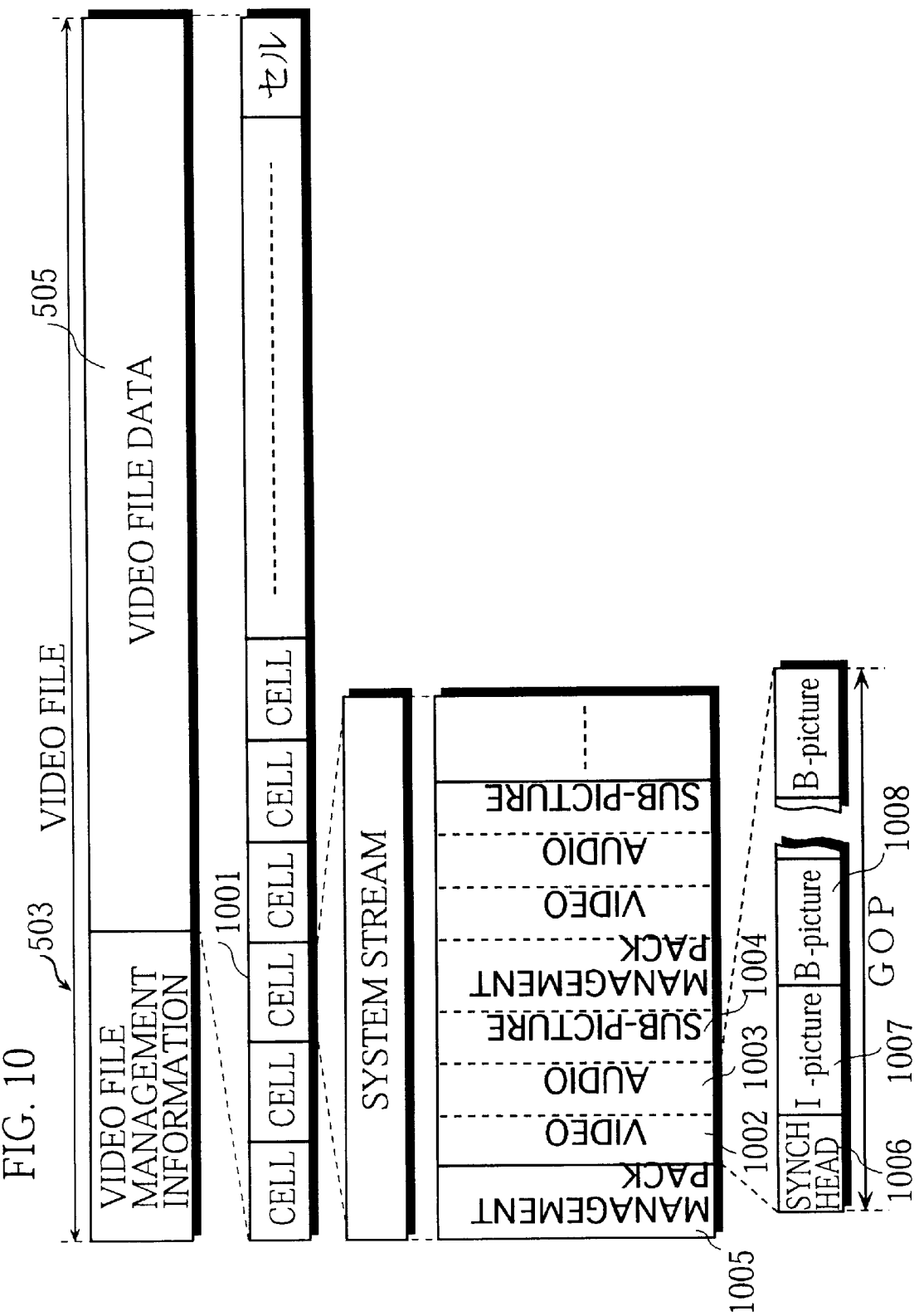
FIG. 10 shows the data construction of video file data.

FIG. 10 shows the data construction or the video file data 505. As shown in FIG. 10, each set of video file data 505 is composed of a plurality of system streams. In the present embodiment, these system streams are referred to as cells 1001. Each cell 1001 has a 2 KB block set as one pack, and has a construction where video information 1002, audio information 1003, sub-picture information 1004, and management information (management pack) 1005 are interleaved. The video information 1005 is composed of A unit called a "Group of Pictures (GOP)" that is used when compressing and decompressing video data across frames. This GOP is the smallest unit for which reproduction can be controlled. Management information 1005 is interleaved for each GOP unit as a management pack positioned in front of the GOP. Each management pack 1005 is composed of search information for accessing the corresponding GOP and also includes information called highlight information that is used as menu information. It should be noted that the GOP unit of the video information 1002 represents an amount of data for 12–15 pictures in frame mode, and is composed of a seek head 1006, an I-picture 1007, and a plurality of B-pictures 1008.

Figure 11:
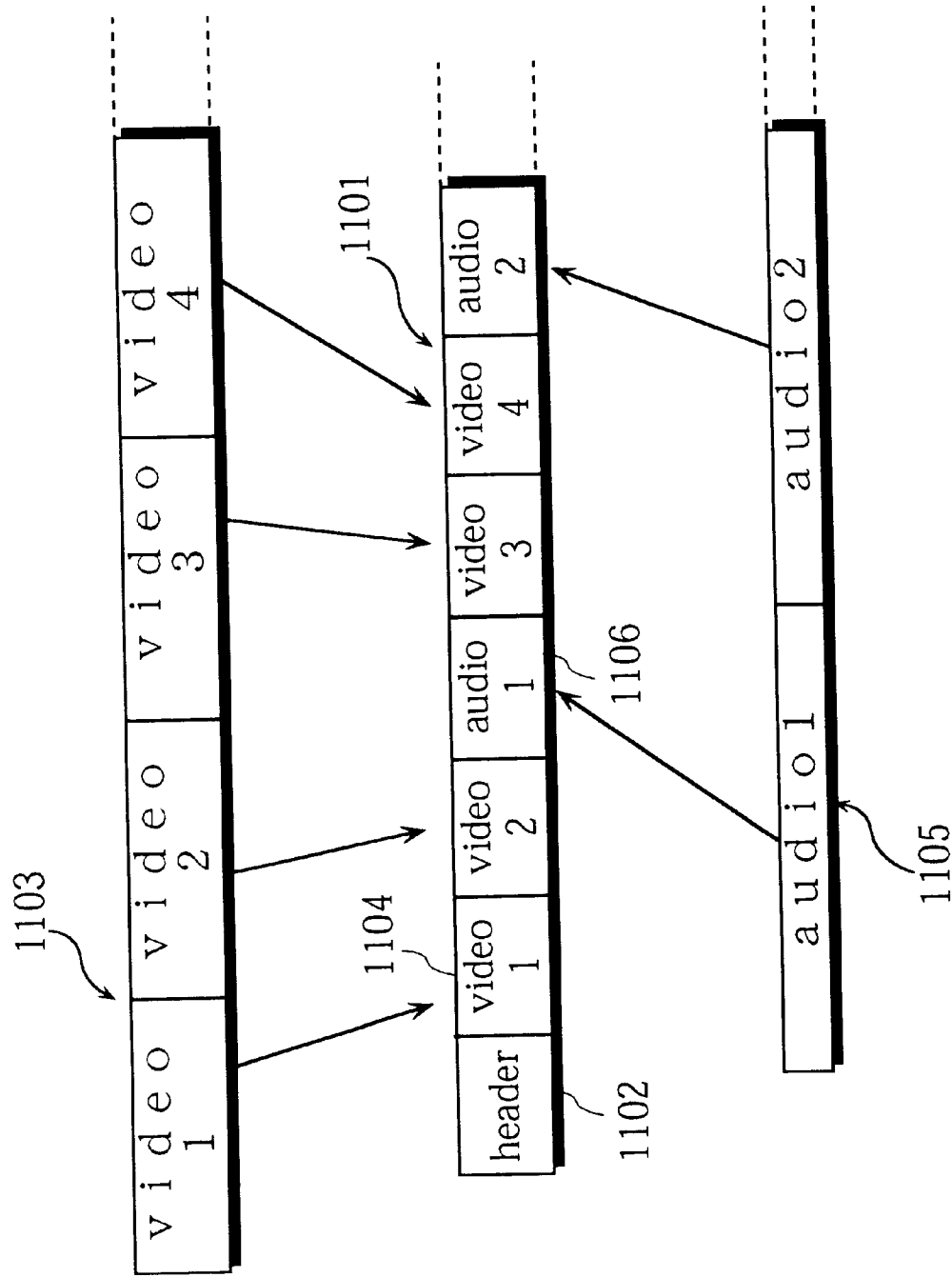
FIG. 11 shows a system stream.

FIG. 11 shows a system stream. The system stream 1101 is composed of a header 1102 that is management information, sets of video data 1104 that are included in a video date sequence 1103, and sets of audio data 1106 that are included in an audio sequence 1105, with these different sets of data being interleaved together. It should be noted here that while the example of a system stream shown in FIG. 11 includes both video data and audio data that have been interleaved together, system streams may only include audio data 1106.

This completes the description of the data format of the recording information 501 that is recorded onto a multimedia optical disc and is subjected to editing by the system stream reproduction control information editing apparatuses of the following embodiments The following is a description of the multiangle and parental lock features that can be provided for such a multimedia optical disc.

Figure 12:
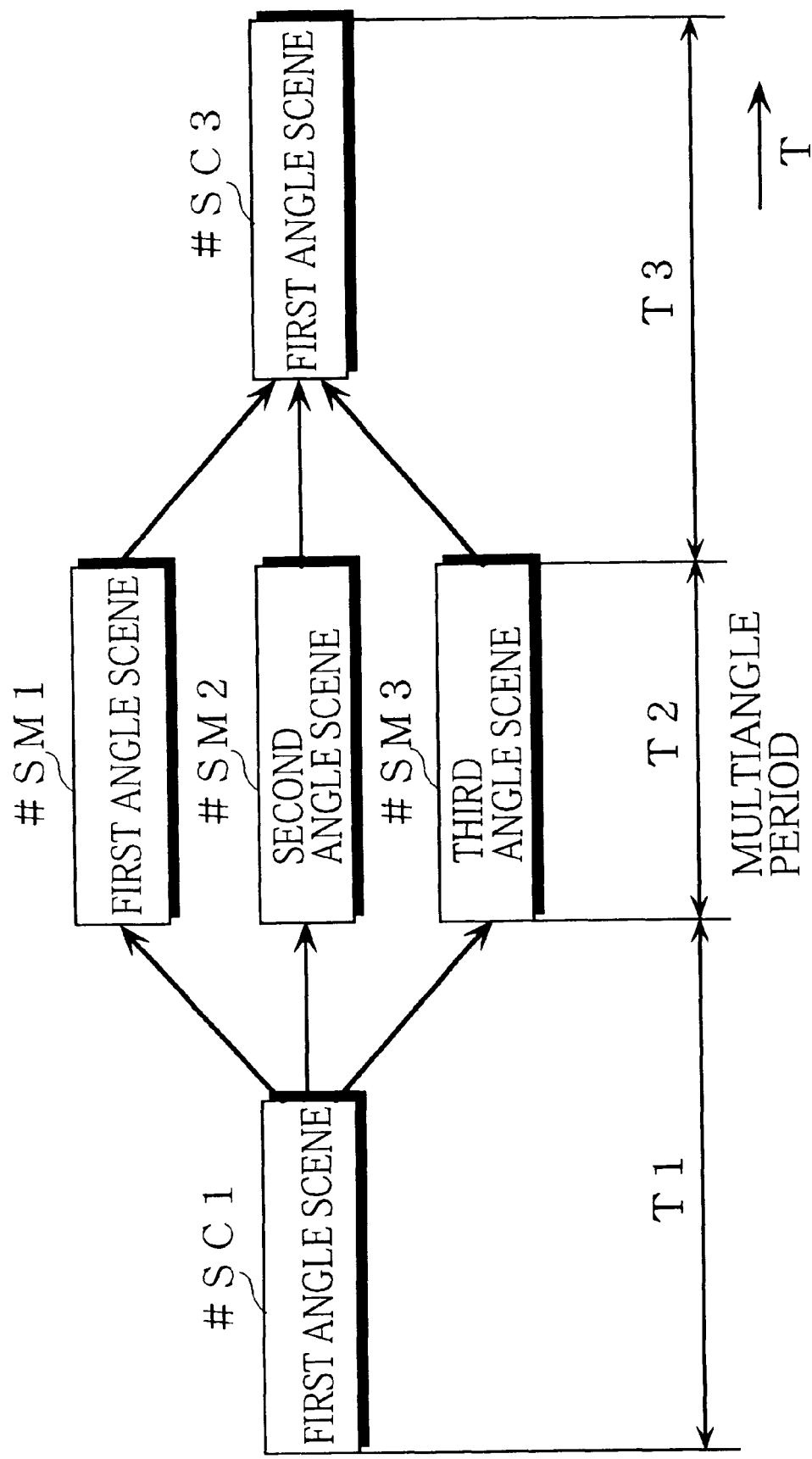
FIG. 12 shows a representation of multiangle control.

FIG. 12 shows a representation of multiangle control. Normally, images in a multiangle title are obtained by recording images and sound (hereinafter, "filming") for the subject for the duration of time T. In FIG. 12, #SC1, #SM1, #SM2, #SM3, and #SC3 represent multiangle scenes that have been obtained for the filming unit times T1, T2, and T3 where the subject is filmed at predetermined camera angles. The scenes #SM1, #SM2, and #SM3 are scenes that were each shot during the filming unit time T2 from a plurality (called respectively "first", "second" and "third") of different camera angles, and are hereafter referred to as the first, second, and third multiangle scenes.

In the present example, a "multiscene" is described as being composed of scenes where the subject was simultaneously filmed at different angles, although the scenes composing the multiscene may instead be scenes that were filmed at different times from the same angle, or even data for forming computer graphics. This is to say, a "multiangle scene period" in the present embodiment is a multiscene period, and is not restricted to scene data that has been obtained from different camera angles. Instead, multiscenes are simply combinations of scenes with the same filming unit time where one of the scenes is selectively reproduced.

Scene #SC1 and #SC3 are scenes that have been filmed with the same base camera angle during the filming unit times T1 and T3, which is to say the time periods before and after the multiangle scene. Hereinafter, scenes filmed at this angle will be referred to as "base angle scenes". In general, one of the scenes in a multiangle period will be a base angle scene.

The following is an explanation of the interrelationships of the scenes described above for the example of a baseball broadcast. Here, the base camera angle scenes #SC1 and #SC3 scenes that are filmed with a camera located behind center field focusing on the pitcher, batter, and catcher. The first multiangle scene #SM1 is filmed with a camera located behind the back net focusing on the pitcher, batter, and catcher as the first multicamera angle. The second multiangle scene #SM2 filmed with a camera located behind center field focusing on the pitcher, batter, and catcher, or in other words, at the base camera angle. This means that the second multiangle scene #SM2 is the base camera angle scene #SC2 during the filming unit time T2. Finally, the third multiangle scene #SM3 is filmed with a camera located behind the back net focusing on the entire infield as the third multicamera angle.

The multicamera angle scenes #SM1, #SM2, and #SM3 each relate to the filming unit time T2, and so have overlapping presentation times. This overlapping period is called a multiangle period. During a multiangle period, a viewer can freely select any of the multiangle scenes #SM1, SM2, and #SM3, and so enjoy what appears as a switching of camera angle from the base camera angle to the viewer's desired angle. It should be noted here that while in FIG. 12 there appears to be a time gap between the base camera angle scenes #SC1 and #SC3 and each of the multiangle scenes #SM1, #SM2, and #SM3, there is in fact no such gap with the arrows in the figure merely being used to indicate the various reproduction routes that are possible due to the selection of different multiangle scenes.

It should be noted here that the "multiangle" reproduction function described here is a technique for dynamically changing the content of a same title by having the user selecting a scene in a multiscene period freely and in real time.

Figure 13:
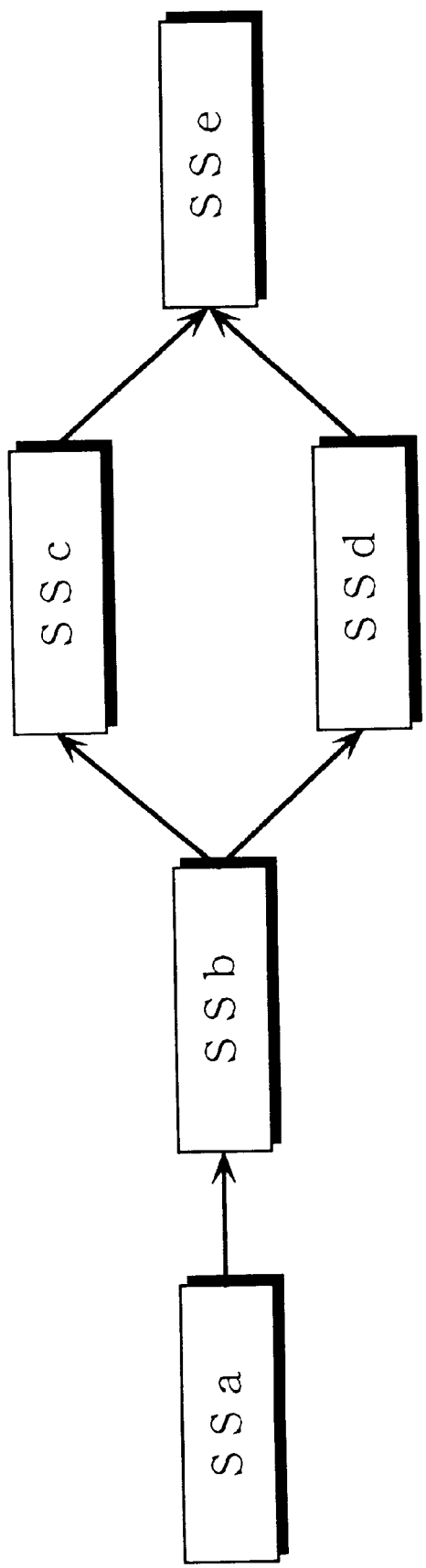
FIG. 13 shows an example of a multi-rated title stream based on a parental lock.

FIG. 13 shows an example of A multi-rated title stream based on a parental lock.

The following is an explanation of a "multititle" which is a combination of a parental lock version and a director's cut version of a same title. When a title contains scenes, such as scenes containing sex or violence, that are aimed at an adult audience and are not suitable for minors, the title can include system streams SSa, SSb, and SSe that are common to both versions, in addition to an adult-oriented system stream SSc including adult scenes and a minor-oriented system stream SSd including scenes produced for minors. This kind of title stream can be achieved by arranging the adult-oriented system stream SSc and the minor-oriented system stream SSd between the shared system streams SSb and SSe as a multiscene system stream.

The following is a description of the relation between the system streams given in the program chain information of the title stream described above and each of the titles. In the program chain PGC1 for the adult-oriented title, the shared system streams SSa, SSb, the adult-oriented system stream SSc, and the shared system stream SSe are given in that order. Conversely, in the program chain PGC2 for the minor-oriented title, the shared system streams SSa, SSb, the minor-oriented system stream SSd, and the shared system stream SSe are given in that order.

As described above, a title with an adult-oriented content or a title with a minor-oriented content can be reproduced by arranging the adult-oriented system stream SSc and the minor-oriented system stream SSd into a multiscene, and, depending on the PGC used, having the adult-oriented system stream SSc or the minor-oriented system stream SSd reproduced after the shared system streams SSa and SSb and before the shared system streams SSe. In this way, a method called a "parental lock", where one out of a plurality of titles that contain different scenes is selectively reproduced out or fundamentally the same title stream, can be achieved by providing a multiscene period made up of a plurality of substitute scenes in the title stream, with one scene being selected beforehand for reproduction out of each multiscene period.

The name "parental lock" reflects parents' wishes to protect their children from material that they consider unsuitable for minors, although in terms of the required system stream processing, it involves the selection beforehand of one scene to be reproduced out of each multiscene period, and so is a technique where statically different title stream are produced.

Using the parental lock technique, it is also possible to edit the title stream in what is called the "director's cut". As one example, when reproducing a title such as a movie with a long playback time on a passenger airplane, it may not be possible to reproduce the entire movie within the flight time, unlike when the movie is shown at a movie theater. To avoid such problems, the title producer, or in other words the "director", will need to select the scenes which may be cut from the movie to shorten the playback time. By arranging both system streams that include the cut scenes and system streams that do not include the cut scenes in a multiscene period, the movie can be reproduced in accordance with the director's wishes. This kind of editing is called a "director's cut".

This concludes the explanation of the multiangle and parental lock functions of a multimedia optical disc, so that the system stream reproduction control information editing apparatuses of the embodiments of the present invention will now be explained with reference to the drawings.

First Embodiment

Figure 14:
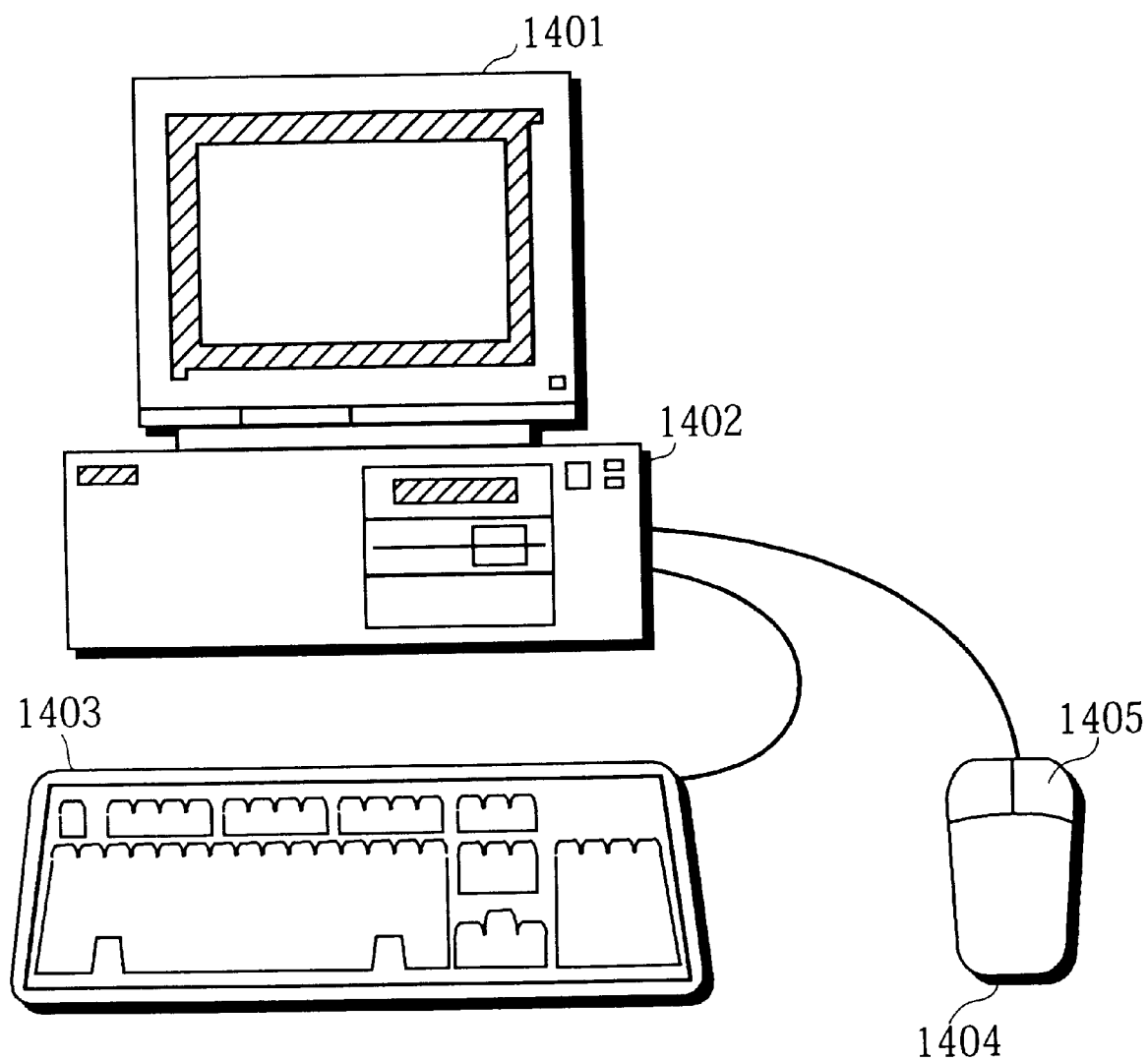
FIG. 14 shows the external appearance of the system stream reproduction information editing apparatus of the present invention.

FIG. 14 shows the external appearance of the system stream reproduction control information editing apparatus (hereinafter, simply called "editing apparatus") of the present invention. This editing apparatus is composed of a display 1401, a personal computer 1402, a keyboard 1403, and a mouse 1404.

It should be noted here that the editing apparatus of the present invention is realized by software that is executed by the personal computer 1402, so that a multimedia optimal disc producer can perform editing operations using the keyboard 1403 and the mouse 1404 while looking at a display on the display 1401.

Figure 15:
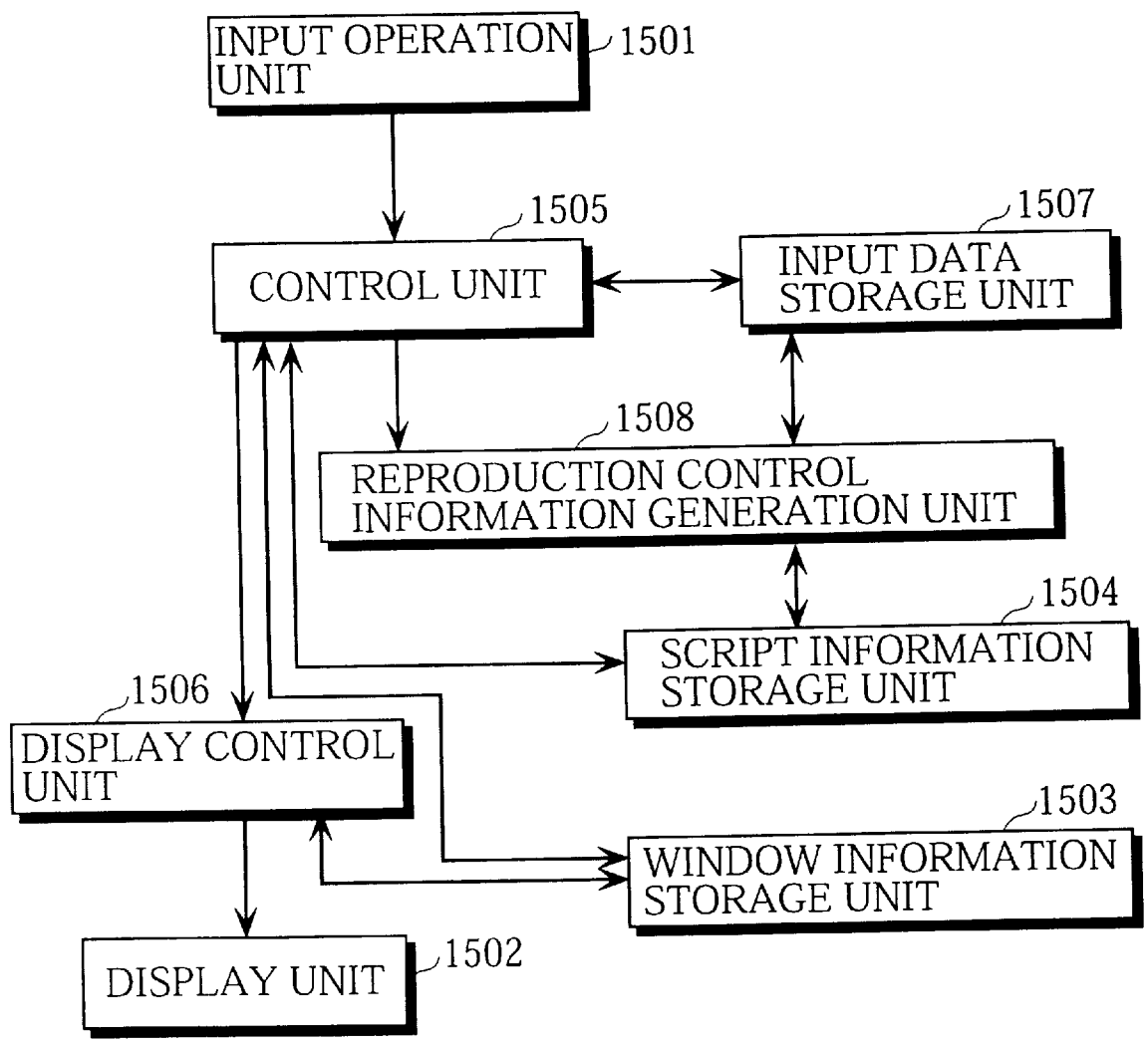
FIG. 15 shows the construction of the system stream reproduction control information editing apparatus in the first embodiment of the present invention.

FIG. 15 shows the construction of the editing apparatus of the first embodiment of the present invention. This editing apparatus generates system stream reproduction control information, which is a reproduction order for system streams of menu language units, as scripts. The present editing apparatus is composed of an input operation unit 1501, a display unit 1502, a window information storage unit 1503, a script information storage unit 1504, a control unit 1505, a display control unit 1506, an input data storage unit 1507, and a reproduction control information generation unit 1508.

Here, the expression "menu language unit" refers to the menus used for one of the languages supported by the disc. The user of the multimedia optical disc player indicates their desired language beforehand, so that during reproduction, the menus for the desired language are selected and displayed out of all of the menus provided on a multimedia optical disc.

The input operation unit 1501 can be composed of the keyboard 1403 and mouse 1404 shown in FIG. 14, and is used to receive operations made by the multimedia optical disc producer. The input operation unit 1501 informs the control unit 1505 of the content of the received operations. It should be noted here that the content of the received operations can include the coordinate position at which the mouse 1404 was double-clicked, the starting coordinate position and ending coordinate position of a drag operation mate using the mouse 1404, a click operation made using the right button 1405 of the mouse 1404, and character strings inputted via the keyboard 1403.

The display unit 1502 is composed of the display 1401 shown in FIG. 14 and can be realized by a CRT or a liquid crystal display.

The window information storage unit 1503 stores window information that includes attributes of a plurality of windows that are displayed in the "Author" window which provides a GUI (Graphic User Interface) that is displayed on the display unit 1502 of the editing apparatus, as well as the attributes of icons displayed in the various window, and default character strings to be displayed in the various windows.

FIG. 16 shows the attributes of the "SampleDisc" window which is an example window used in the present embodiment. The attributes of this "SampleDisc" window are given as the window display position 1601 and the window display size 1602. The window display position 1601 shows the (x,y) coordinates of the window where the top left corner of the "Author" window is set as (0,0), while the window display size 1602 shows the width and height of the window.

FIG. 17 shows the attributes of the icons displayed in the "SampleDisc" window". The attributes of each icon include icon bitmap data 1701, a display position 1702, and a character string 1703. The display position 1702 shows the (x,y) coordinates of the icon with the top left corner of the "SampleDisc" window being set as (0,0). The character string 1703 of an icon shows the character string that is to be displayed to the right of the icon. The character string "TitleSets" of the icon displayed at the bottom is changeable as a property of the title set.

The script information storage unit 1504 stores a template of script information for the generation of system stream reproduction control information by the reproduction control information generation unit 1508, and restrictions for DVD standards.

FIG. 18 shows the template of script information for generating the system stream reproduction control information for the menu language units in the present embodiment.

In this template of script information, the script "Video Title set menu program chain information unit table" (VTSM_PCC1_UT) 1801 shows the content of the menu program chain information table 509 that is shown in FIG. 5.

In this template, the parameter string "SX1" 1802 that is added by the reproduction control information generation unit 1508 (described later) represents the total number of menu language units 902 shown in FIG. 9. The parameter string "SX2" 1803 represents the number of a menu language units 902. The parameter string "SX3" 1804 represents the language code of the menu language unit indicated by the menu language unit number "SX2" 1803. The parameter string "SX4" 1805 represents the total number of sets of PGC information 901 that are included in the menu language unit indicated by the menu language unit number "SX2" 1803. The parameter string "SX5" 1806 represents the number of one set of PGC information 901. The script sequence 1807 shows the category of the PGC information shown by the PGC information number "SX5". The parameter string "SX6" 1808 shows whether the PGC information is a root menu "ROOTM" or a part-of-title-table menu (PTTM).

It should be noted here that the root menu is a main menu, while a part-of-title-table menu is a chapter menu that is selected from the main menu.

The parameter string "SX7" 1809 is the PGC information name attached to the set of PGC information indicated by the PCC information number "SX5".

The restrictions can be information indicating that the total number of menu language units SX1≦139, for example. The restrictions may also indicate that the total number "SX4" of sets of PGC information 901 is equal in each menu language unit.

The control unit 1505 is achieved by the CPU of the personal computer 1402 with a RAM as its work area. The control unit 1505 controls the operation of all of the units in the editing apparatus. It should be noted here that the control unit 1505 is achieved by installing a program into the personal computer 1402, with the construction of this program being described later with reference to flowcharts.

The display control unit 1506 reads the various window attributes and icon attributes stored in the window information storage unit 1503 in accordance with control by the control unit 1505 and has multiple windows, such as the "Author" window, displayed on the display unit 1502 to allow editing of the system stream reproduction control information.

The following is a description of the various windows used in the present embodiment.

Figure 19:
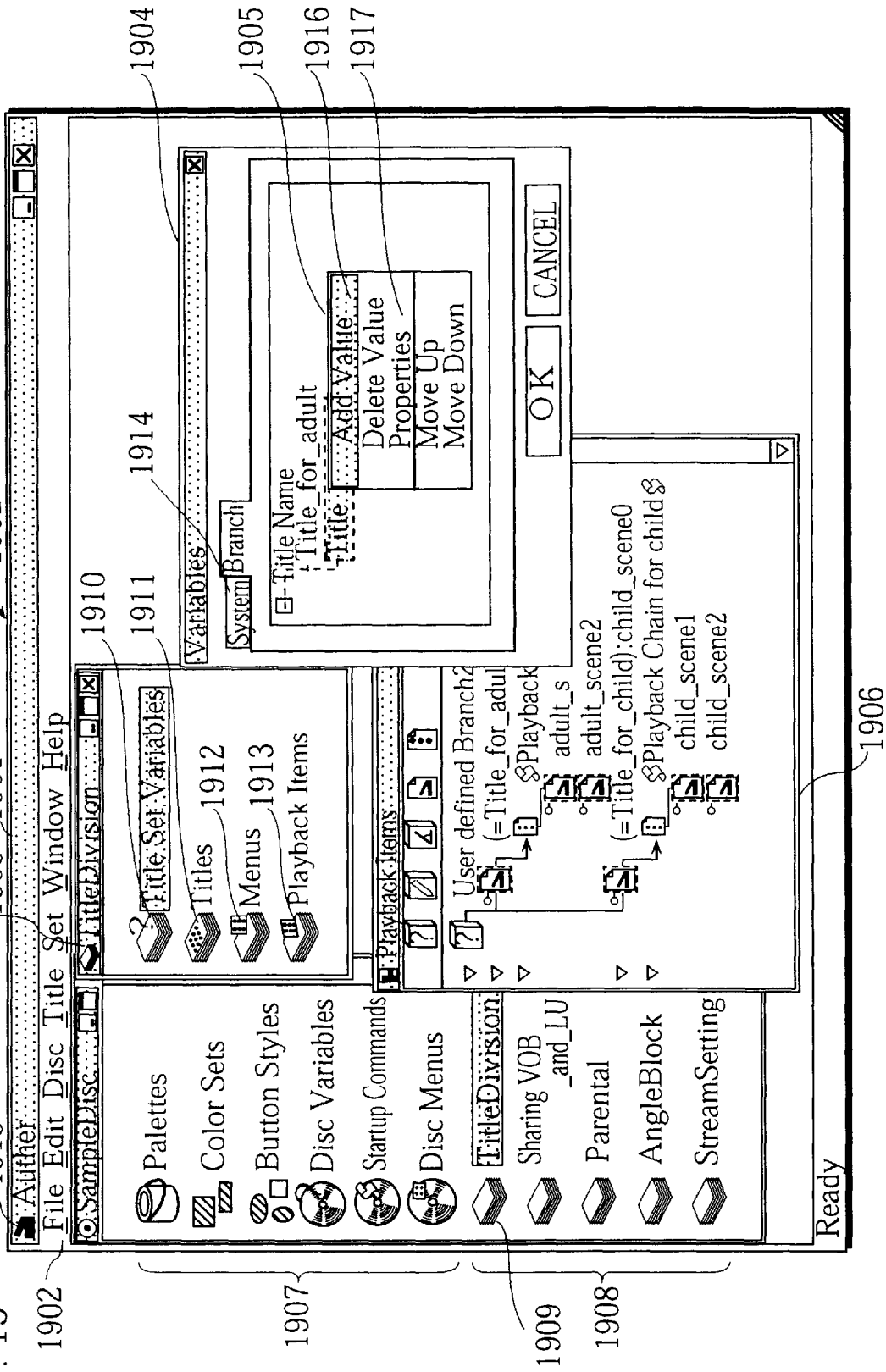
FIG. 19 shows an example of multi-windows displayed by the display unit based on control by the display control unit in the present embodiment.

FIG. 19 shows the "Author" window 1901 displayed by the display unit 1502, and the "SampleDisc" window 1902, the "TitleDivision" window 1903, the "Variables" window 1904, the "Add Value" window 1905, and the "Playback Items" window 1906 that are displayed in the "Author" window 1901.

As one example, each icon 1907 representing a disc information file for the multimedia optical disc and each icon 1908 representing a title set can be listed in the "SampleDisc" window 1902. By double-clicking any of these icons with the mouse 1404, the producer can have the windows corresponding to these icons displayed, and can then perform the editing of the system stream reproduction control information within the displayed windows.

The "Title Division" window 1903 is opened when the user double clicks the "Title Division" icon 1909 with the mouse 1404, and includes the "Title Set Variables" icon 1910, the "Titles" icon 1911, the "Menus" icon 1912, and the "Playback Items" icon 1913.

By double-clicking the mouse 1404 to choose one of the icons 1910-1913 in the "Title Division" window 1903, the producer can open a corresponding window and perform an editing operation.

When the producer chooses the icon 1910, the "variables" window 1904 is opened. If the producer then clicks the "System" tab 1914 with the right button 1405 of the mouse 1404, the "Add Value" window 1905 is opened within the window 2001 shown in FIG. 20, so that the variable, which is to say language, of the menu language unit can be defined. The defined language is interpreted by the control unit 1505 and is stored by the input data storage unit 1507.

Figure 20:
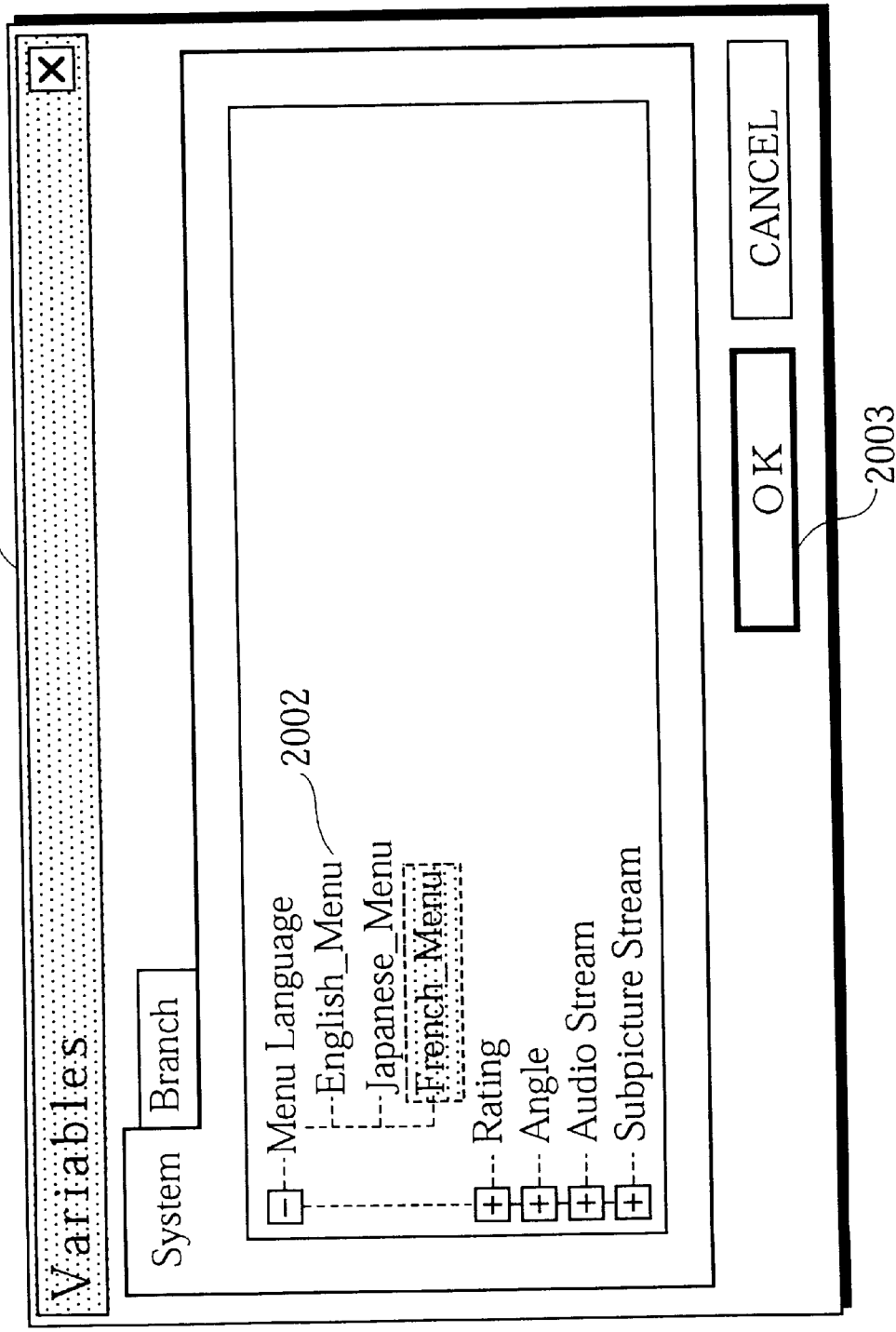
FIG. 20 shows an example of the "Variables" window displayed by the display unit based on control by the display control unit in the present embodiment.

FIG. 20 shows the state where the variable of the menu language unit in the "variables" window 2001 has been defined. It should be noted here that this variable is inputted by the producer using the keyboard 1403, so that as one example, the "English Menu" 2002 is inputted from the "Value Properties" window 2101 shown in FIG. 21.

Figure 22:
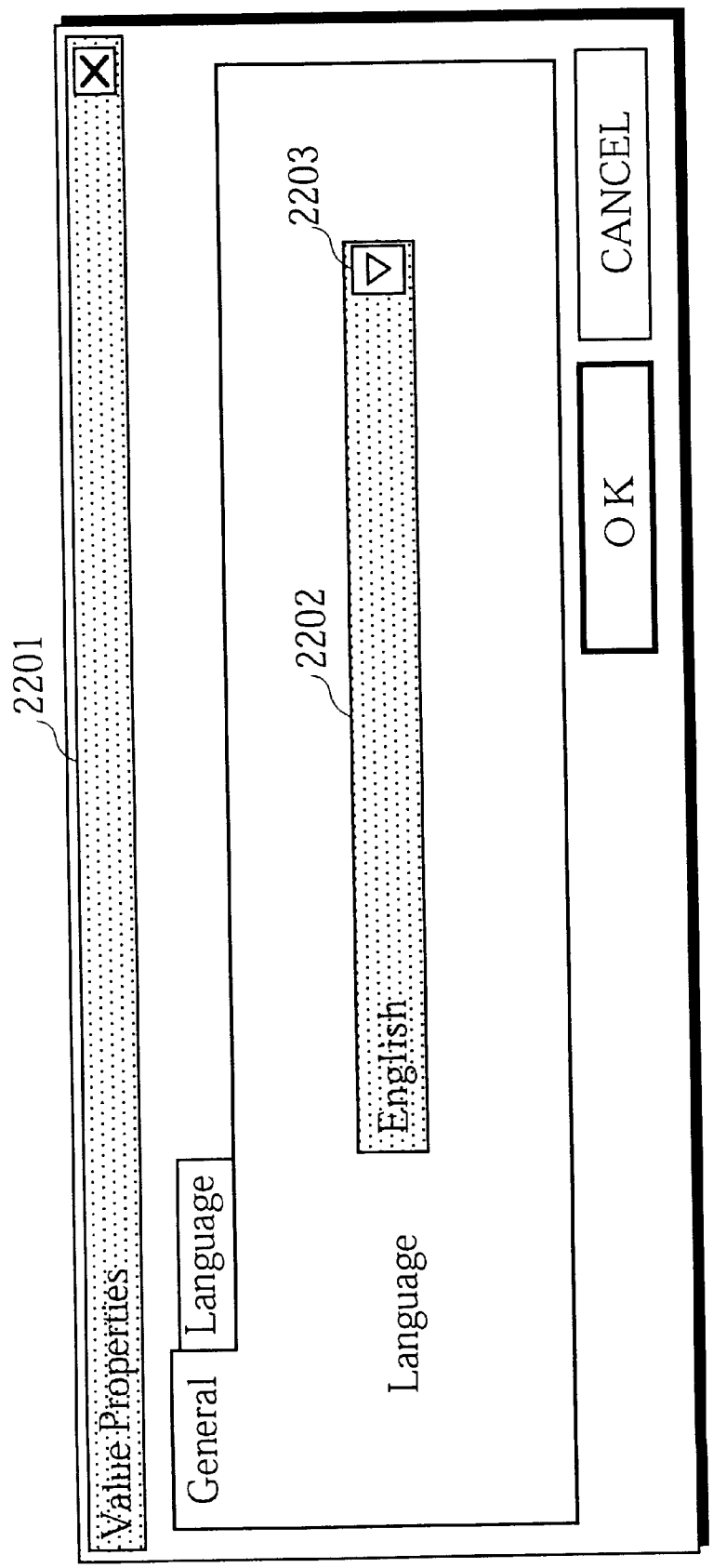
FIG. 22 shows a property window for setting language codes in the present embodiment.

FIG. 22 shows the "Value Properties" window 2101 for setting the language code (such as that used for "English Menu") that has been defined as the variable. Here, a language code is selected by the producer using the right button 1405 of the mouse 1404.

Figure 23:
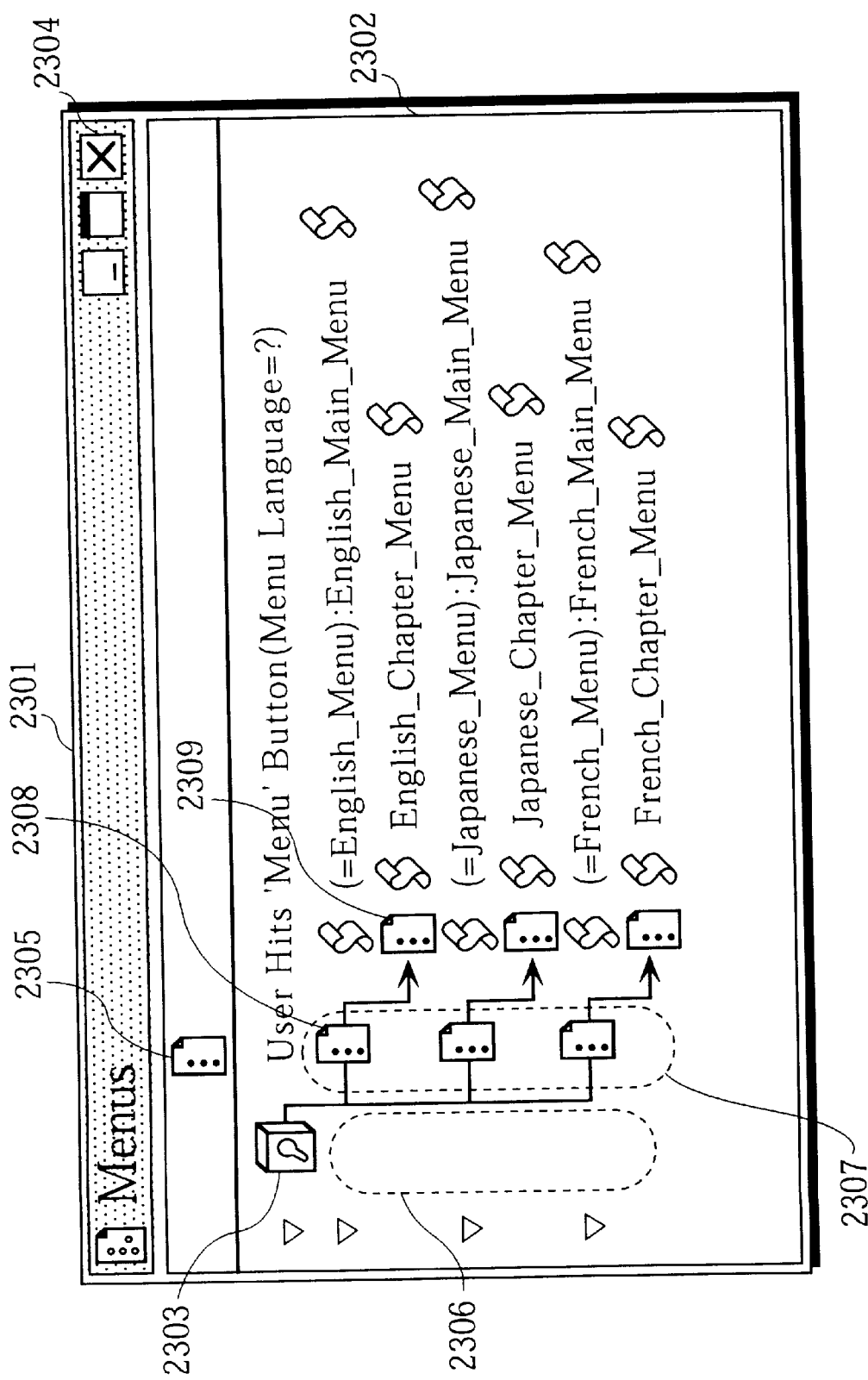
FIG. 23 shows an example of the "Menus" window displayed by the display unit based on control by the display control unit in the present embodiment.

FIG. 23 shows the "Menus" window 2301 for editing the system stream reproduction control information for the menu language unit. Using this "Menus" window 2301, the producer defines the reproduction order of the system streams.

Figure 24:
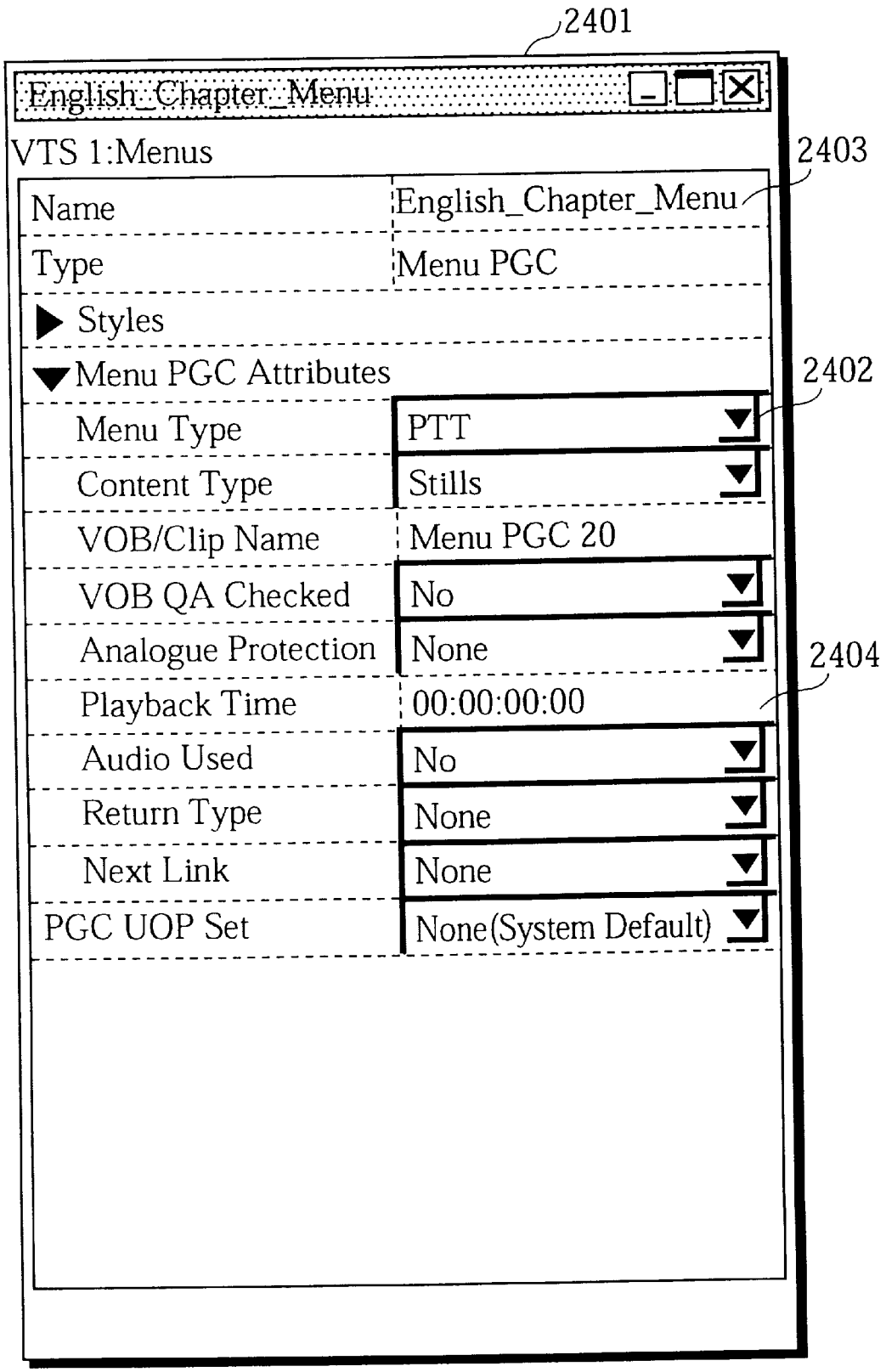
FIG. 24 shows a property window for setting PGC attributes in the present embodiment.
Figure 28:
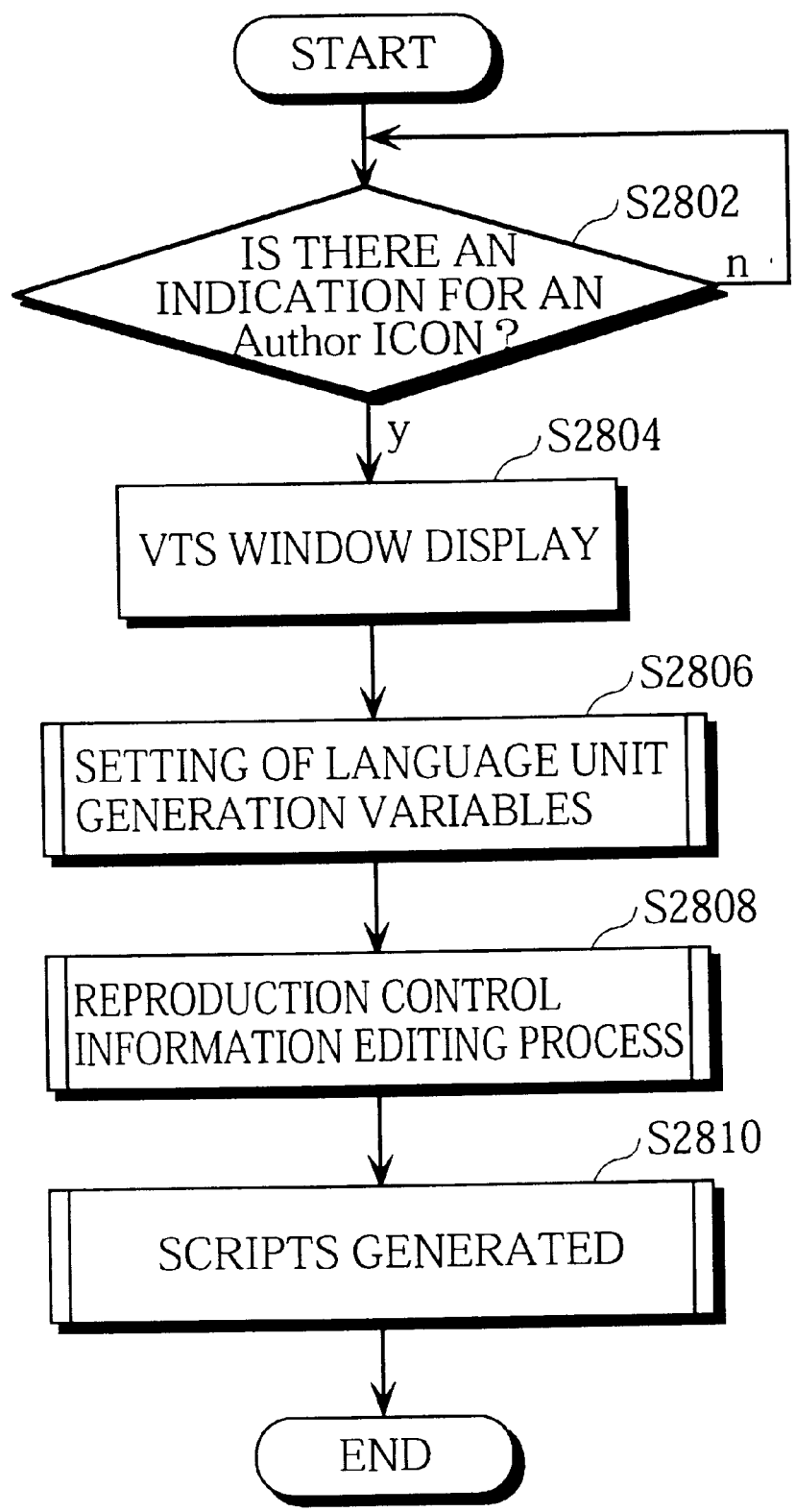
FIG. 28 is a flowchart showing the operation in the present embodiment.
Figure 29:
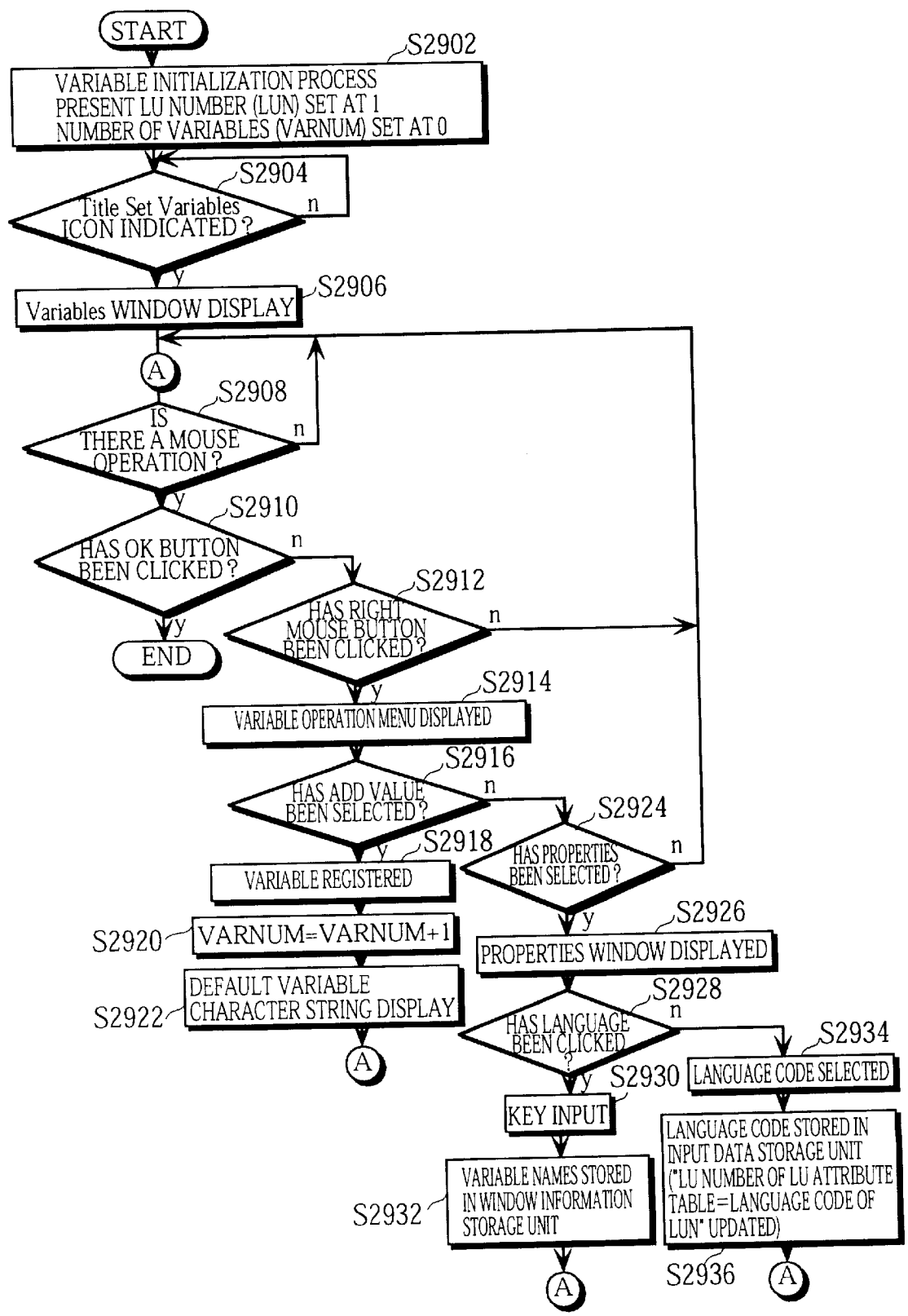
FIG. 29 is a flowchart showing the detailed operation when setting the menu language unit generation variables in the present embodiment.
Figure 30:
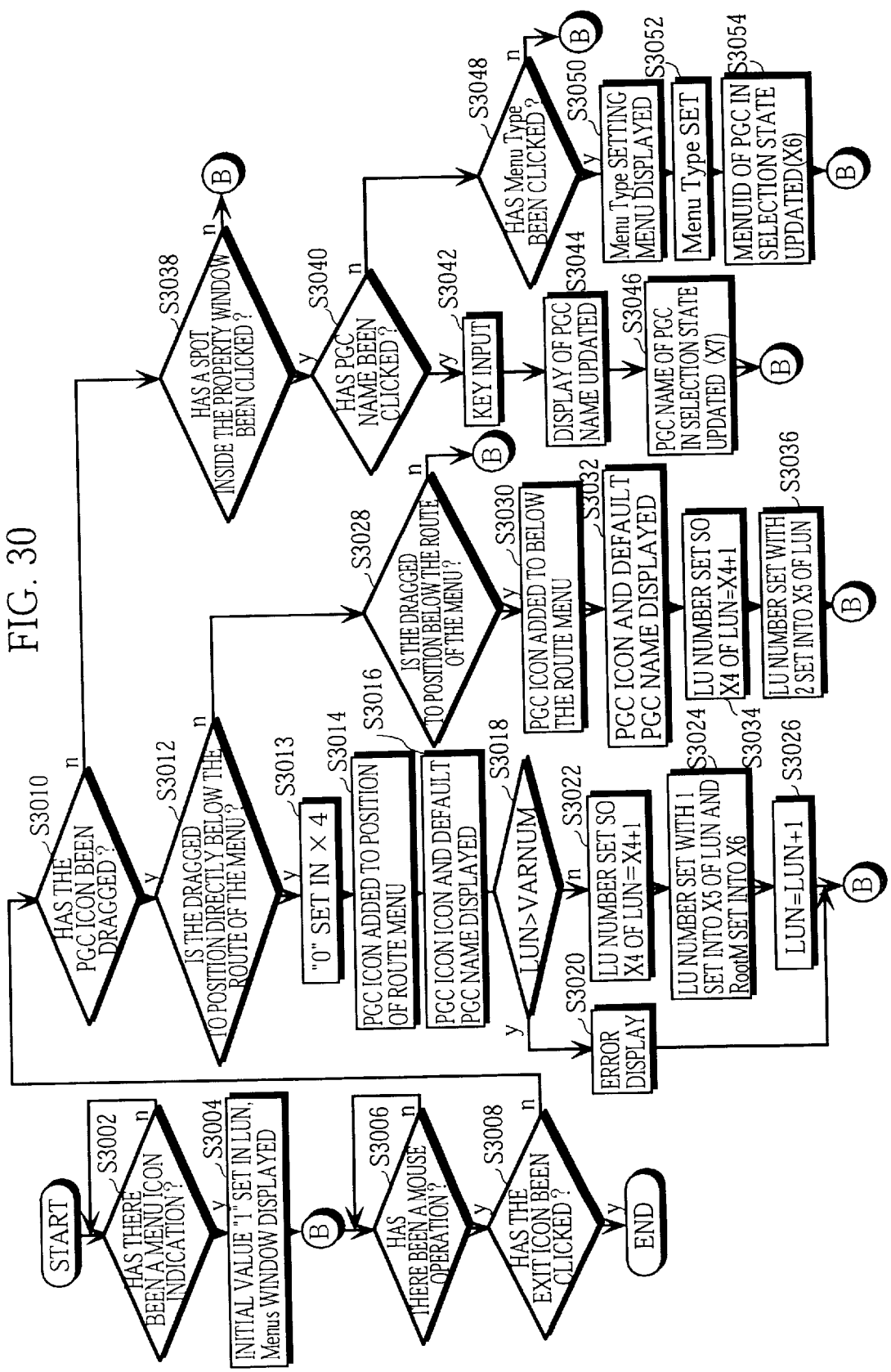
FIG. 30 is a flowchart showing the detailed operation of the reproduction control information editing process in the present embodiment.
Figure 31:
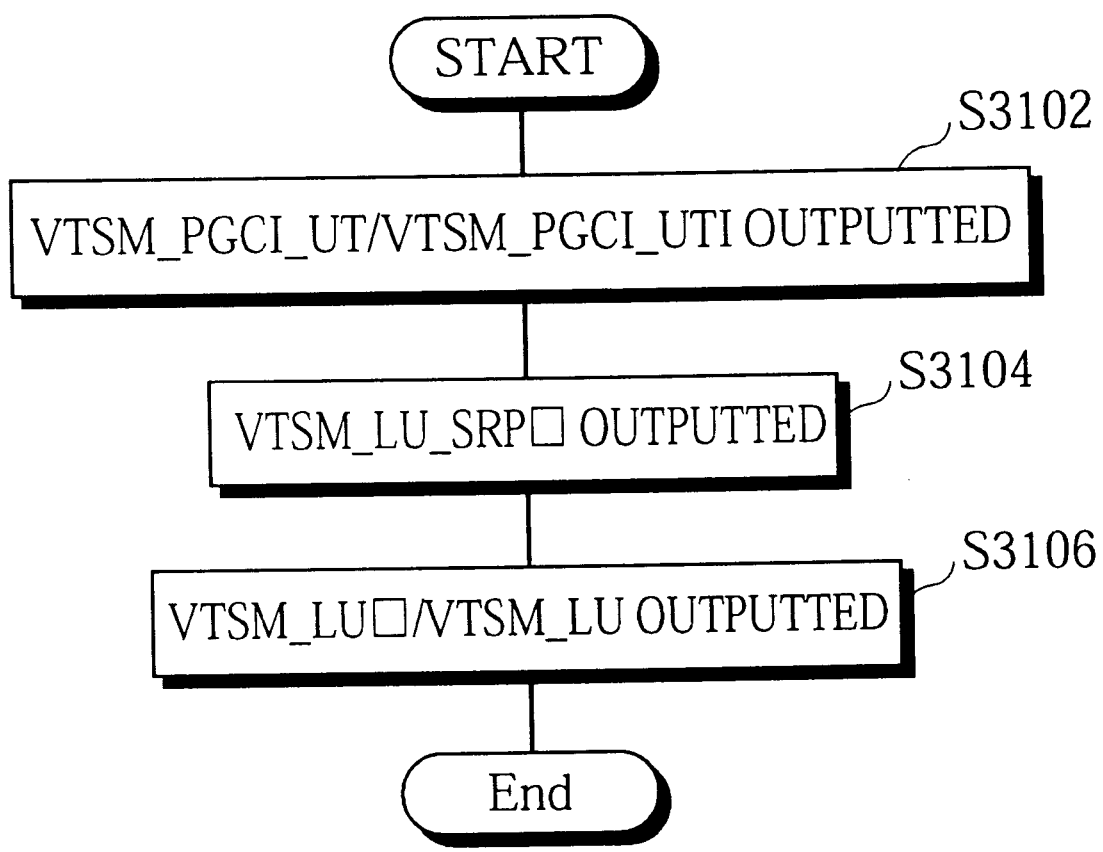
FIG. 31 is a flowchart showing the script generation process in the present embodiment.

FIG. 24 shows the property window which sets the attribute values or the "English_Chapter_Menu" that is a menu PSG whose reproduction order was defined using the "Menus" window 2301 shown in FIG. 23. The producer uses this window 2401 to input information such as the "Menu Type" 2402 and the "Playback Time" 2404.

The input data storage unit 1507 can be composed of RAM. When a variable inputted by the producer via the input operation unit 1501 or an icon operation has been interpreted by the control unit 1505, the result is written into the input data storage unit 1507 as input data.

The input data storage unit 1507 stores an attribute table for a video title set, an attribute table for a menu language unit, and an attribute table for a set of PGC information.

FIG. 25 shows the attribute table 2501 for the video title set (VTS). In this VTS attribute table 2501, the VTS name is "TitleDivision", and the number or menu language units (LU) 2502 is "3".

FIG. 26 shows the attribute table for menu language units. This attribute table 2601 for menu language units includes a language code 2603 and a number of sets of PGC information 2604 for each menu language unit (LU) number 2602.

FIG. 27 shows the attribute table for sets of PGC information. This attribute table 2701 for sets of PGC information shows a menu language unit (LU) number 2703, a PGC information number 2704, a menu identifier (MenuID) 2705, and a PGC information name 2706 for each set of icon coordinates 2702. Each set of icon coordinates 2702 shows (x,y) coordinates where the coordinates of the top-left corner of the "Menus" window 2301 are set at (0,0).

The reproduction control information generation unit 1508 receives instructions from the control unit 1505 and reads a template of script information stored in the script information storage unit 1504, before filling in the input data stored in the input data storage unit 1507 to complete the scripts.

The following is an explanation of the operation in the present embodiment with reference to the flowcharts in FIGS. 28 through 34.

First, the producer of the system stream reproduction control information for the menu language units operates the input operation unit 1501 to have the "Author" window 1901 (see FIG. 19) displayed on the display unit 1502 of the editing apparatus, and chooses the "Author" icon 1915 using the mouse 1404. The control unit 1505 waits for notification of the content of the user indication made using the input operation unit 1501 (S2802), and instructs the display control unit 1506 to display the "SampleDisc" window 1902. In the same way, when a user indication of the "Title Division" icon 1909 is received, the display control unit 1506 has the "Title Division" window 1903 displayed (S2804).

The editing apparatus sets the generation variable for menu language units (S2806), performs the reproduction control information editing processing (S2808), generates the scripts for the system stream reproduction control information (S2810), and terminates its processing.

The following is an explanation of the detailed operation when setting the generation variable for the menu language units in S2806.

First the control unit 1505 performs the initialization process for the variable. In detail, the present LU number (LUN) is set at "1", and the number of variables (VARNUM) is set at "0" (S2902).

Next, the control unit 1505 waits for the producer to choose the "Title Set Variables" icon 1910 in the "TitleDivision" window 1903 (S2904), and gives the display control unit 1506 a display indication for the "Variables" window.

The display control unit 1506 reads the window information stored in the window information storage unit 1503 and has the "variables" window 2001 (see FIG. 20) displayed on the display unit 1502 (S2906). It should be noted here that the "Variables" window 2001 displays the "System" screen, although when the "Branch" screen 1904 shown in FIG. 19 is displayed, the "System" screen can still be displayed by indicating the "system" tag 1914 using the mouse 1404.

After this, the control unit 1505 waits for notification of a mouse 1404 operation from the input operation unit 1501 (S2908), and judges whether the "OK" button 2003 has been clicked (S2910). When this is the case, the control unit 1505 writes the present LU number (LUN) into the input data storage unit 1507 as the number of LUs and completes its processing. When this is not the case, the control unit 1505 judges whether "Menu Language" has been clicked with the right button 1405 of the mouse 1404 (S2912). When this is not the case, the processing returns to S2908, while when the "Menu Language" has been clicked with the right button 1405, the control unit 1505 instructs the display control unit 1506 to display the variable operation menu.

The display control unit 1506 reads the window information stored in the window information storage unit 1503 and has the variable operation window (the "Add Value" window) 1905 displayed.

The control unit 1505 judges whether notification of a selection of the "Add Value" item 1916 has been received from the input operation unit 1501 (S2916), and when this is the case, writes the variable (LU number) into the LU attribute table 2601 in the input data storage unit 1507 (S2918). The control unit 1505 adds "1" to the number of variables "VARNUM" (S2920) and instructs the display control unit 1506 to display a default variable character string.

The display control unit 1506 reads the window information for a predetermined position in the "Variables" window 2001 on the display unit 1502, and has the default variable character string displayed (S2922), before the processing returns to S2908.

When the judgement in S2916 is negative, the control unit 1505 judges whether notification of a selection of the "Properties" item 1917 has been received from the input operation unit 1501 (S2924), and if not, the processing returns to S2908, or if so, the control unit 1505 gives the display control unit 1506 an instruction to display the "Properties" window.

Figure 21:
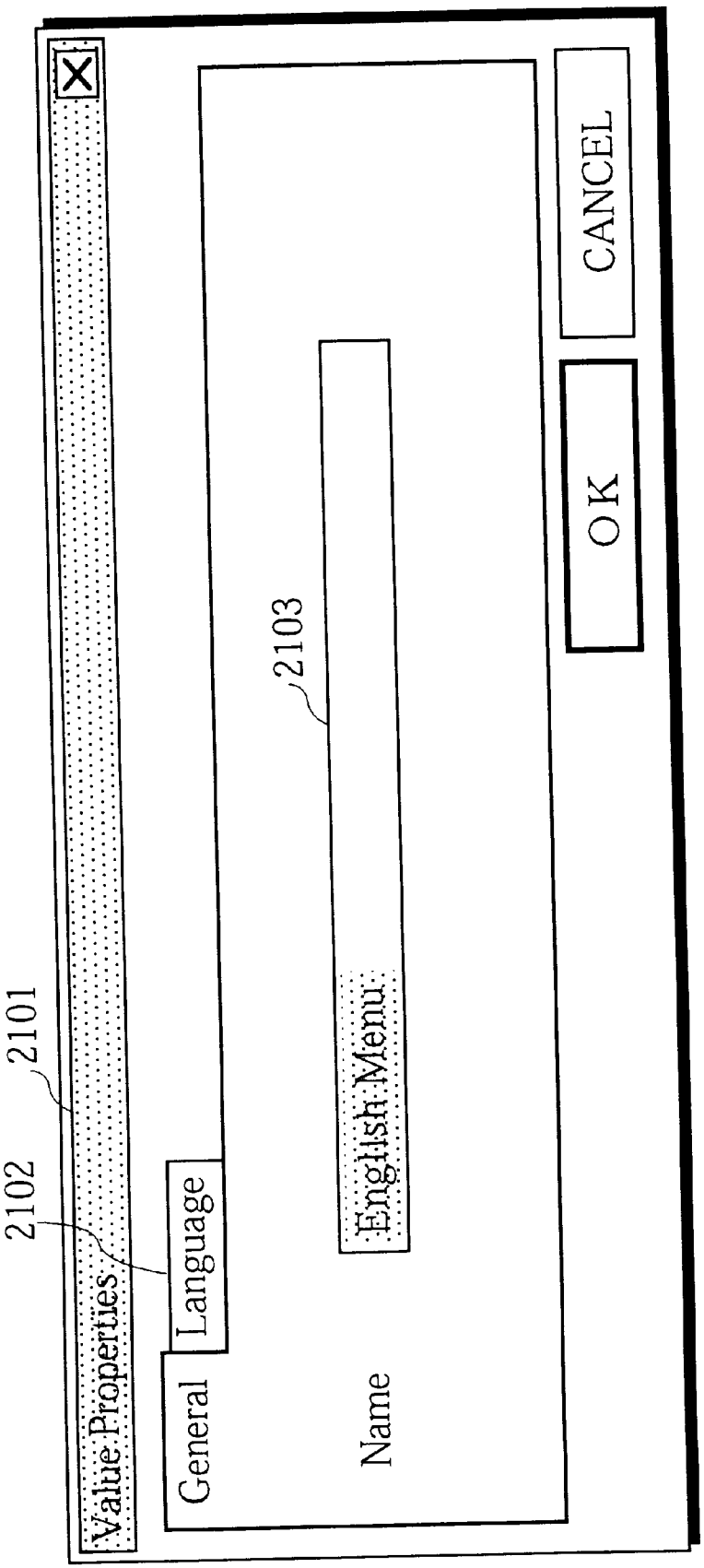
FIG. 21 shows a property window for selling variables for the menu language units in the present embodiment.

The display control unit 1506 reads the window information and has the property window 2101 shown in FIG. 21 displayed on the display unit 1502 (S2926).

The control unit 1505 judges whether notification has been received from the input operation unit 1501 showing that the "Language" tab 2102 has been clicked (S2928), and if not, the control unit 1505 receives notification of the key input of a character string from the input operation unit 1501. This is to say, the user inputs the character string "English Menu" into the input frame 2103 shown in FIG. 21 using the keyboard 1403 (S2930).

The control unit 1505 writes the received character string into the window information storage unit 1503 as the variable name corresponding to the present LU number. The display control unit 1506 then has the character string written into the window information storage unit 1503 displayed in place of the default variable character string in the "Variables" window 2001 (S2932).

When the judgement in S2925 is positive, the control unit 1505 has the display control unit 1506 change the display from the property window 2101 shown in FIG. 21 to the property window 2201 (FIG. 22) for the "Language" screen.

The producer indicates the scroll bar 2203 in the input frame 2202 using the mouse 1404 and selects a language code. FIG. 22 shows the case when "English" has been selected (S2934).

The control unit 1505 writes the selected language code as the language code corresponding to the present LU number in the LU attribute table 2601 in the input data storage unit 1507, and then returns to S2908. It should be noted here that the language codes are written in as two-character symbols that are defined according to ISO639, with, as shown in FIG. 26, "en" representing English, "fr" representing French, and "ja" representing Japanese.

The following is an explanation of the details of the reproduction control information editing process of S2808.

First, the control unit 1505 waits for notification from the input operation unit 1501 showing that the "Menus" icon 1912 in the "Title Division" window 1903 has been indicated (S3002), and when this is the case, the control unit 1505 sets LUN at the initial value "1" and instructs the display control unit 1506 to display the "Menus" window 2301.

The display control unit 1506 has the display unit 1502 display the "Menus" window 2301 (S3004). It should be noted here that in the present state, only the first line "User Hits 'Menu' Button (Menu Language=?)" is displayed in the editing area 2302 of the window 2301 shown in FIG. 23. At this point, the property window 2401 shown in FIG. 24 is also displayed.

The control unit 1505 waits for notification of a mouse operation from the input operation unit 1501 (S3006), and judges whether a received notification indicates a click on the "Exit" icon 2304 (S3008). If so, the control unit 1505 terminates the processing.

If the judgement in S3006 is negative, the control unit 1505 judges whether the received indication is for a dragging of the PGC icon 2305 (S3010). If so, the control unit 1505 judges whether the dragged-to position is the region 2306 directly below the route icon 2303 (S3012).

When the judgement in S3012 is positive, the control unit 1505 instructs the display control unit 1506 to add the PGC icon 2305 to a position in the display region 2307 of the route menu, and writes the coordinate values indicated by the display control unit 1506 into the icon coordinates column 2702 of the PGC attribute table 2701 in the input data storage unit 1507 (S3014).

On receiving an indication from the control unit 1505 to add the PGC icon 2305, the display control unit 1506 has the PGC icon 2305 displayed at the indicated position as well as reading the default PGC name from the window information storage unit 1503 and displaying it in the editing region 2302 of the window 2301 (S3016).

Next, the control unit 1505 judges whether the LU number LUN exceeds the number of variables VARNUM (S3018). When so, the control unit 1505 instructs the display control unit 1506 to display the "Error display".

The display control unit 1506 has the message "Error" displayed in the editing area of the window 2301 (S3020), and the processing returns to S3006. By doing so, a setting of a number of sets of reproduction control information that exceeds the number of defined variables can be prevented.

As one example, when the three sets of menus (English, French, and Japanese) have been set as the menu language units, if the producer tries to then set reproduction control information for Spanish menus, an "Error" message will be displayed to warn the user.

When the judgement in S3018 is negative, the control unit 1505 adds "1" to the number of sets of PGC information (X4), and writes the number of sets of PGC information (X4) together with LUN into the LU number (X2) of the attribute table for a menu language unit in the input data storage unit 1507.

In S3024, the control unit 1505 writes the LUN into the LU number (X2), writes "1" into the PGC information number (X5), and writes "RootM" into the MenuID (X6) corresponding to the icon coordinates written into the PGC information table 2701 in the input data storage unit 1507, before adding "1" to the LUN (S3026) and returning to S3006.

When the judgement in S3012 is negative, the control unit 1505 judges whether the dragged-to position of the PGC icon 2305 is below the PGC icon 2308 shown in the display area 2307 of the route menu (S3028), and if not, the processing returns to S3006. When the dragged-to position of the PGC icon 2305 is below the PGC icon 2308, the control unit 1505 instructs the display control unit 1506 to display the PGC icon 2309 at a position to the right of the display area 2307 of the route menu, in addition to writing the coordinate position indicated in the input data storage unit 1507 into the icon coordinates column 2702 of the PGC attributes table 2701 (S3030).

On receiving instructions from the control unit 1505 to display the PGC icon 2309, the display control unit 1506 has the PGC icon 2309 displayed in the editing area 2302 of the "Menus" window 2301 connected by a line to the PGC icon 2308, and has the default character string corresponding to the PGC icon 2309 displayed to the right of the PGC icon 2309. It should be noted here that the corresponding default character string in read from the window information storage unit 1503 (S3032).

Next the control unit 1505 adds "1" to the number of sets of PGC information X4 and overwrites the number of sets PGC information (X4) into the LUN of the LU number (X2) in the menu language unit attribute table 2601 in the input data storage unit 1507 (S3034). In S3030, the control unit 1505 writes the LUN into the LU number (X2) and "2" into the PGC information number (X5) corresponding to the icon coordinates written in the PGC attribute table 2701 given in the input data storage unit 1507 (S3036), and the processing returns to S3006.

When the judgement in S3010 is negative, the control unit 1505 judges whether there has been notification from the input operation unit 1501 indicating a click inside property window 2401 (S3038), and if not, the processing returns to S3006. When there has been a click inside the property window 2401, the control unit 1505 judges whether the PGC information name 2403 has been clicked (S3040). If so, a character string is received as a key input by the input operation unit 1501 (S3042).

The control unit 1505 informs the display control unit 1506 of the character string received from the input operation unit 1501 and has the display of the PGC information updated. As one example, when the character string "English_Chapter_Menu" has been inputted, this character string "English_Chapter_Menu" is displayed to the right or the PGC icon 2309 in place of the character string "Menu_ PGC" that had been displayed as the default (S3044).

The control unit 1505 writes the PGC information name indicated by the updated display into the PGC information name (X7) column 2706 of the PGC attribute table 2701 in the input data storage unit 1507 (S3046).

When the judgement in S3040 is negative, the control unit 1505 judges whether the "Menu Type" item 2402 has been clicked (S3048) and it not, returns to S3006.

When the judgement in S3048 is positive, the control unit 1505 indicates the "Menu Type" setting menu to the display control unit 1506. The display control unit 1506 changes the value of the "Menu Type" item 2402 in the property window 2401 on the display unit 1502 and has it displayed (S3052). The input operation unit 1501 then receives an indication from the producer for setting the "Menu Type" (S3052).

The control unit 1505 writes the character string for the "Menu Type" indicated by the input operation unit 1501 into the MenuID(X6) column 2705 of the PGC attribute table 2701 (S3054), and the processing returns to S3006. As one example, "PTTM" is written into the MenuID column 2705 for the row with the Lu number "1" and PGC information number "2".

It should be noted here that after a negative judgement in S3048, additional information for the PGC information is inputted by the producer using the input operation unit 1501 in response to the property window 2401, although such information is not directly related to the present embodiment and so will not be described.

The following is a description of the detailed operation for the generation of scripts in S2810.

First, when the producer uses the mouse 1404 to click "Disc" which is one item out of the menu items "File Edit Disc Title Set Window Help" in the "Author" window 1901 and clicks the displayed "Publish" icon (not illustrated), the control unit 1505 receives notification of this operation from the input operation unit 1501 and activates the reproduction control information generation unit 1508.

On being activated by the control unit 1505, the reproduction control information generation unit 1508 reads the content of the attribute tables 2501, 2601, and 2701 stored in the input data storage unit 1507, and uses the read information to write the parameter strings in the templates of script information stored in the script information storage unit 1504. The reproduction control information generation unit 1508 outputs the script sequence "VTSM_PGCI_UT/VTSM_PGCI_UTI" for the number of menu language units (S3102), outputs the script sequence "VTSM_VU_SRP☐"for the language code which is an attribute of the menu language unit (S3104), and successively outputs the script sequence "VTSM LU☐/VTSM_LU" for the logical construction of the menu language unit (S3106).

Figure 32:
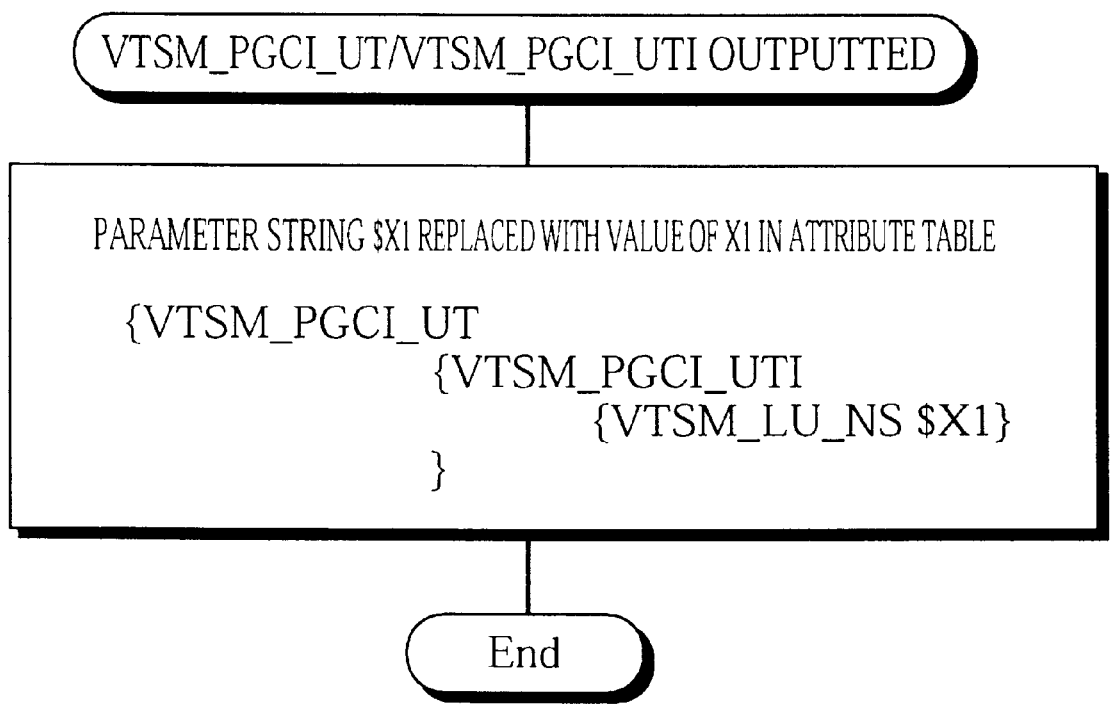
FIG. 32 is a flowchart showing the details of S3102 shown in FIG. 31.
Figure 33:
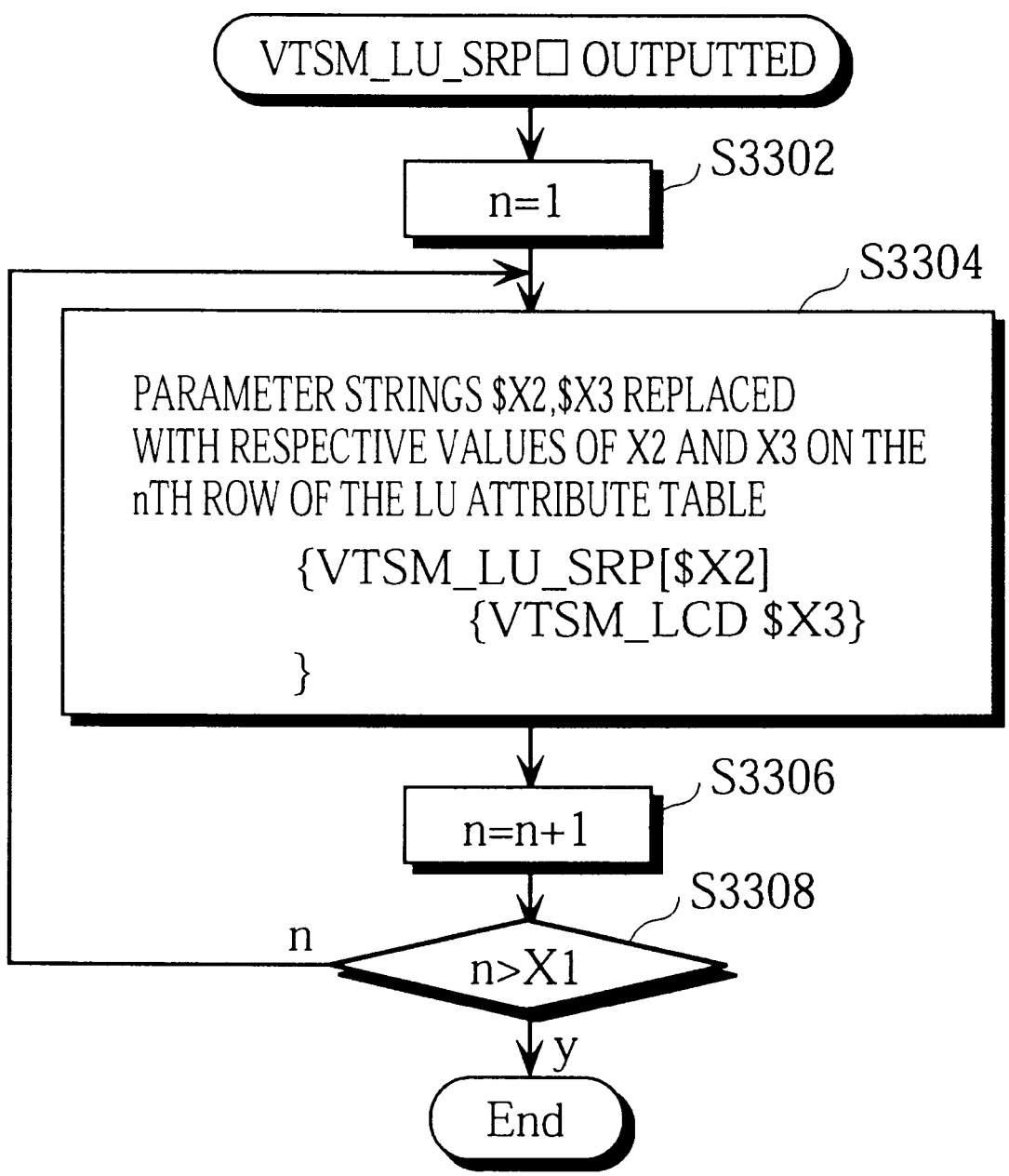
FIG. 33 is a flowchart showing the details of S3104 shown in FIG. 31.
Figure 34:
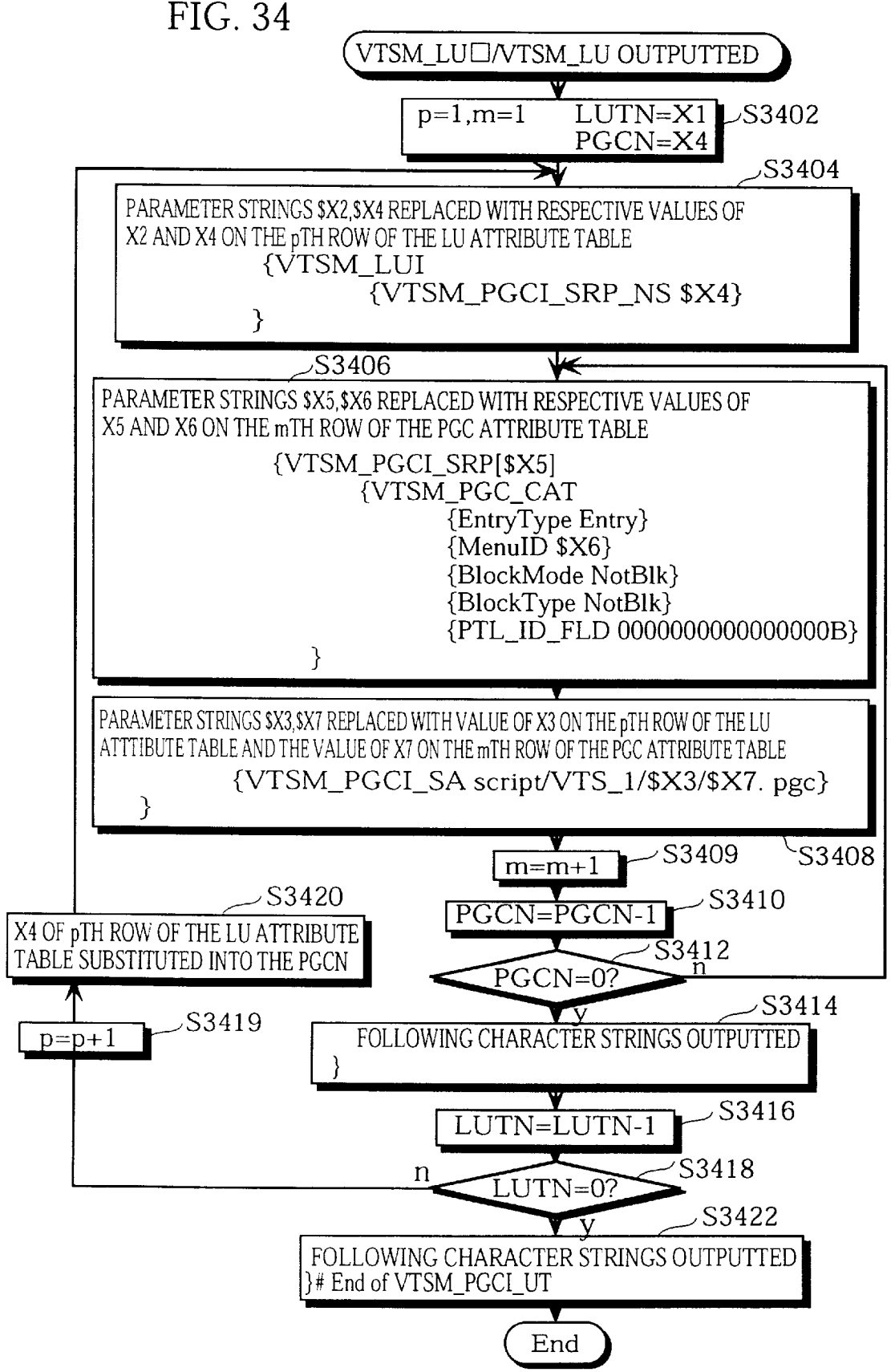
FIG. 34 is a flowchart showing the details of S3106 shown in FIG. 31.

As shown in FIG. 32, in S3102 the reproduction control information generation unit 1508 reads the number of menu language units (X1) of the VTS attribute table 2501 stored in the input data storage unit 1507, uses it to replace the parameter string "SX1" 1802 of the script sequence 1810 in the template stored in the script information storage unit 1504, and outputs the resulting script. By doing so, the script sequence 101 shown in FIG. 1 is outputted. This script sequence 101 shows the number of menu language units 902 given in rig. 9.

Following this, in S3104 the reproduction control information generation unit 1508 sets the counter n at "1" (S3302), and reads the LU number (X1) and the language code (X3) on the nth row of the LU attribute table 2601 which it then uses to replace the parameter strings "SX2" 1803 and "SX3" 1804 in the script sequence 1811 in the template (S3304). The counter n is increased by "1" (S3306) and the reproduction control information generation unit 1508 judges whether n>number of LUs(X1) (S3308). If not, the processing returns to S3304, or if so, the reproduction control information generation unit 1508 terminates its processing. By doing so, the script sequence 102 shown in FIG. 1 is outputted. The language code of the languages used in each menu language unit are written into this script sequence.

In S3106, the reproduction control information generation unit 1508 sets the counters p and m at "1", and reads the number of LUs (X1) from the VTS attribute table 2501 stored in the input data storage unit 1507 and substitutes it into the variable LUTN, before reading the number of sets of PCC information (X4) from the LU attribute table 2601 and substituting it into the variable PGCN (S3402).

Following this, the reproduction control information generation unit 1508 reads the LU number (X2) and the number of sets of PGC information (X4) on the pth row of the LU attribute table 2601 stored in the input data storage unit 1507 and uses them to replace the parameter strings "SX2" 1803 and "SX4" 1805 in the script sequence 1812 in the template (S3404).

The reproduction control information generation unit 1508 then reads the PGC information number (X5) and the MenuID(X6) on the mth row of the PGC attribute table 2701 stored in the input data storage unit 1507 and uses them to replace the parameter strings "SX5" 1806 and "SX6" 1808 in the script sequence 1813 in the templates stored in the script information storage unit 1504 (S3406). The reproduction control information generation unit 1508 then reads the language code (X3) on the pth row of the LU attribute table 2601 and the PGC information name (X7) on the mth row of the PGC attribute table 2701. The reproduction control information generation unit 1508 then uses these values to respectively replace the parameter strings "SX3" 1804 and "SX7" 1809 in the script sequence 1814 in the template (S3808).

After this, the reproduction control information generation unit 1508 increases the counter m by "1" (S3409), and reduces the variable PGCN by "1" (S3410), before judging whether the variable PGCN is "0" (S3412). If not, the processing returns to S3406, or if so, the reproduction control information generation unit 1508 outputs the script 1815 of the template (S3414).

The variable LUTN is reduced by "1" (S3416), and the reproduction control information generation unit 1508 judges whether the variable LUTN is "0" (S3418). If not, the reproduction control information generation unit 1508 adds "1" to the value of the counter P (S3419), and substitutes the number of sets of PGC information (X4) on the pth row of the LU attribute table stored in the input data storage unit 1507 into the variable PGCN (S3420), before the processing returns to S3404.

When the judgement in S3418 is positive, the reproduction control information generation unit 1508 outputs the script 1816 of the template (S3422) and terminates its processing.

As a result of the processing in S3402 to 3422 described above, in S3404, the script sequence 103 shown in FIG. 1, the script sequence 201 shown in FIG. 2, and the script sequence 301 shown in FIG. 3 are outputted. In S3406, the script sequence 104 shown in FIG. 1, the script sequences 202 and 203 shown in FIG. 2, the script sequence 302 shown in FIG. 3, and the script sequences 401 and 402 shown in FIG. 4 are outputted. In S3408, the script sequence 105 shown in FIG. 1, the script sequences 204 and 205 shown in FIG. 2, the script sequence 303 shown in FIG. 3, and the script sequences 403 and 404 shown in FIG. 4 are outputted. In S3414, the script sequence 206 shown in FIG. 2, the script sequence 304 shown in FIG. 3, and the script sequence 405 shown in FIG. 4 are outputted. In S3422, the script sequence 406 shown in FIG. 4 is outputted.

It should be noted here that the context of FIGS. 1 to 4 aside from script sequences 101 and 102 show the details of the PGC information in FIG. 9, and correspond to information such as the PGC type 802 shown in FIG. 8.

Second Embodiment

The construction of the editing apparatus of the second embodiment of the present invention is fundamentally the same as that of the first embodiment shown in FIG. 15. Accordingly, this drawing will be also used to explain the present embodiment.

The editing apparatus of this second embodiment is used to edit system stream reproduction control information that is a reproduction order of system streams in a title set that includes angle blocks.

In the first embodiment, the script information storage unit 1504 stored a template of script information for generating the system stream reproduction control information of a menu language unit, though in the present embodiment, the script information storage unit 1504 stores a template of script information for generating a reproduction order of system streams for an angle block.

FIGS. 35 to 43 show templates of script information stored in the script information storage unit 1504.

In FIG. 35, the script sequence 3501 shows the number of system streams included in the system stream reproduction control information of the angle block. The reproduction control information generation unit 1508 writes the number of system streams into the parameter string "SY1" 3502 in this script sequence 3501.

The script sequence 3503 shows the playback issue when the multimedia optical disc is reproduced by a reproduction apparatus in accordance with the system stream reproduction control information for the angle block. The reproduction control information generation unit 1508 writes the number of system streams into the parameter string "SY2" 3504 in this script sequence 3503.

The script sequence 3505 shows the enable flag which shows whether the user of the reproduction apparatus is allowed to make remote controller operations.

The script sequence shown in FIG. 36 shows the attributes of the audio streams that are recorded on the multimedia optical disc. Though the central part of this script sequence has been omitted in FIG. 36, this script sequence is composed of the attributes of eight audio streams that are identified by the numbers "0" to "7".

The script sequences shown in FIGS. 37 and 38 show the attributes of the sub-picture streams that are recorded on the multimedia optical disc. Though the central part of the script sequence has been omitted in FIG. 38, these script sequences are composed of the attributes of thirty-two sub-picture streams that are identified by the numbers "0" to "31".

The script sequences 3901 and 3902 are given in FIG. 39. The script sequence 3901 shows the control information for branch destinations and reproduction modes of PGCs in accordance with remote controller operations made by the user during reproduction of the multimedia optical disc. The script sequence 3902, the script sequences shown in FIGS. 40 and 41, and the script sequence 4201 shown in FIG. 42 show the display colors of the sub-picture streams. These display colors can be any of sixteen colors identified by the numbers "0" to "15".

The script sequence 4201 shown in FIG. 42 shows the attributes of the PCC information.

FIG. 43 shows a template of script information that shows the attributes of an angle block. The following is an explanation of the parameter strings that are written into this template by the reproduction control information generation unit 1508.

The parameter string "SY3" 4301 is a consecutive number for sets of PGC information included in the system stream reproduction control information.

The parameter string "SY4" 4302 shows whether the block mode for a system stream (Cell) is first, last, or other (middle).

The parameter string "SY5" 4303 shows whether the block type of the system stream (Cell) is "angle block" or "not block".

The script 4304 shows that image reproduction is uninterrupted when moving from a presently reproduced system stream to a next system stream.

The parameter string "SY6" 4305 shows whether the present system stream is interleaved.

The script sequence 4306 shows the reproduction control information for the reproduction apparatus during reproduction. The parameter string "SY7" 4307 shows whether angle changes are possible.

The script 4308 shows whether the user is permitted to make rewind and fast forward operations during reproduction.

The script sequence 4309 shows the attributes of system streams.

The script 4310 shows a television broadcasting standard such as "NTSC" or "PAL" using a flag that indicates the type of time code used to express playback time.

The parameter string "SYH" 4311 is used to record the playback time of a system stream.

The script 4312 shows the starting time for reproduction of the system stream. If the script 4312 is "00:00:00:00", reproduction is performed from the start of the system stream. The should be noted here that this value is expressed in "hh:mm:ss:frames" format.

The script sequence 4313 shows the filename of the system stream. The parameter string "SY9" 4314 shows the system stream name.

The following is an explanation of the windows that compose the GUI displayed on the display unit 1502 for editing the system stream reproduction control information of the angle block.

In the same way as the first embodiment, the "SampleDisc" window 1902 and the "TitleDivision" window 1903 are displayed within the "Author" window 1901 until the variables for the angle block are set.

Figure 44:
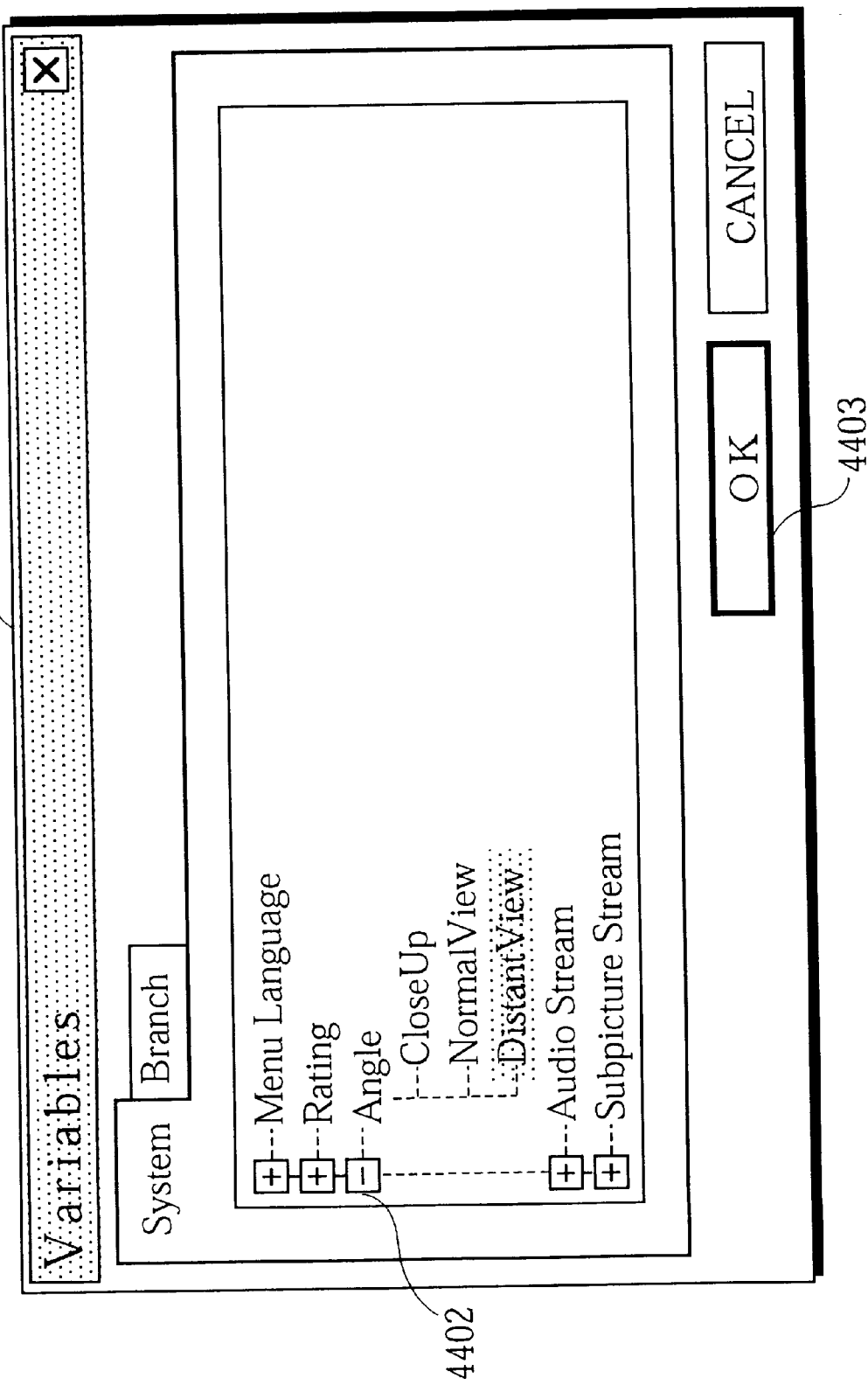
FIG. 44 shows an example of the "Variables" window displayed by the display unit based on control by the display control unit in the present embodiment.

FIG. 44 shows the "Variables" window 4401 that is displayed by the display control unit 1506 when the "Title Set Variables icon 1910 in the "Title Division" window 1903 has been chosen and setting is performed for the variables of an angle block. This "Variables" window 4401 has the "Angle" item 4402 in the selection state, and shows the situation when the setting of the variable names that are used for the system streams included in an angle block has been completed.

Figure 45:
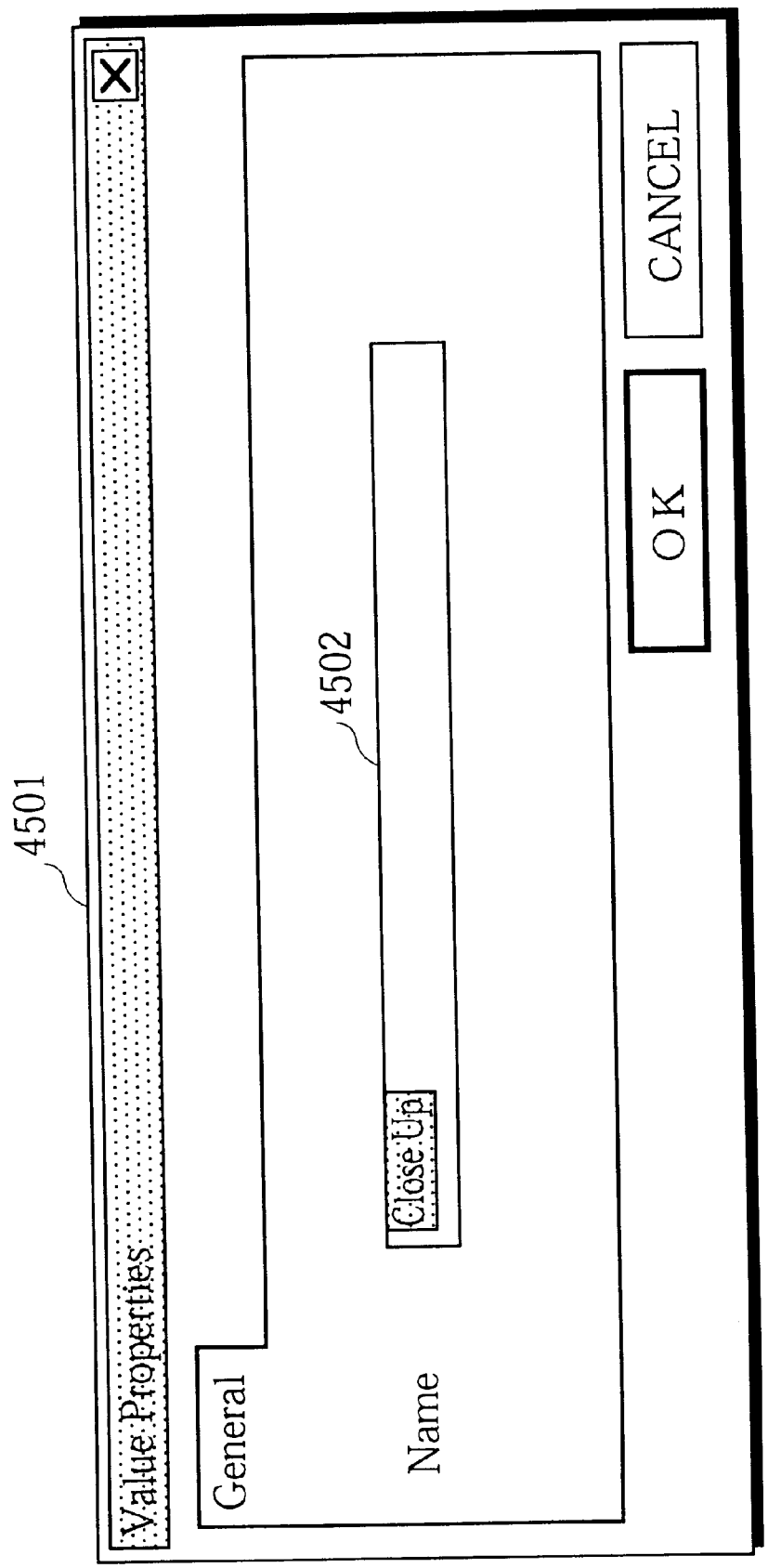
FIG. 45 shows an example of a property window for setting variables for angle blocks in the present embodiment.

It should be noted here that these variables are inputted using the property window 4501 shown in FIG. 45. The variable input frame 4502 in the property window 4501 in FIG. 45 shows the case when the angle name "Close Up" is inputted by the user.

Figure 46:
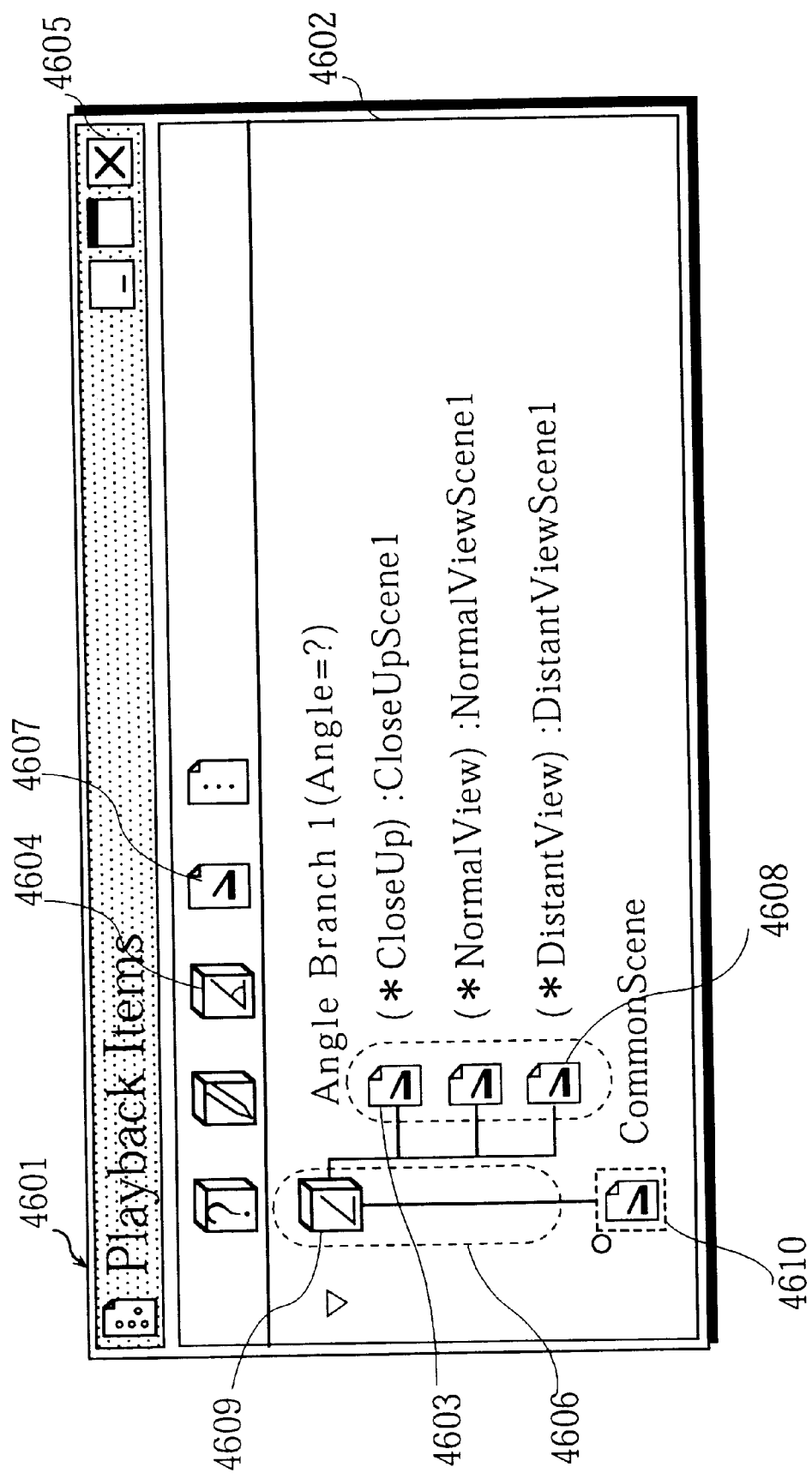
FIG. 46 shows an example of the "Playback Items" window for editing the system stream reproduction control information for angle blocks in the present embodiment.
Figure 56:
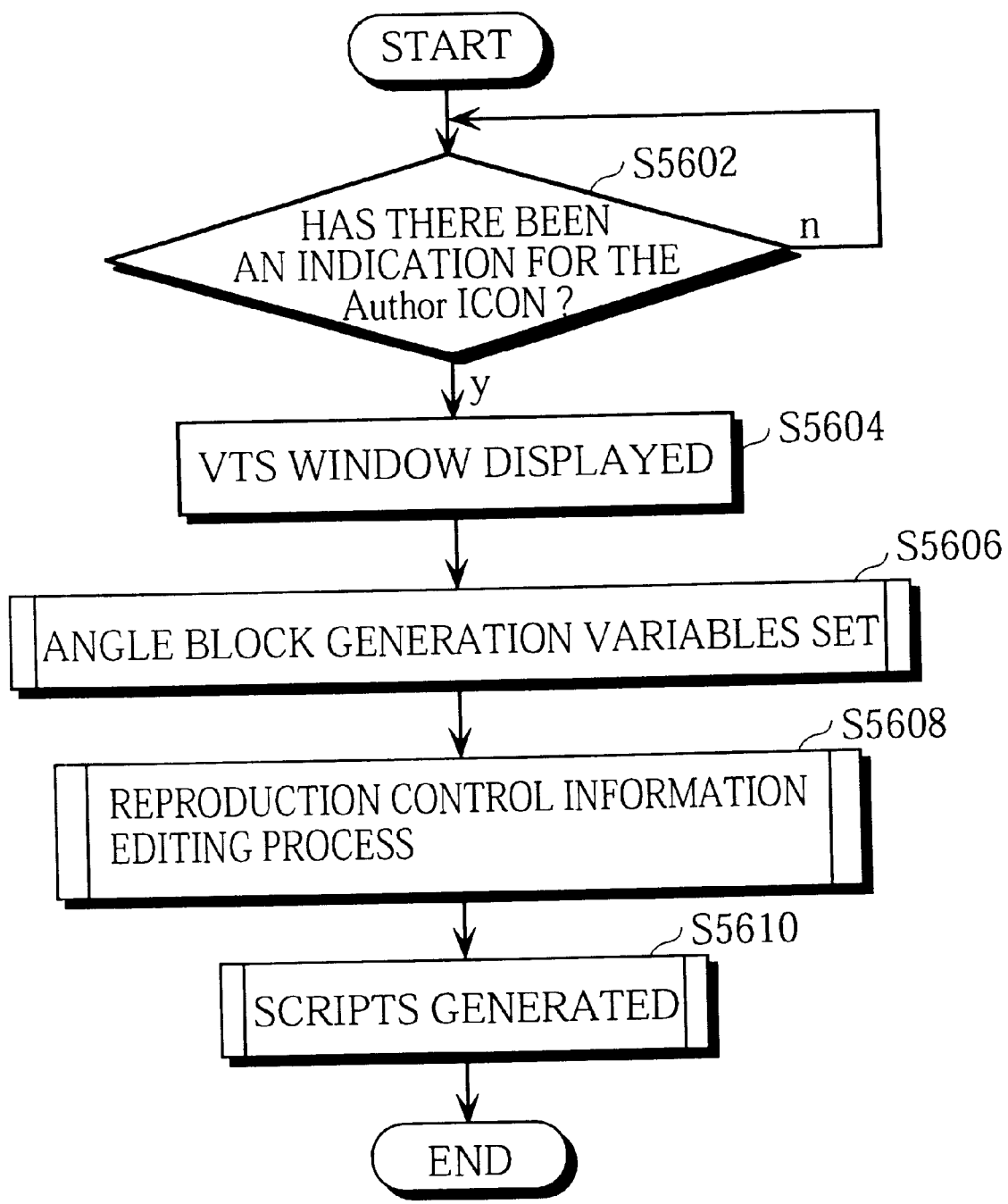
FIG. 56 is a flowchart showing the entire operation of the present embodiment.
Figure 57:
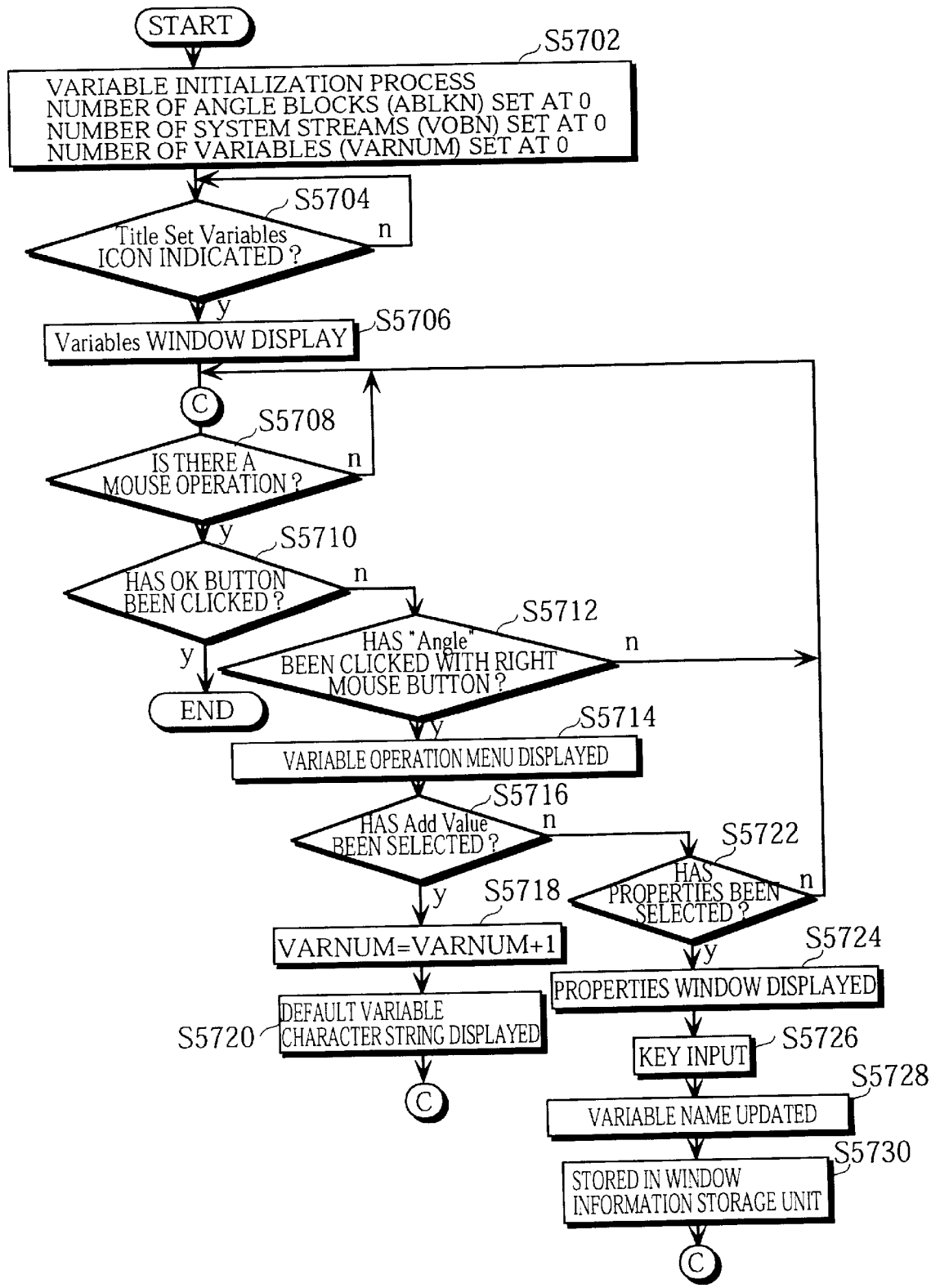
FIG. 57 is a flowchart showing the details of the operation in S5606 shown in FIG. 56.
Figure 58:
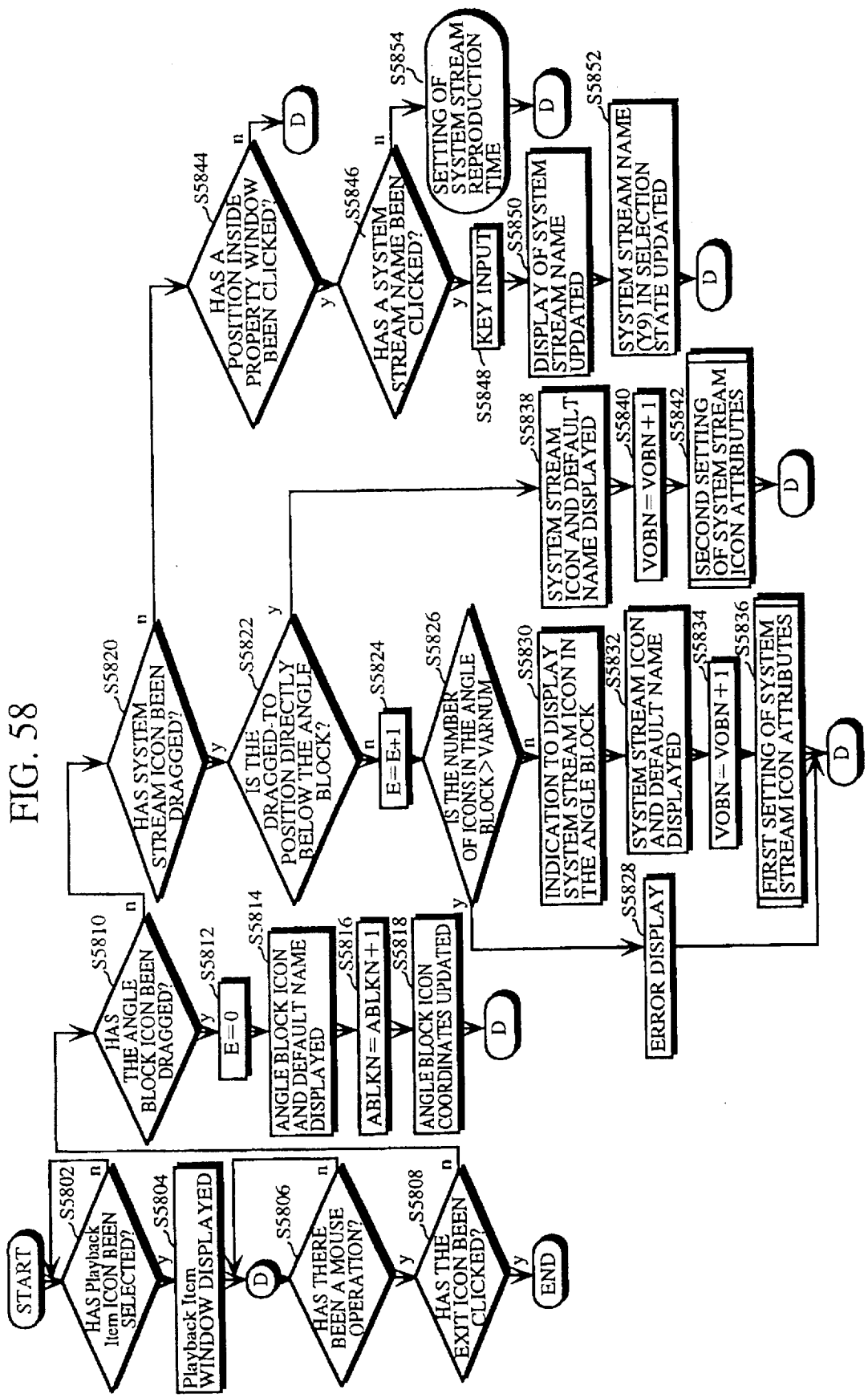
FIG. 58 is a flowchart showing the details of the operation in S5608 shown in FIG. 56.
Figure 59:
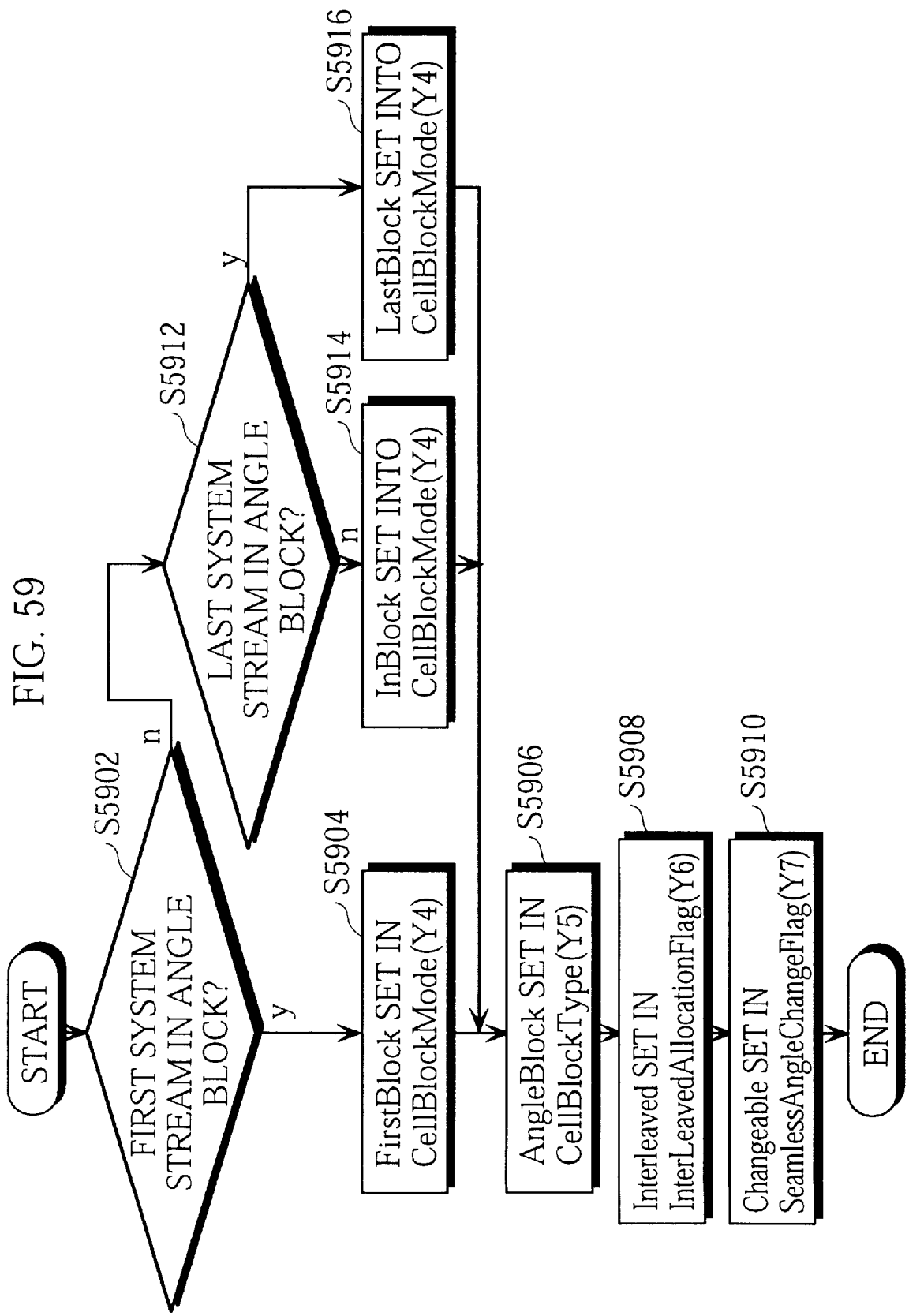
FIG. 59 is a flowchart showing the details of the operation in S5834 shown in FIG. 58.
Figure 60:
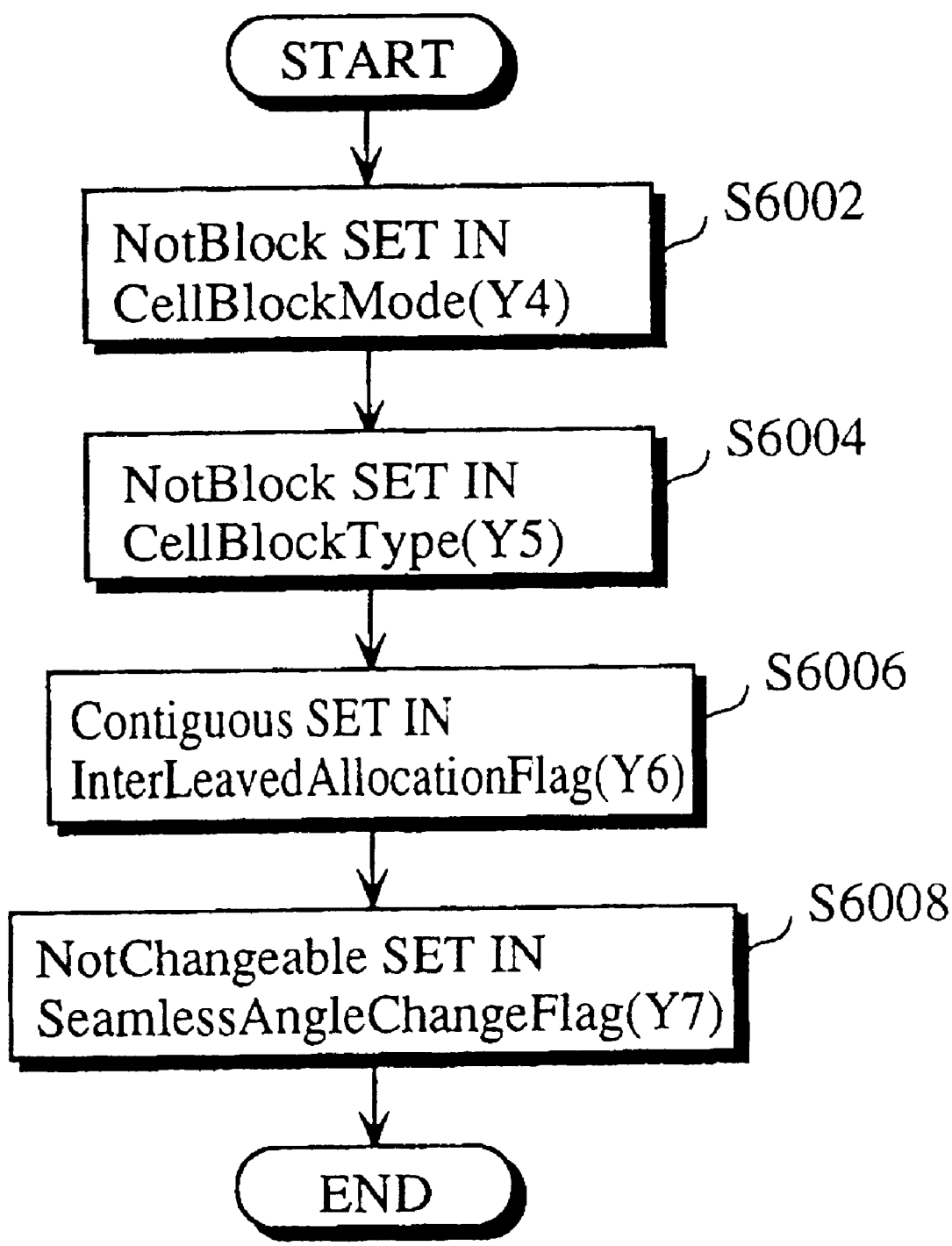
FIG. 60 is a flowchart showing the details of the operation in S5842 shown in FIG. 58.
Figure 61:
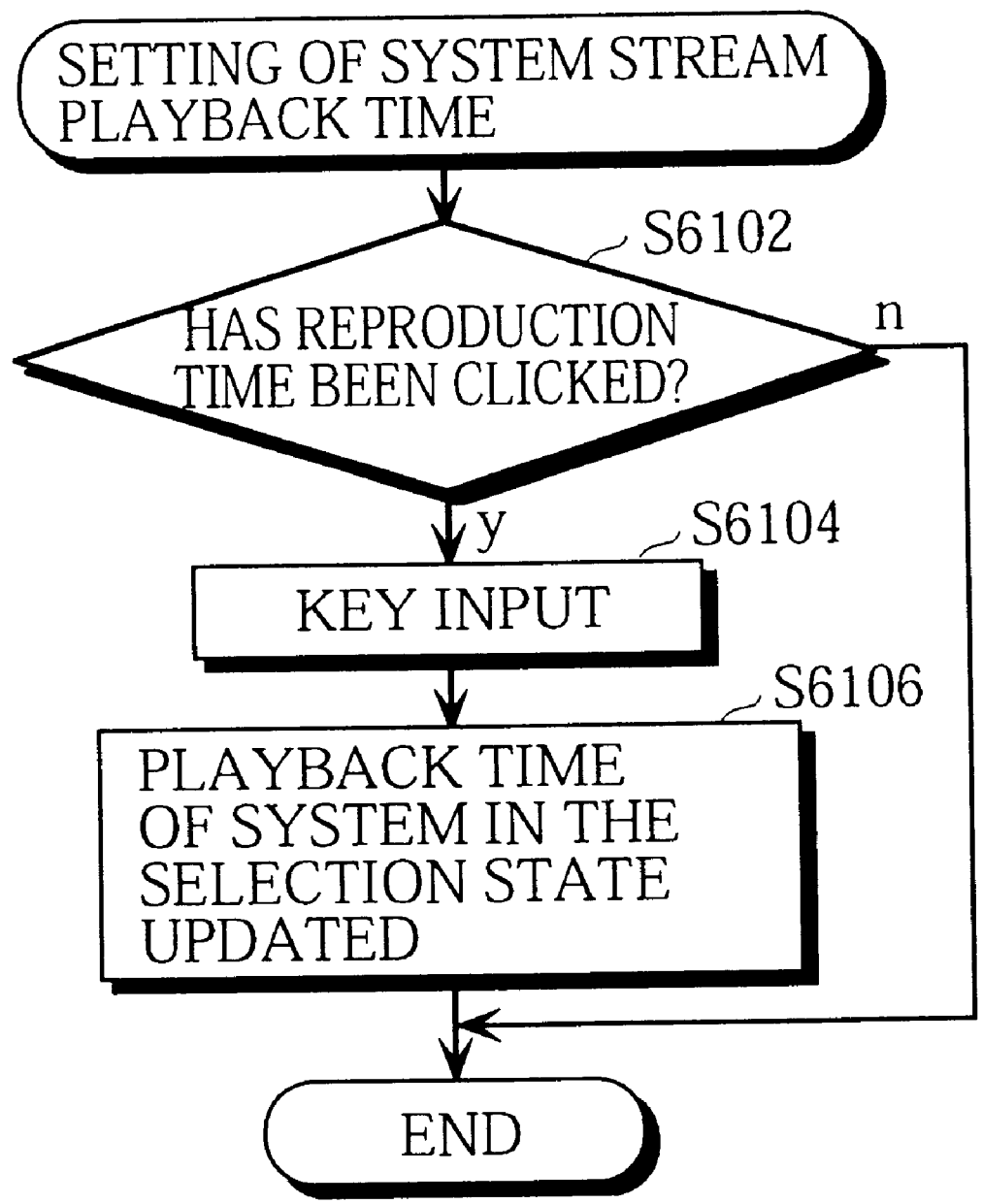
FIG. 61 is a flowchart showing the details of the operation in S5854 shown in FIG. 58.
Figure 62:
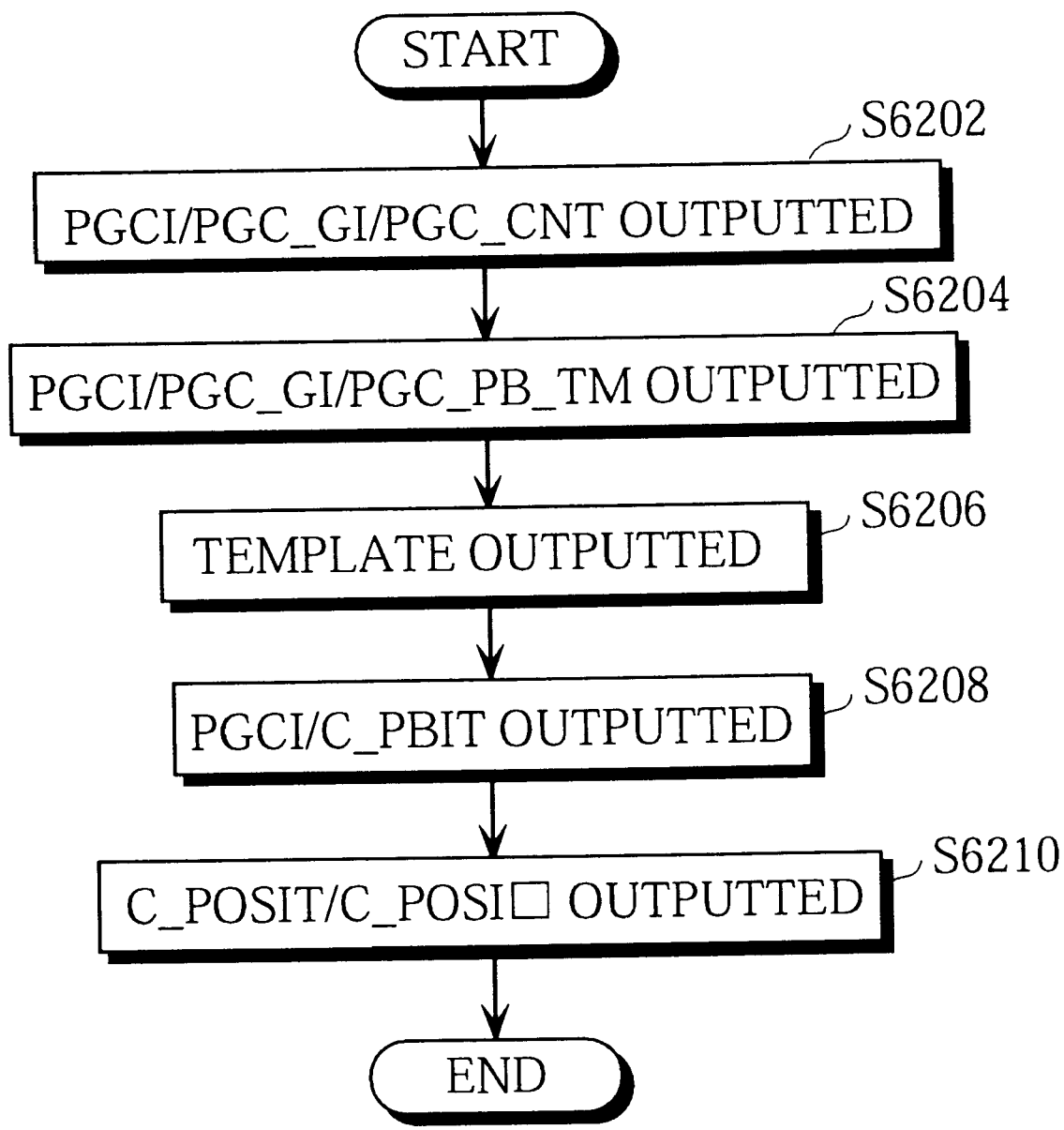
FIG. 62 is a flowchart showing the details of the operation in S5610 shown in FIG. 56.

FIG. 46 shows the "Playback Items" window 4601 for editing the system stream reproduction control information of angle blocks. The editing area 4602 of this "Playback Items" window 4601 is blank in its initial state. The state shown in FIG. 46 is when the editing of the system stream reproduction order of an angle block is complete.

It should be noted here that the character string "Close Up Scene 1" that follows after the variable name "Close Up" to the right of the "System Stream" icon 4603 in the editing area 4602 has been inputted using the property window 4701 for system streams shown in FIG. 47. This property window 4701 for system stream is used for the input of "Playback Time" 4703 in addition to the input of the system stream names 4702.

The input data storage unit 1507 stores an attribute table for an angle block and an attribute table for system stream icons. FIG. 48 shows the attribute table for angle blocks. This attribute table 4801 includes an angle block number column 4802, a number of angles in block column 4803, and an icon coordinates column 4804. The number of angles in a block is the number of system streams included in a block.

It should be noted here that when a plurality of angle blocks are included in a title, values are stored in each column of the attribute table for an angle block with each angle block number.

FIG. 49 shows the attribute table for system stream icons. This attribute table 4901 is composed of an icon coordinates column 4902, a system stream number (Y3) column 4903, a cell block mode (Y4) column 4904, a cell block type (Y5) column 4905, an interleaved allocation flag (Y6) column 4906, a seamless angle change flag (Y7) column 4907, a system stream name (Y9) column 4908, and a system stream playback time (Y8) column 4909.

The control unit 1505 writes in the content of the columns 4802–4804 and 4902–4909 in accordance with the content of operations received from the user via the input operation unit 1501.

On being activated by the control unit 1505, the reproduction control information generation unit 1508 reads all of the data in the attribute table for system stream icons from the input data storage unit 1507 and uses the read data to set the parameter strings in the template stored in the script information storage unit 1504, and by doing so generates script information for the system stream reproduction control information. As a result, the script information shown in FIGS. 50–55 is generated. It should be noted here that parts of the template of script information shown in FIGS. 35 to 43 that have not been converted (i.e., had the parameters set), which is to say the script sequence 3501 in FIG. 35, the script sequence for audio stream attributes in FIG. 36, the script sequences for sub-picture stream attributes in FIGS. 37 and 38, the script sequence 3901 and the script sequence 3902 showing the display colors for the sub-picture streams in FIG. 39, the script sequences in FIGS. 40 and 41, and the script sequences 4201 and 4202 in FIG. 42, are used as they are.

The following is an explanation of the operation in the present embodiment with reference to the flowcharts in FIGS. 56–66.

First, the producer of the system stream reproduction control information of an angle block makes an operation via the input operation unit 1501 to have the "Author" window 1901 (see FIG. 19) displayed on the GUI of the display unit 1502 of the editing apparatus, and indicates the "Author" icon 1915 using the mouse 1404. The control unit 1505 waits for notification of the indicated content from the input operation unit 1501 (S5602), and on receiving such notification instructs the display control unit 1506 to have the "SampleDisc" window 1902 displayed. In the same way, when a user selection of the "Title Division" icon 1909 has been received, the display control unit 1506 has the "Title Division" window 1903 displayed (S5604). It should be noted here that in the present state, the "Sample Disc" window 1902 and the "Title Division" window 1903 are displayed within the "Author" window 1901.

The editing apparatus sets the generation variables for the angle block (S5606) and performs the editing process for the reproduction control information (S5608) before generating the scripts for the system stream reproduction control information (S5610), and terminating its procedure.

The following is an explanation of the detailed operation for the setting of the generation variables for an angle block in S5606.

First, the control unit 1505 initializes the variables. In more detail, the number of angle blocks ABLKN, the number of system streams VOBN, and the number of variables VARNUM are all set at '0' (S5702).

Next, the control unit 1505 waits for notification of a selection of the "Title Set Variables" icon 1910 in the "Title Division" window 1903 by the producer using the input operation unit 1501 (S5704), and on receiving such notification instructs the display control unit 1506 to display the "Variables" window.

The display control unit 1506 reads the window information stored in the window information storage unit 1503 and has the display unit 1502 display the "Variables" window 4401 (see FIG. 44) (S5706).

The control unit 1505 next waits for notification of a mouse 1404 operation from the input operation unit 1501 (S5708), and judges whether the user has clicked the "OK" button 4403 (S5710). If so, the control unit 1505 sets the present number of variables VARNUM into the angle block attribute table 4801 in the input data storage unit 1507 as the number of angles in one block and terminates the process. If not, the control unit 1505 judges whether the right button 1405 of the mouse 1404 has been clicked on the "Angle" button (S5712). If not, the processing returns to SS708, or if so, the control unit 1505 instructs the display control unit 1506 to display the variable operation menu.

The display control unit 1506 reads the window information stored in the window information storage unit 1503 and has the variable operation window (called the "Add Value" window) 1905 displayed (S5714).

The control unit 1505 judges whether notification of the selection of the "Add Value" item 1916 has been received from the input operation unit 1501 (S5716) and if so, adds "1" to the number of variables VARNUM (S5718), before instructing the display control unit 1506 to display a default variable name character string.

The display control unit 1506 reads the window information at a predetermined position in the "Variables" window 4401 of the display unit 1502 and has the default variable name character string displayed (S5720), before the processing returns to S5708.

When the judgement in S5716 is negative, the control unit 1505 judges whether notification of a selection of the "Properties" item 1917 has been received from the input operation unit 1501 (S5722), and if not, the processing returns to S5708. It such notification has been received, the control unit 1505 instructs the display control unit 1506 to display a property window.

The display control unit 1506 reads the window information in the window information storage unit 1503 and has the display unit 1502 display the property window 4501 (S5724) shown in FIG. 45.

The control unit 1505 then receives notification of an inputted character string from the input operation unit 1501. In more detail, the producer uses the keyboard 1403 to input the character string "Close Up" into the input frame 4502 shown in FIG. 45 (S5726).

The control unit 1505 updates the default character string to the inputted character string in the received notification (S5728), and writes it into the window information storage unit 1503 corresponding to the value of VARNUM (S5730), before the processing returns to S5708. The display control unit 1506 then has this updated character string displayed at the predetermined position in the "Variables" window 4401. As one example, when "Distant View" is inputted as the third variable name, the content of the "Variables" window 4401 is as shown in FIG. 44.

The following is an explanation of the details of the editing process for reproduction control information in S5608.

First, the control unit 1505 waits for notification from the input operation unit 1501 of a selection of the "Playback Items" icon 1913 in the "Title Division" window 1903 (S5802), and on receiving such notification instructs the display control unit 1506 to have the "Playback Items" window 4601 displayed.

The display control unit 1506 has the "Playback Items" window 4601 displayed by the display unit 1502 (S5804). It should be noted here that in this initial state, nothing is displayed in the editing area 4602 of the "Playback Items" window 4601 shown in FIG. 46. At the same time, the property window 4701 shown in FIG. 47 is also displayed.

The control unit 1505 waits for notification from the input operation unit 1501 of a mouse 1404 operation (S5806) and on receiving such notification, judges whether the "Exit" icon 4605 has been clicked (S5808). If so, the control unit 1505 terminates the processing. If not, the control unit 1505 judges whether the angle block icon has been dragged (S5810) and if so, the control unit 1505 sets the counter E showing the number of icons in the angle block to the initial value "0" (S5812).

The control unit 1505 next instructs the display control unit 1506 to have the angle block icon 4604 that has been dragged into the into the display area 4606 and the default name of the angle block displayed.

On being instructed by the control unit 1505 to have the angle block icon and default name displayed, the display control unit 1506 has the angle block icon 4609 displayed at the indicated position in the editing area 4602 of the "Playback Items" area 4601, in addition to having a default name for the angle block, for example, "Angle Branch 1 (Angle= ?)", that it has read from the window information storage unit 1503 displayed (S5814).

The control unit 1505 then adds "1" of the variable ABLKN (S5816), writes the values of the angle block number (the value of ABLKN) 4802 and the coordinates 4804 of the chosen icon into the angle block attribute table 4801 in the input data storage unit 1507 (S5818), before the processing returns to S5806.

When the judgement in S5810 is negative, the control unit 1505 judges whether notification of a drag operation of the "system stream" icon 4607 (S5820) has been received. If so, the control unit 1505 judges whether the dragged-to position is the display area 4606 of the angle block icon or directly below this area (S5822). If not, the control unit 1505 adds "1" to the counter E (S5824). The control unit 1505 then judges whether the number of icons in the angle block, which is to say whether the value of the counter E exceeds the variable VARNUM (S5826). If so, the control unit 1505 instructs the display control unit 1506 to display the "Error" message.

The display control unit 1506 has the "Error display" displayed in the editing area 4602 of the "Playback items" window 4601 (S5828). By doing so, the user can be prevented from mistakenly setting a number of system streams that exceeds the number of angles that can be set in the angle block (the number of repetition of "Add Value indicated in S5716).

When the judgement in S5826 is negative, the control unit 1505 instructs the display control unit 1506 to display the system stream icon 4607 in the display area 4608 for the angle block (S5830).

When the system stream icon has been selected, the display control unit 1506 has the system stream icon 4603 displayed in the display area 4608 together with the default name of the system stream read from the window information storage unit 1503 (S5832). The control unit 1505 then adds "1" to VOBN (S5834), and proceeds to the subroutine for the first subroutine for setting the system stream icon attributes (S5836), before returning to S5806. It should be noted here that in S5834, the value of the variable VOBN shows the total number of system stream icons in the displayed in the editing area 4602, while the value of the counter E in S5824 shows the number of system stream icons in an angle block that is presently being edited.

When the judgement in S5822 is positive, the control unit 1505 instructs the display control unit 1506 to display the system stream icon in the display area 4606 or at a position directly below it. On receiving such instructions, the display control unit 1506 has the system stream icon 4610 displayed at the indicated position in the editing area 4602, while at the same time having the default name corresponding to the system stream icon read from the window information storage unit 1503 displayed.

The control unit 1505 adds "1" to the variable VOBN (S5840) and proceeds to the second subroutine for setting the system stream icon attributes (S5842), and after that returns to S5806.

When the judgement in S5820 is negative, the control unit 1505 judges whether notification of a mouse click inside the property window 4701 has been received from the input operation unit 1501 (S5844), and if not, the processing returns to S5806. If so, the control unit 1505 judges whether the system stream name 4702 has been clicked (S5846).

When the judgement in S5846 is positive, a key input of a character string is received by the input operation unit 1501 (S5848). The control unit 1505 then notifies the display control unit 1506 of the character string received by the input operation unit 1501, and the display control unit 1506 has the display of the system stream name updated. As one example, when the character string "Close up Scene 1" has been received, this character string is displayed to the right of the system stream icon 4603 in place of the displayed default name "Cell 1" as shown in FIG. 46 (S5850).

The control unit 1505 then writes the inputted character name into the system stream name (Y9) column 4908 of the system stream icon attribute table 4901 in the input data storage unit 1507 (S5852).

When the judgement is negative in S5846, the control unit 1505 proceeds to the subroutine for setting the system stream playback time (S5854), and after that returns to S5806.

The following is a detailed explanation of the first subroutine for setting the icon attributes in S5856.

The control unit 1505 first judges whether the system stream in the displayed angle block is the first system stream, which is to say, whether the value of counter E is "1" (S5902). If so, the control unit 1505 writes "First Block" into the "Cell Block Mode(Y4)" corresponding to the icon coordinates (x,y) of the displayed icon in the system stream icon attribute table 4901 in the input data storage unit 1507 (S5904), in addition to writing "Angle Block" into the "Cell Block Type(Y5)" (S5906), "Interleaved" into the "Interleaved Allocation Flag (Y6)" (S5908), writing "Changeable" into the "Seamless Angle Change Flag (Y7)" (S5910), and terminating the processing.

When the judgement in S5902 is negative, the control unit 1505 judges whether the system stream is the final system stream in an angle block, which is to say, whether E=VARNUM (S5912). If not, the control unit 1505 writes "In Block" into the "Cell Block Mode (Y4)" column (S5914), and the processing proceeds to S5906. When the judgement in S5902 is positive, the control unit 1505 writes "Last Block" into the "Cell Block Mode (Y4)" column (S5914), and the processing proceeds to S5906.

The following is a detailed explanation of the second subroutine for setting the icon attributes in S5842.

The control unit 1505 first writes "Not Block" into the "Cell Block Mode (Y4)" column (S6002), in addition to writing "Not block" into the "Cell Block Type(Y5)" column (S6004), "Contiguous" into the "Interleaved Allocation Flag (Y6) column (S6006), writing "Not Changeable" into the "Seamless Angle Change Flag (Y7)" column (S6008), and terminating the processing.

The following is a detailed explanation of the subroutine for setting for the system stream playback time in S5854.

The control unit 1505 first judges whether notification of a click on the playback time has been received from the input operation unit 1501 (S6102) and if not, terminates the processing. If so, the control unit 1505 receives notification of a key input, such as "00:00;10:00" shown in FIG. 47, for the playback time (S6104).

The control unit 1505 writes the playback time of the system stream in the selection state into the system stream playback time (Y8) column of the system stream icon attribute table 4901 in the input data storage unit 1507 (S6106), and then terminates the processing.

The following is a detailed explanation of the script generation process in S5610.

Tho producer first uses the mouse 1404 to click the item "Disc" out the menu items "File Edit Disc Title Set Window Help" in the "Author" window 1901 and clicks the displayed "Publish" icon (not illustrated). On receiving notification of such from the input operation unit 1501, the control unit 1505 activates the reproduction control information generation unit 1508.

On being activated by the control unit 1505, the reproduction control information generation unit 1508 reads the contents of the attribute tables 4801, 4901 stored in the input data storage unit 1507, uses the read information to set the parameter strings in the template of script information stored in the script information storage unit 1504, and outputs the number of system streams included in the system stream reproduction control information of an angle block (S6202). The reproduction control information generation unit 1508 also outputs the playback times of the system streams (S6204), scripts in the template which do not need to be changed (S6206), the system stream reproduction control information (S6208), and the filenames of the system streams (S6210).

Figure 63:
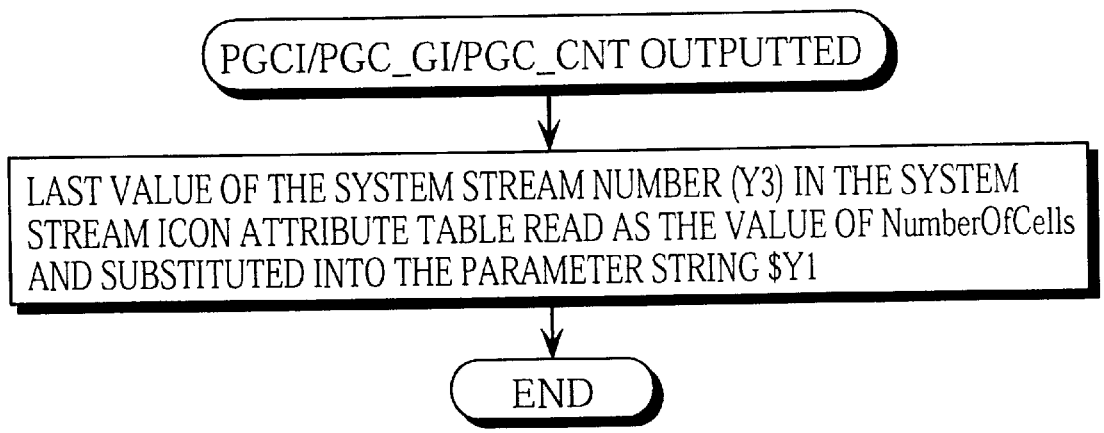
FIG. 63 shows the content or S6202 shown in FIG. 62.

As shown in FIG. 63, in S6202 the reproduction control information generation unit 1508 reads the value of the last system stream number (Y3) in the system stream icon attribute table 4901 stored in the input data storage unit 1507, uses it to set the parameter string "SY1" 3502 in the script sequence 3501 of the template stored in the script information storage unit 1504, and outputs the result which is the script sequence 5001 shown in FIG. 50. The information in this script sequence 5001 corresponds to the number of stored programs 803 in the PGC information 801 shown in FIG. 6.

Figure 64:
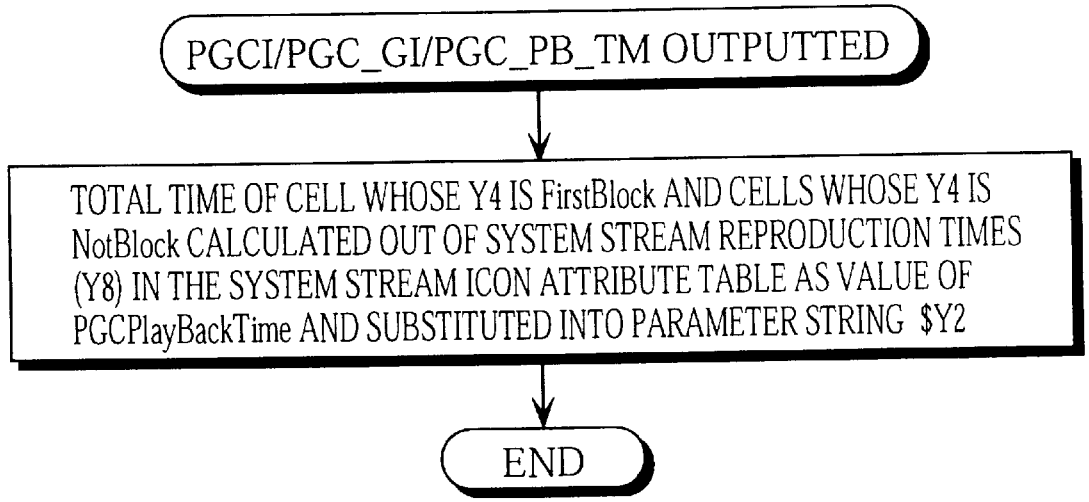
FIG. 64 shows the content of S6204 shown in FIG. 62.
Figure 65:
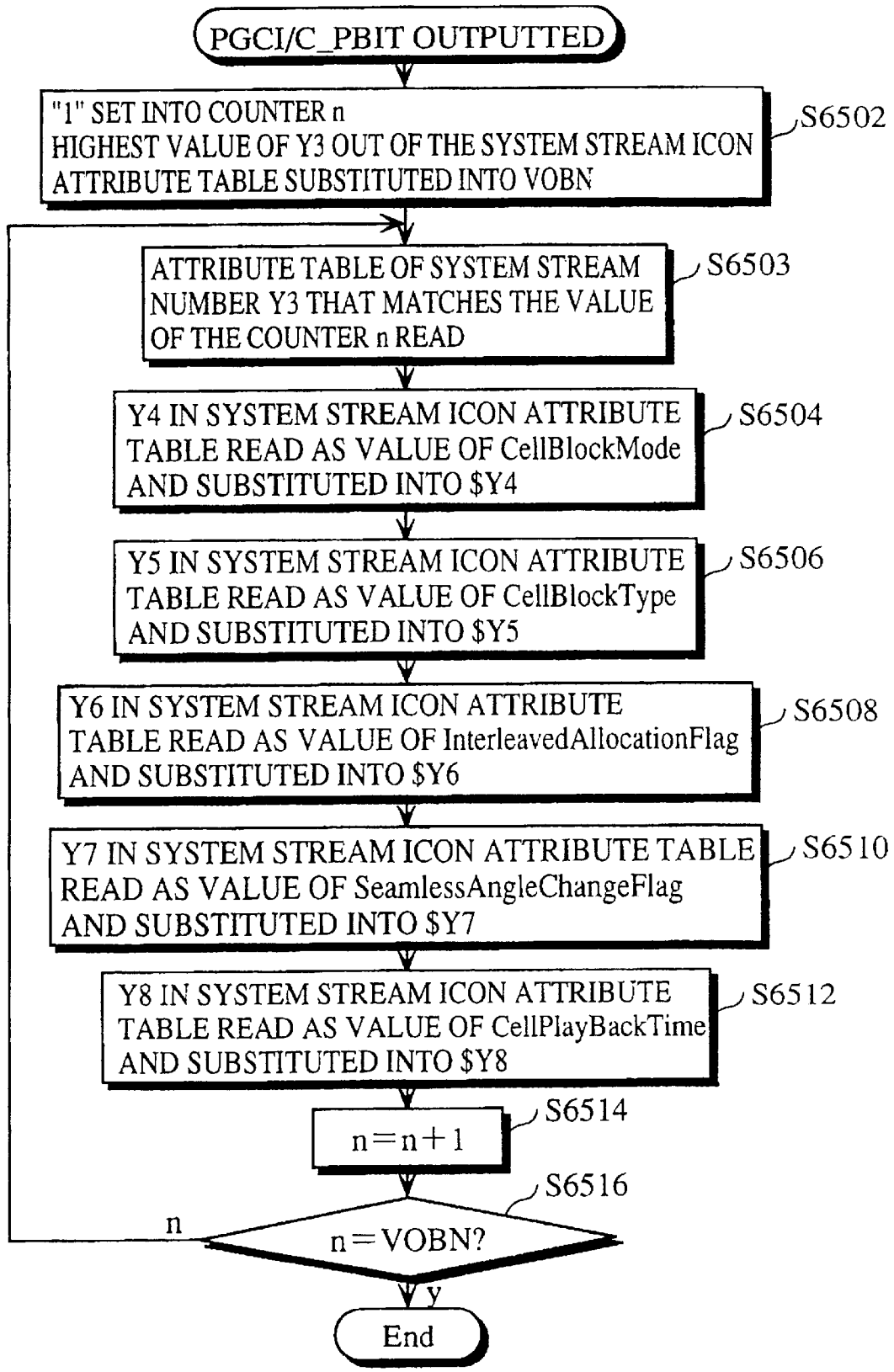
FIG. 65 is a flowchart showing the details of the operation in S6208 shown in FIG. 62.
Figure 66:
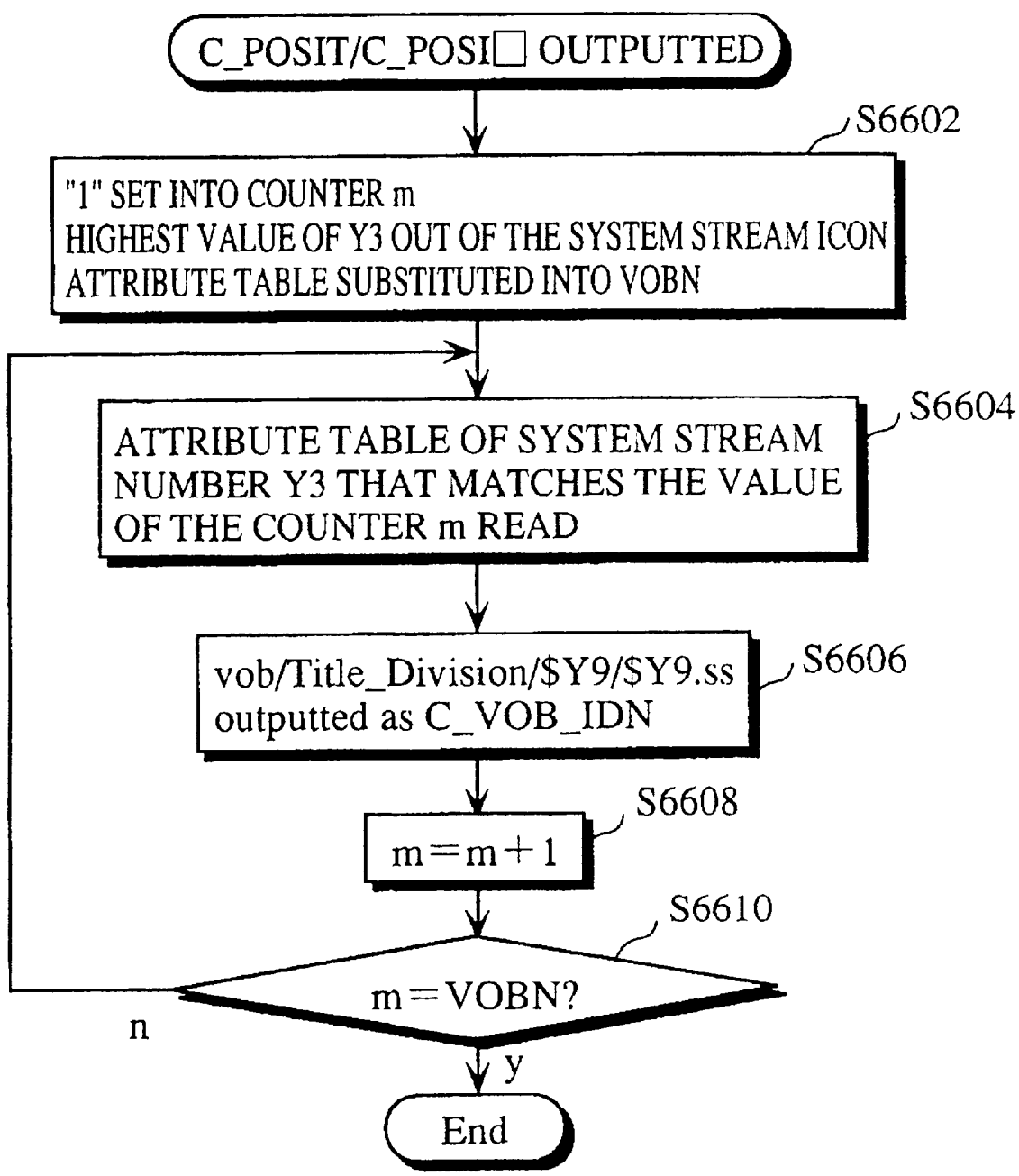
FIG. 66 is a flowchart showing the details of the operation in S6210 shown in FIG. 62.

AS shown in FIG. 64, in S6204 the reproduction control information generation unit 1508 totals the playback times of the system streams whose Cell Block Mode(Y4) is "First Block" or "Not Block", out of all of the system stream playback times (Y8) in the system stream icon attribute table stored in the input data storage unit 1507, and uses the calculated total to set the parameter string "SY2". As a result, the script sequence 5002 shown in FIG. 50 is outputted. The information in this script sequence 5002 corresponds to the PGC playback time 804 of the PGC information 801 shown in FIG. 8.

In S6208, the reproduction control information generation unit 1508 sets the counter n at "1", and substitutes the highest value out of the system stream numbers (Y3) in the system stream icon attribute table 4901 into the variable VOBN (S6502).

The reproduction control information generation unit 1508 next reads the row of the system stream whose system stream number Y3 matches the value or the counter n in the system stream icon attribute table 4901 (S6503). First, the reproduction control information generation unit 1508 sets the parameter string "SY4" 4302 shown in FIG. 43 using tie value Y4 (S6504), sets the parameter string "SY5" 4303 using the value Y5 (S6506), sets the parameter string "SY6" 4305 using the value Y6 (S6508), and sets the parameter string "SY7" 4307 using the value Y7 (S6510). After this, the reproduction control information generation unit 1508 sets the parameter string "SY8" 4311 using the value Y8 (S6512), and adds "1" to the value of the counter n (S6514). The reproduction control information generation unit 1508 then judges whether the counter n is equal to the variable VOBN (S6512), and if so terminates the processing. If not, the processing returns to S6503 and the processing is repeated, resulting in an output of the script sequences shown in FIGS. 51 to 54. The information in these script sequences corresponds to the number of stored programs 803, the PGC playback time 804, the direct access information table 805, and the number of stored cells 806 out of the PGC information 801 shown in FIG. 8, in addition to the cell attribute information 809 and the cell playback time 810, out of the storage cell information 808 included in the cell reproduction information table 807.

In S6210, the reproduction control information generation unit 1508 sets "1" into the counter "m" and substitutes the highest value out of the system stream numbers Y3 in the system stream icon attribute table 4901 into the variable VOBN (S6602). After this, the reproduction control information generation unit 1508 reads the row of the system stream icon attribute table 4901 for the system stream whose system stream number Y3 matches the value of the counter m (S6604), and sets the parameter string "SY9" 4314 using the value Y9 (S6606). The reproduction control information generation unit 1508 adds "1" to the value of the counter (S6608) and judges whether the counter m is equal to the variable VOBN (S6610). If so, the reproduction control information generation unit 1508 terminates the processing, or if not, the processing returns to S6604.

As a result of the processing described above, the script sequences shown in FIG. 55 are outputted. The information in these script sequences shows the filenames of the system streams referred to during the reproduction of the PGC information 801 (see FIG. 8). Regarding the filenames of system streams, the subsystem that converts these scripts into binary and into data for DVD-VIDEO standard determines the length of each system stream from its filename, so that the number of logical blocks 812 taken up by a cell and the offset to the cell data 811, which are form part of the storage cell information 808 in the PGC information 801, can be found.

It should be noted here that while the above embodiments describe an editing apparatus for system stream reproduction control information that is a reproduction order for system streams in menu language units and angle blocks, the editing apparatus of the present invention is not limited to the editing of system stream reproduction control information for such menu language units and angle blocks. It should be obvious the present editing apparatus can also be used to edit system streams that are included in titles in the title set and system streams that are included in parental lock sections. When doing so, the script information storage unit 1504 also stores a template for script information that is used for the title set and the parental lock section.

In the present embodiments, the script information storage unit was described as storing scripts in a text format that can be edited by a text editor, although it is also possible for the scripts to be in binary format whereby they cannot be read or edited by a text editor. In such a case, the script information storage unit stores the data in a binary format that corresponds to that of the scripts.

It is also possible for a program that can realize the above embodiments to be recorded onto a recording medium such as a floppy disc and then distributed, meaning that the present invention can easily be realized on an independent computer system.

Although the present invention has been fully described by way of examples with reference to accompanying drawings, it is to be noted that various changes and modifications will be apparent to those skilled in the art. Therefore, unless such changes and modifications depart from the scope of the present invention, they should be construed as being included therein.

What is claimed is:

1. A system stream reproduction control information editing apparatus for editing system stream reproduction control information that includes a reproduction route for system streams that are recorded on a multimedia optical disc and contain image information the reproduction route including a selective reproduction period during which one of a plurality of system streams is selected for reproduction, the system stream reproduction control information editing apparatus comprising:

template information storage means for storing a template used for generating the system stream reproduction control information, the template being composed of predetermined scripts and at least one parameter, one of the scripts defining a reproduction route construction of the selective reproduction period, and one of the parameters indicating a number of system streams that can be selectively reproduced during the selective reproduction period;

display means for displaying a plurality of windows for editing the system stream reproduction control information;

operation receiving means for receiving an operation made by an editor in the windows displayed by the display means; and editing control means for editing the system stream reproduction control information by setting the parameters in the template stored in the template information storage means based on the operation received by the operation receiving means;

wherein the editing control means includes:

a window information storage unit for storing window information that includes a display content of each of the plurality of windows displayed by the display means;

a display control unit for reading the window information from the window information storage unit and having a window displayed by the display means in accordance with the read window information;

an operation interpreting unit for interpreting the operation received by the operation receiving means and instructing the display control unit to have a window displayed in accordance with an interpretation of the received operation;

an editing information storage unit for storing information that is necessary for editing the system stream reproduction control information, in accordance with the interpretation of the operation; and a reproduction control information editing unit for reading the information stored in the editing information storage unit and editing the system stream reproduction control information by setting the parameters in the template stored in the template information storage means; and wherein:

the operation interpreting unit includes a first window display indicating unit for instructing the display control unit to display a first window for inputting a number of system streams that can be selectively reproduced during the selective reproduction period, the operation receiving means includes a number of system streams receiving unit for receiving an input of the number of system streams that can be selectively reproduced during the selective reproduction period made via the first window displayed on the display means, and the editing information storage unit stores the number of system streams that can be selectively reproduced during the selective reproduction period in accordance with an interpreting by the operation interpreting unit.

2. The system stream reproduction control information editing apparatus of claim 1, wherein the window information storage unit stores icon information for icons that are to be displayed in a window as a part of the window information, the icons corresponding to system streams, wherein the operation interpreting unit further includes a second window display indicating unit which, when the number of systeim streams receiving unit has received the input of the number of system streams that can be selectively reproduced during the selective reproduction period, instructs the display control unit to display a second window that has an editing area for editing the reproduction route of the system streams, the second window displaying the icons that correspond to the system streams to display a part of the reproduction route being edited by the editor, wherein the operation receiving means further includes a reproduction route receiving unit for receiving a drag operation that moves a moved icon to a predetermined position in the editing area of the second window displayed by the display means, and wherein the operation interpreting unit further includes:

a system stream linking unit for linking the system streams in accordance with a position of the moved icon after the drag operation is received by the reproduction route receiving unit, wherein a linking or system streams equates to generation of linking information for system streams, the linking information forms the reproduction route, and the editing information storage unit stores the linking information that results from the linking of system streams related to icon positions of icons corresponding to the linked system streams; and a reproduction route display indicating unit for instructing the display control unit to display the icons in the editing area linked together to visually represent the reproduction route of the system streams linked by the system stream linking unit, wherein the display control unit displays the icons in the editing area linked together.

3. The system stream reproduction control information editing apparatus of claim 2, wherein the operation receiving means further includes an editing operation receiving unit for receiving an editing indication for the system stream reproduction control information, and wherein the reproduction control information editing unit reads the template stored in the template information storage means and edits the system stream reproduction control information by setting the parameters in the read template, in accordance with the number of system streams and the reproduction route stored corresponding to icon positions stored in the editing information storage unit.

4. A system stream reproduction control information editing apparatus for editing system stream reproduction control information that includes a reproduction route for system streams that are recorded on a multimedia optical disc and contain image information, the reproduction route including a selective reproduction period during which one of a plurality of system streams is selected for reproduction, the system stream reproduction control information editing apparatus comprising:

template information storage means for storino a template used for generating the system stream reproduction control information, the template being composed of predetermined scripts and at least one parameter, one of the scripts defining a reproduction route construction of the selective reproduction period, and one of the parameters indicating a number of system streams that can be selectively reproduced during the selective reproduction period;

display means for displaying a plurality of windows for editing the system stream reproduction control information;

operation receiving means for receiving an operation made by an editor in the windows displayed by the display means; and editing control means for editing the system stream reproduction control information by setting the parameters in the template stored in the template information storage means based on the operation received by the operation receiving means;

wherein the editing control means includes:

a window information storage unit for storing window information that includes a display content of each of the plurality of windows displayed by the display means;

a display control unit for reading the window information from the window information storage unit and having a window displayed by the display means in accordance with the read window information;

an operation interpreting unit for interpreting the operation received by the operation receiving means and instructing the display control unit to have a window displayed in accordance with an interpretation of the received operation;

an editing information storage unit for storing information that is necessary for editing the system stream reproduction control information in accordance with the interpretation of the operation; and a reproduction control information editing unit for reading the information stored in the editing information storage unit and editing the system stream reproduction control information by setting the parameters in the template stored in the template information storage means; and wherein:

the operation interpreting unit includes a first window display indicating unit for instructing the display control unit to display a first window for inputting a number of system streams that can be selectively reproduced during the selective reproduction period, the operation receiving means includes a number of system streams receiving unit for receiving an input of the number of system streams that can be selectively reproduced during the selective reproduction period made via the first window displayed on the display means, and the editing information storage unit stores the number of system streams that can be selectively reproduced during the selective reproduction period in accordance with an interpreting by the operation interpreting unit; and wherein the window information storage unit stores icon information for icons that are to be displayed in a window as part of the window information, the icons corresponding to system streams, wherein the operation interpreting unit further includes a second window display indicating unit which, when the number of system streams receiving unit has received the input of the number of system streams that can be selectively reproduced during the selective reproduction period, instructs the display control unit to display a second window that has an editing area for editing the reproduction route of the system streams, the second window displaying the icons that correspond to the system streams to display a part of the reproduction route being edited by the editor, wherein the operation receiving means further includes a reproduction route receiving unit for receiving a drag operation that moves a moved icon to a predetermined position in the editing area of the second window displayed by the display means, and wherein the operation interpreting unit further includes:

a system stream linking unit for linking the system streams in accordance with a position of the moved icon after the drag operation is received by the reproduction route receiving unit, wherein a linking of system streams equates to generation of linking information for system streams, the linking information forms the reproduction route, and the editing information storage unit stores the linking information that results from the linking of system streams related to icon positions of icons corresponding to the linked system streams; and a reproduction route display indicating unit for instructing the display control unit to display the icons in the editing area linked together to visually represent the reproduction route of the system streams linked by the system stream linking unit, wherein the display control unit displays the icons in the editing area linked together; and wherein the operation receiving means further includes an editing operation receiving unit for receiving an editing indication for the system stream reproduction control information, and wherein the reproduction control information editing unit reads the template stored in the template information storage means and edits the system stream reproduction control information by setting the parameters in the read template, in accordance with the number of system streams and the reproduction route stored corresponding to icon positions stored in the editing information storage unit; and wherein the operation interpreting unit further includes:

a third window display indicating unit for instructing the display control unit to display a third window that shows a list of edited objects when an operation received by the operation receiving unit is an indication of start editing, each edited object being a system stream that is selectively reproduced and is one of (a) a menu language unit for a language used in a menu and (b) one angle out of a multiangle, wherein the operation receiving means further includes an edited object receiving unit for receiving an operation that selects one of the edited objects from the menu items displayed in the third window displayed by the display means, and wherein when the editing object receiving unit has received a selection of a multiangle as the edited object, and the operation interpreting unit judges that a display position of the moved icon after the drag operation is within an area including the multiangle, the system stream linking unit judges that the system stream corresponding to the moved icon is included in the selective reproduction period and links the system stream as one system stream in the selective reproduction period, while when the operation interpreting unit judges that the display position of the moved icon after the drag operation is not within an area including the multiangle, the system stream linking unit judges that the system stream corresponding to the moved icon is not included in the selective reproduction period and links the system stream as a separate system stream, with the editing information storage unit storing information showing whether each system stream is included in the selective reproduction period or is a separate system stream.

5. A system stream reproduction control information editing apparatus for editing system stream reproduction control information that includes a reproduction route for system streams that are recorded on a multimedia optical disc and contain image information, the reproduction route including a selective reproduction period during which one of a plurality of system streams is selected for reproduction, the system stream reproduction control information editing apparatus comprising:

template information storage means for storing a template used for generating the system stream reproduction control information, the template being composed of predetermined scripts and at least one parameter, one of the scripts defining a reproduction route construction of the selective reproduction period, and one of the parameters indicating a number of system streams that can be selectively reproduced during the selective reproduction period;

display means for displaying a plurality of windows for editing the system stream reproduction control information;

operation receiving means for receiving an operation made by an editor in the windows displayed by the display means; and editing control means for editing the system stream reproduction control information by setting the parameters in the template stored in the template information storage means based on the operation received by the operation receiving means;

wherein the editing control means includes:

a window information storage unit for storing window information that includes a display content of each of the plurality of windows displayed by the display means;

a display control unit for reading the window information from the window information storage unit and having a window displayed by the display means in accordance with the read window information;

an operation interpreting unit for interpreting the operation received by the operation receiving means and instructing the display control unit to have a window displayed in accordance with an interpretation of the received operation;

an editing information storage unit for storing information that is necessary for editing the system stream reproduction control information, in accordance with the interpretation of the operation; and a reproduction control information editing unit for reading the information stored in the editing information storage unit and editing the system stream reproduction control information by setting the parameters in the template stored in the template information storage means; and wherein:

the operation interpreting unit includes a first window display indicating unit for instructing the display control unit to display a first window for inputting a number of system streams that can be selectively reproduced during the selective reproduction period, the operation receiving means includes a number of system streams receiving unit for receiving an input of the number of system streams that can be selectivey reproduced during the selective reproduction period made via the first window displayed on the display means, and the editing information storage unit stores the number of system streams that can be selectively reproduced during the selective reproduction period in accordance with an interpreting by the operation interpreting unit; and wherein the window information storage unit stores icon information for icons that are to be displayed in a window as part of the window information, the icons corresponding to system streams, wherein the operation interpreting unit further includes a second window display indicating unit which, when the number of system streams receiving unit has received the input of the number of system streams that can be selectively reproduced during the selective reproduction period, instructs the display control unit to display a second window that has an editing area for editing the reproduction route of the system streams, the second window displaying the icons that correspond to the system streams to display a part of the reproduction route being edited by the editor, wherein the operation receiving means fuirther includes a reproduction route receiving unit for receiving a drag operation that moves a moved icon to a predetermined position in the editing area of the second window displayed by the display means, and wherein the operation interpreting unit further includes:

a system stream linking unit for linking the system streams in accordance with a position of the moved icon after the drag operation is received by the reproduction route receiving unit, wherein a linking of system streams equates to generation of linking information for system streams, the linking information forms the reproduction route, and the editing information storage unit stores the linking information that results from the linking of system streams related to icon positions of icons corresponding to the linked system streams; and a reproduction route display indicating unit for instructing the display control unit to display the icons in the editing area linked together to visually represent the reproduction route of the system streams linked by the system stream linking unit, wherein the display control unit displays the icons in the editing area linked together; and wherein the operation receiving means further includes an editing operation receiving unit for receiving an editing indication for the system stream reproduction control information, and wherein the reproduction control information editing unit reads the template stored in the template information storage means and edits the system stream reproduction control information by setting the parameters in the read template, in accordance with the number of system streams and the reproduction route stored corresponding to icon positions stored in the editing information storage unit; and wherein the operation interpreting unit further includes:

a third window display indicating unit for instructing the display control unit to display a third window that shows a list of edited objects when an operation received by the operation receiving unit is an indication to start editing, each edited object being a system stream that is selectively reproduced and is one of (c) a menu language unit for a language used in a menu and (d) one angle out of a multiangle, wherein the operation receiving means further includes an edited object receiving unit for receiving an operation that selects one of the edited objects from the menu items displayed in the third window displayed by the display means, and wherein when the editing object receiving unit has received a selection of a menu language unit as an edited unit, the number of system streams receiving unit receives a language code of a language used in a menu after receiving the number of system streams that can be selectively reproduced during the selective reproduction period and the editing information storage unit stores the received language code in accordance with an interpreting by the operation interpreting unit, wherein the parameters in the template also include a parameter that indicates a language code, and wherein the system stream reproduction control information editing unit edits the system stream reproduction control information by setting the parameter that indicates the language code using the language code stored by the editing information storage unit.

6. The system stream reproduction control information editing apparatus of claim 2, wherein the editing control means further includes:

a reproduction route judging unit for judging whether a linking of a system stream according to the drag operation for an icon received by the reproduction route receiving unit causes a number of system streams in the selective reproduction period to exceed the number of system streams that can be selectively reproduced during the selective reproduction period; and a reproduction route linking prohibiting unit for prohibiting a linking of the system stream by the system stream linking unit, when a judgement by the reproduction route judging unit is positive.

7. A system stream reproduction control information editing method for editing system stream reproduction control information that includes a reproduction route for system streams that are recorded on a multimedia optical disc and contain image information, the reproduction route including a selective reproduction period during which one of a plurality of system streams is selected for reproduction, the system stream reproduction indicating step for indicating display of a first window for inputting a number of system streams that can be selectively reproduced during the selective reproduction period;

a first display control step for reading window information for the first window from a window information storage unit that stores window information including a display content of each of a plurality of window, and having the first window displayed on the display screen;

a number of system streams receiving step for receiving an input of the number of system streams via the first window displayed on the display screen;

a first editing information storing step for storing the number of system streams received in the number of system streams receiving step;

a second window display indicating step for indicating display of a second window when the number of system streams receiving unit has received the input of the number of system streams, the second window having an editing area for editing the reproduction route of the system streams, the second window displaying icons that correspond to system streams to display a part of the reproduction route being edited by the editor;

a second display control step for reading window information for the second window from the window information storage unit, the window information storage unit also storing icon information for icons that are to be displayed in the second window, and for having the second window displayed on the display screen;

a reproduction route receiving step for receiving a drag operation that moves a moved icon to a predetermined position in the editing area of the second window displayed on the display screen;

a system stream linking step for linking system streams in accordance with a position of the moved icon after the drag operation received by the reproduction route receiving step, wherein a linking of system streams equates to generation of linking information for system streams, and the linking information forms the reproduction route;

a second editing information storing step for storing the linking information resulting from the linking of system streams by the system stream linking unit related to icon positions of icons corresponding to the system streams;

a reproduction route display indicating step for indicating a display of the icons in the editing area linked together to visually represent the reproduction route of the system streams linked by the system streams linking step;

a third display control step for having the icons in the editing area displayed linked together to show the linking of the system streams by the system stream linking step;

an editing operation receiving step for receiving an editing operation for the system stream reproduction control information, and a system stream reproduction control information editing step for reading a template for generating system stream reproduction control information from a template information storage unit that stores the template and editing the system stream reproduction control information in the read template by the setting parameters in accordance with the number of system streams stored in the first editing information storing step and the linking information stored in the second editing information storing step, the template being composed of predetermined scripts and at least one parameter and one of the parameters indicating a number of system streams that can be selectively reproduced during the selective reproduction period;

wherein the following steps are performed before the first window display indicating step:

an initial operation receiving step for receiving a commence editing operation from an editor;

a third window display indicating step for indicating, when the commence editing operation has been received in the initial operation receiving step, a display of a third window that displays a list of edited objects, the edited objects being sets of at least one system stream that are selectively reproduced and each edited object being one of (a) a menu language unit for one language used in a menu, and (b) one angle out of a multiangle; and a third window display control step for reading window information for the third window from the window information storage unit and having the third window displayed on the display screen, wherein the number of system streams received in the number of system streams receiving step is a number of languages for a case when the edited objects are menu language units and is a number of angles for a case when the edited objects are angles in the multiangle.

8. A computer-readable recording medium that is used for recording a program that is executed by a system stream reproduction control information editing apparatus that edits system stream reproduction control information including a reproduction route for system streams that are recorded on a multiangle optical disc and contain image information the reproduction route including a selective reproduction period during which one of a plurality of system streams is selected for reproduction, the program comprising the following steps:

a first window display indicating step for indicating display of a first window for inputting a number of system streams that can be selectively reproduced during the selected reproduction period;

a first display control step for reading window information for the first window from a window information storage unit that stores window information including a display content of each of a plurality of windows, and having the first window displayed on the display screen;

a number of system streams receiving step for receiving an input of the number of system streams via the first window displayed on the display screen;

a first editing information storing step for storing the number of system streams received in the number of system streams receiving step;

a second window display indicating step for indicating display of a second window when the number of system streams receiving unit has received the input of the number of system streams, the second window having an editing area for editing the reproduction route of the system streams, the second window displaying icons that correspond to system streams to display a part of the reproduction route being edited by the editor;

a second display control step for reading window information for the second window for the window information storage unit, the window information storage unit also storing icon information for icons that are to be displayed in the second window, and for having the second window displayed on the display screen;

a reproduction route receiving step for receiving a drag operation that moves a moved icon to a predetermined position in the editing area of the second window displayed on the display means;

a system linking step for linking system streams in accordance with a position of the moved icon after the drag operation received by the reproduction route receiving step, wherein a linking of system streams, equates to generation of linking information for system streams and the linking information forms the reproduction route;

a second editing information storing step for storing the linking information resulting from the linking of system streams by the system stream linking unit related to icon positions of icons corresponding to the system streams;

a reproduction route display indicating step for indicating a display of the icons in the editing area linked together to visually represent the reproduction route of the system streams linked by the system stream linking step;

a third display control step for having the icons in the editing area displayed linked together to show the linking of the system streams by the system stream linking step;

an editing operation receiving step for receiving an editing operation for the system stream reproduction control information; and a system stream reproduction control information editing step for reading a template for generating system stream reproduction control information from a template information storage unit that stores the template and editing the system stream reproduction control information in the read template by setting parameters in accordance with the number of system streams stored in the first editing information storing step and the linking information stored in the second editing information storing step, the template being composed of predetermined scripts and at least on parameter, and one of the parameters indicating a number of system streams that can be selectively reproduced during the selective reproduction period;

wherein the program further comprises the following steps to be performed before the first window display indication step:

an initial operation receiving step for receiving a commence editing operation from an editor;

a third window display indicating step for indicating, when the commence editing operation has been received in the initial operation receiving step, a display of a third window that displays a list of edited objects, the edited objects being sets of at least one system stream that are selectively reproduced and each edited object being one of (a) a menu language unit for one language used in a menu, and (b) one angle out of a multiangle; and a third window display control step for reading window information for the third window from the window information storage unit and having the third window displayed o the display screen, wherein the number of system streams received in the number of system streams receiving step is a number of languages for a case when the edited objects are menu language units and is a number of angles for a case when the edited objects are angles in the multiangle.

* * * * *